US010423943B2

(12) United States Patent
Wood et al.

(10) Patent No.: US 10,423,943 B2
(45) Date of Patent: Sep. 24, 2019

(54) GRAPH-BASED MUSIC RECOMMENDATION AND DYNAMIC MEDIA WORK MICRO-LICENSING SYSTEMS AND METHODS

(71) Applicant: Rhapsody International Inc., Seattle, WA (US)

(72) Inventors: Darryl William Wood, Tacoma, WA (US); Kenneth Wendell Murphy, Sammamish, WA (US); Brian Clark Ringer, Seattle, WA (US); Eric David Knutson, Seattle, WA (US); Heng Cao, Sammamish, WA (US); Nicholas Robert Soman, Seattle, WA (US); Peter Ira Aeschliman, Seattle, WA (US)

(73) Assignee: RHAPSODY INTERNATIONAL INC., Seattle, WA (US)

( * ) Notice: Subject to any disclaimer, the term of this patent is extended or adjusted under 35 U.S.C. 154(b) by 386 days.

(21) Appl. No.: 15/040,925

(22) Filed: Feb. 10, 2016

(65) Prior Publication Data
US 2017/0161702 A1 Jun. 8, 2017

Related U.S. Application Data

(63) Continuation-in-part of application No. 14/963,068, filed on Dec. 8, 2015.

(51) Int. Cl.
*G06Q 20/12* (2012.01)
*G06F 21/10* (2013.01)
(Continued)

(52) U.S. Cl.
CPC ....... *G06Q 20/1235* (2013.01); *G06F 21/105* (2013.01); *G06Q 20/06* (2013.01);
(Continued)

(58) Field of Classification Search
None
See application file for complete search history.

(56) References Cited

U.S. PATENT DOCUMENTS 6,507,727 B1 * 1/2003 Henrick ................ G06Q 30/06
348/E7.071
7,076,445 B1 7/2006 Cartwright
(Continued)

FOREIGN PATENT DOCUMENTS

KR 20110035433 A 4/2011

OTHER PUBLICATIONS

Srinivasan et al. MobileMiner: Mining Your Frequent Patterns on Your Phone, 2014 ACM International Joint Conference on Pervasive and Ubiquitous Computing, 2014, http://www.winlab.rutgers.edu/~lendlice/paper/Srinivasan_MobileMiner_UbiCornp14.pdf (Year: 2014).*

(Continued)

*Primary Examiner* — Kathleen Palavecino
*Assistant Examiner* — Lance Y Cai
(74) *Attorney, Agent, or Firm* — Aeon Law, PLLC; Adam L. K. Philipp; Jonathan E. Olson

(57) ABSTRACT

Provided herein are systems and methods for generating a set of recommended media works based on an identified seed media work. The seed media work is used to identify a set of co-occurring media works, which are defined as media works that have been intentionally interacted with within a predetermined time window as the seed media work by a single user. After the co-occurrence set is created, it is ranked and filtered. Media works identified in the co-occurrence set may then be selected based on their ranking.

29 Claims, 48 Drawing Sheets

(51) Int. Cl.
*G06Q 30/06* (2012.01)
*G06Q 30/02* (2012.01)
*G06Q 20/06* (2012.01)

(52) U.S. Cl.
CPC ..... *G06Q 30/0257* (2013.01); *G06Q 30/0609* (2013.01); *G06F 2221/0773* (2013.01)

(56) References Cited

U.S. PATENT DOCUMENTS

| | | | |
|---|---|---|---|
| 8,386,495 | B1 | 2/2013 | Sandler et al. |
| 9,251,334 | B1* | 2/2016 | Molitor ................. G06F 21/10 |
| 9,286,391 | B1* | 3/2016 | Dykstra ............... G06F 16/285 |
| 2003/0167202 | A1* | 9/2003 | Marks .................. G06Q 30/02 705/14.69 |
| 2006/0143133 | A1 | 6/2006 | Medvinsky |
| 2006/0200865 | A1* | 9/2006 | Leake, Jr. ............. G06F 21/10 726/27 |
| 2008/0092182 | A1* | 4/2008 | Conant ............. H04N 7/17318 725/109 |
| 2009/0210333 | A1 | 8/2009 | Titus et al. |
| 2015/0039505 | A1* | 2/2015 | Jin ....................... G06Q 20/401 705/44 |
| 2015/0215393 | A1 | 7/2015 | Liu |

OTHER PUBLICATIONS

Francesco Colace et al., A collaborative user-centered framework for recommending items in Online Social Networks, Computers in Human Behavior, vol. 51, Part B, Oct. 2015, pp. 694-704, ISSN 0747-5632, Year 2015.

* cited by examiner

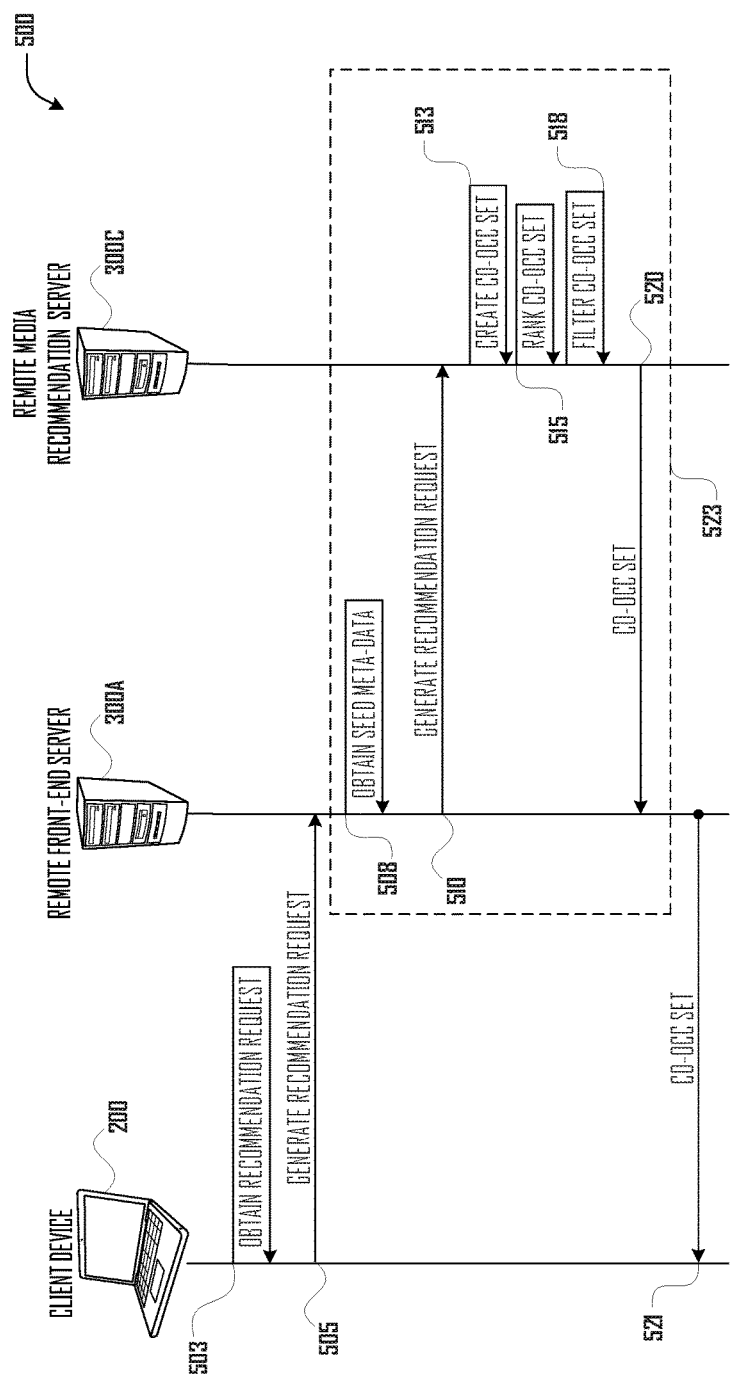

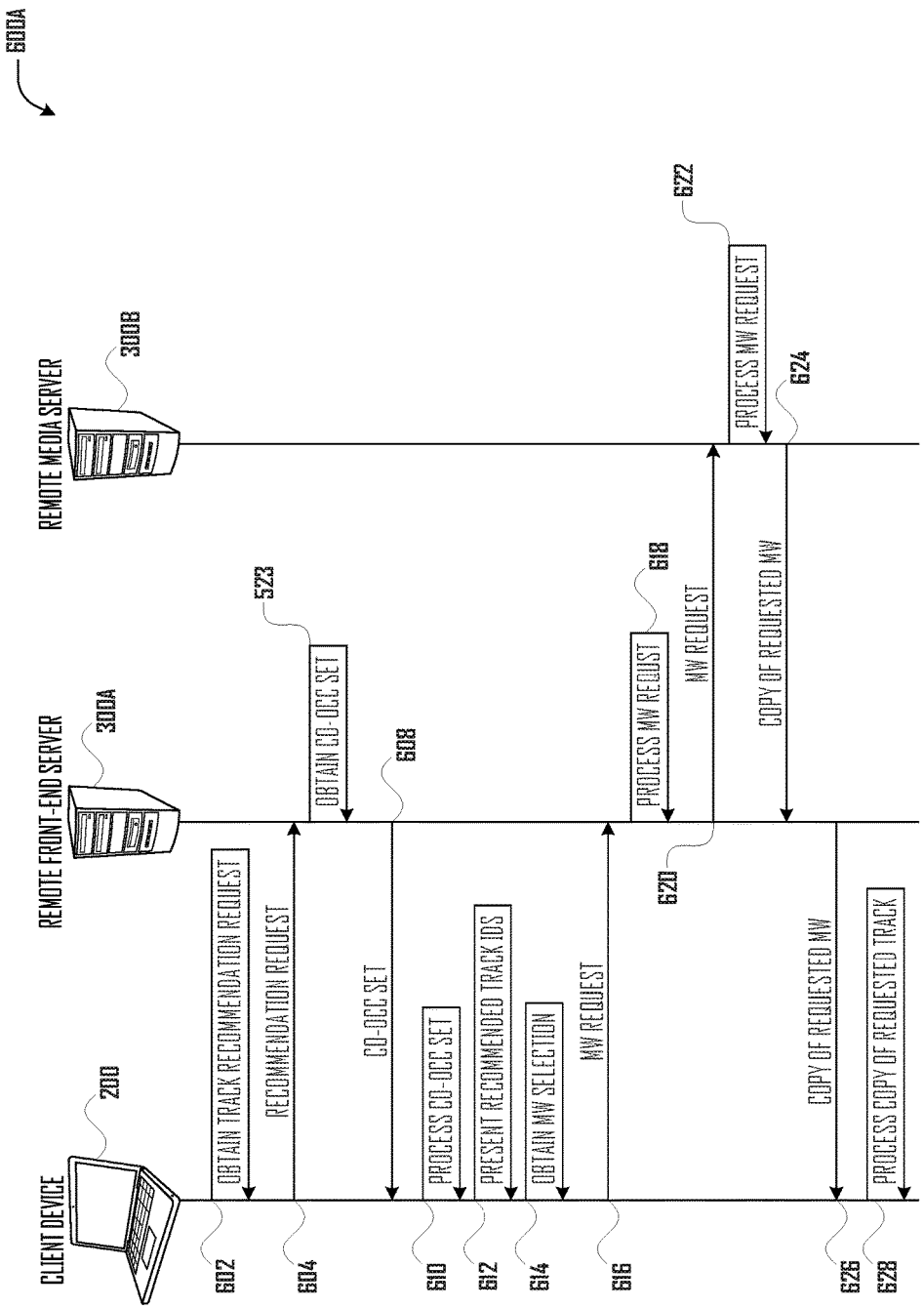

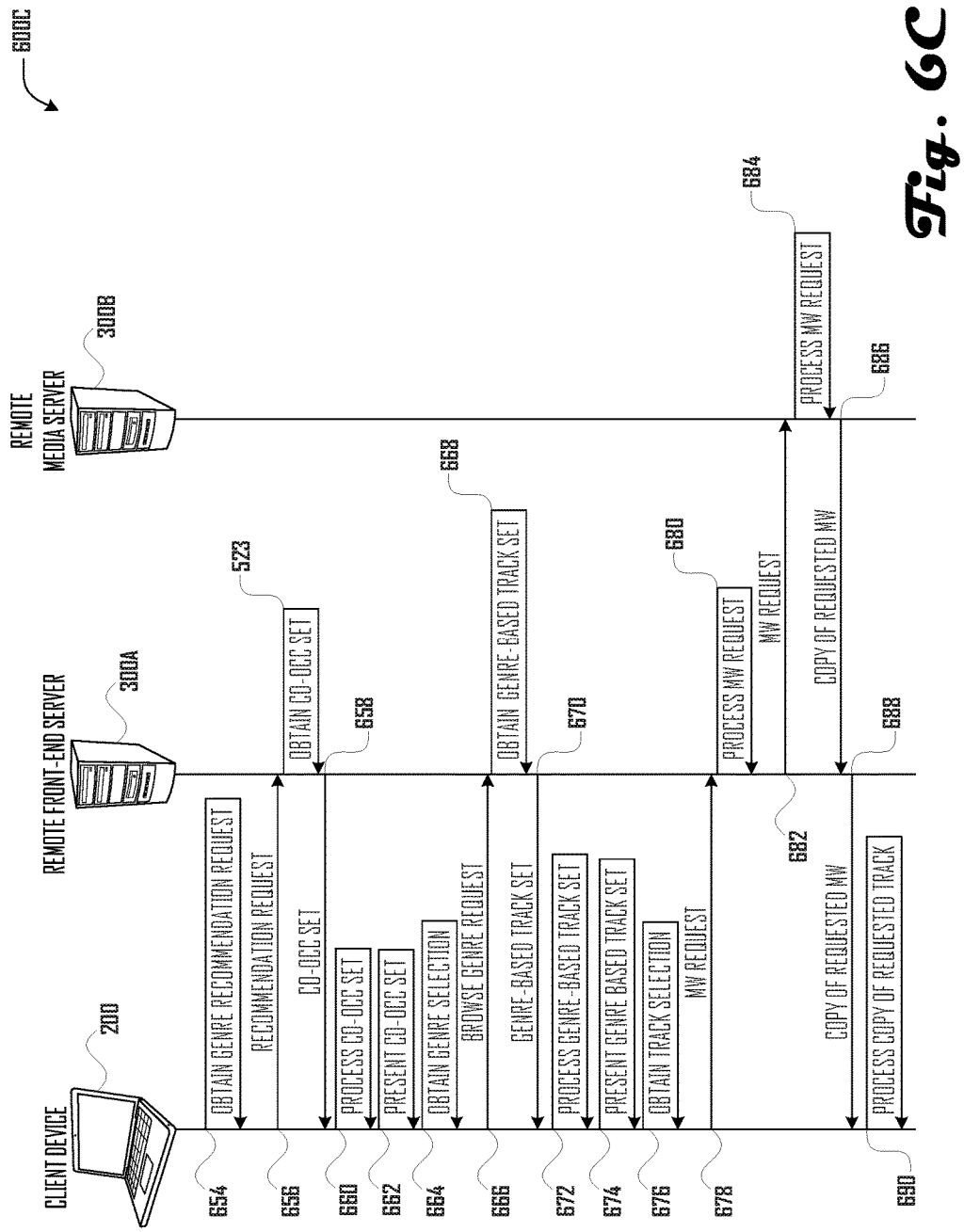

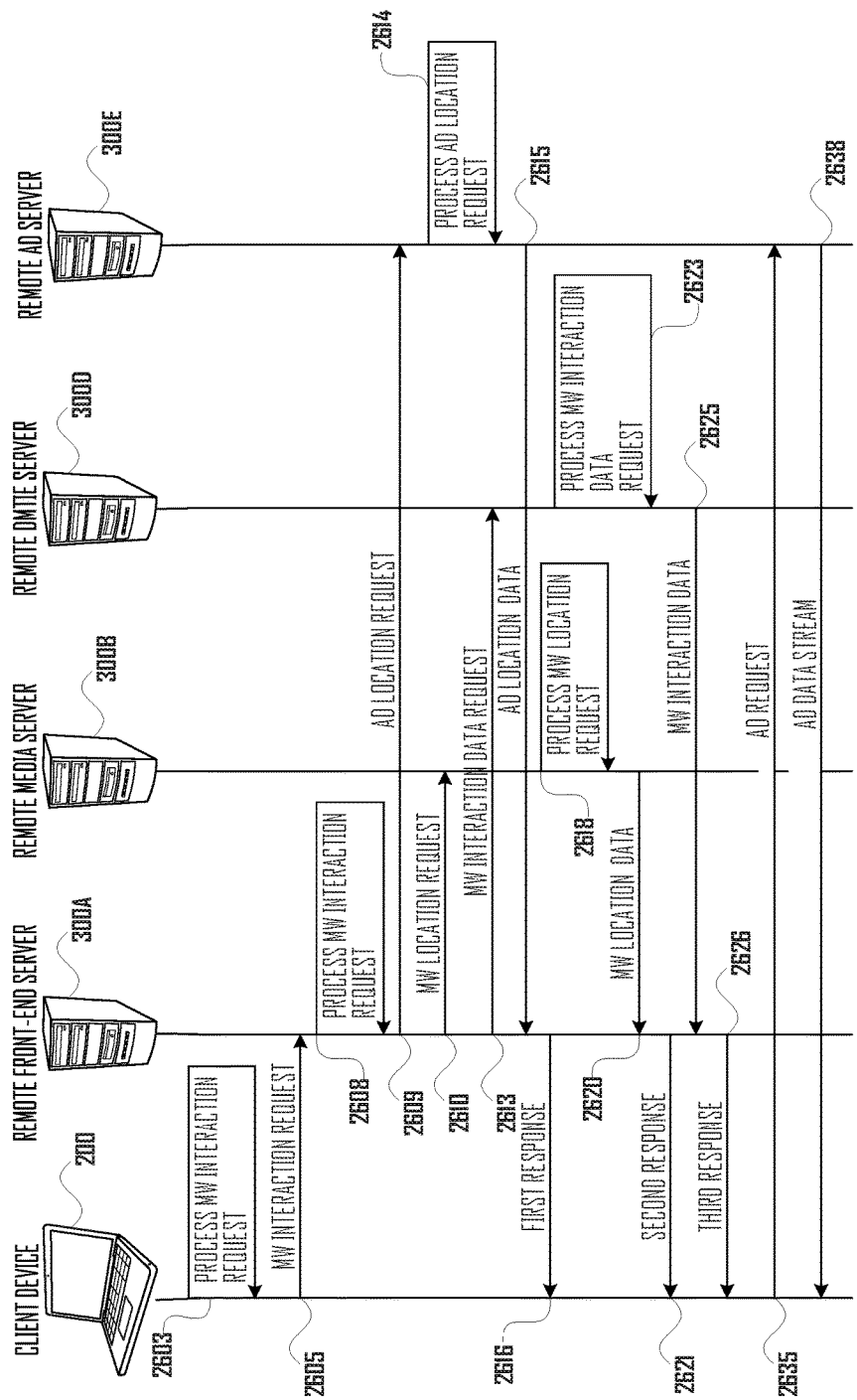

GRAPH-BASED MUSIC RECOMMENDATION AND DYNAMIC MEDIA WORK MICRO-LICENSING SYSTEMS AND METHODS

CROSS-REFERENCE TO RELATED APPLICATIONS

This application is a continuation-in-part of non-provisional patent application Ser. No. 14/963,068, filed Dec. 8, 2015, titled GRAPH-BASED MUSIC RECOMMENDATION AND DYNAMIC MEDIA WORK MICRO-LICENSING SYSTEMS AND METHODS, and naming inventors Heng CAO, et al. The above cited application is hereby incorporated by reference, in its entirety, for all purposes.

FIELD

The present disclosure relates to computing, and more particularly, to systems and methods for predicting user preferences with regard to digital media being presented on computing devices.

BACKGROUND

An online media provider may offer users access to digital copies of works of authorship (herein collectively referred to as "media works" and/or "media content") to users on a per-work and/or subscription basis through a digital media distribution system. The works of authorship may, for example, include sound recordings, musical works, motion picture works (or other audiovisual works), pictorial works, graphic works, literary works, dramatic works, choreographic works, and the like. Common examples of media works provided by an online media provider are digital audio recordings of songs and/or digital audiovisual recordings of films and/or television episodes.

An online media provider may utilize a client/server model to implement its digital media distribution system. A client/server model is a distributed computing application structure that partitions tasks and/or workloads between servers and client devices (a client device broadly refers to a piece of computer hardware that makes requests to a server). The server is often (but is not required to be) located at a remote location with respect to the client device, in which case the client may access the remote server's services by way of a network. A server may host (or run) one or more computer programs, referred to herein as services, which provide resources upon request to a computer program operating on a client device, referred to herein as a client application. A client application may request a service to provide the client application with content or to perform a function on behalf of the client application, but is typically not required to share any of its local resources with the service. Clients therefore typically initiate communication sessions with servers which await incoming requests via the network.

In the context of a digital media distribution system, a user operating a client device, such as a personal computer or a mobile phone, may run a client media application and access a media distribution service running on a remote server operated by the online media provider. Collectively, the client media application and the media distribution service may enable a user to:

(1) browse media content, including media content the user has already purchased and/or licensed from the online media provider, as well as new media content available from the online media provider's catalog of media works and (2) selectively interact with particular media works and/or sets of media works.

Discovering New Media Content Using Recommender Systems

Users of a digital media distribution system may desire to be exposed to new media content, but due to the vast amount of media content available and the idiosyncrasies of personal taste, simply searching through an un-curated catalog of an online media provider may not be efficient or satisfying to the user. Therefore, an online music store may provide a media recommender service for its users.

Conventional recommender (or recommendation) services may employ information filtering techniques that seek to predict how a user will respond to a given item, e.g. a particular media work. Recommender services may be applied in a variety of applications, such as providing consumer-level recommendations for media works such as movies, music, news, books, research articles, search queries, social tags, and products in general. Conventional recommender services have also been optimized for subject matter experts, businesses, service providers, restaurants, financial services, life insurance, persons (e.g. online dating), and the like.

Conventional recommender systems typically produce a list of recommendations through either collaborative filtering or content-based filtering techniques. Collaborative filtering uses the past behavior (e.g. previously purchased items and/or ratings given to those items) of other users to predict items (or ratings for items) that the current user may have an interest in. On the other hand, content-based filtering utilizes discrete characteristics of an item in order to identify additional items with similar properties. Hybrid recommendation systems may use a combination of these and other approaches.

The differences between conventional collaborative and content-based filtering can be demonstrated by comparing their respective use in the context of generating music recommendations for a user.

A conventional music recommender system that uses collaborative filtering may observe which artists, albums and individual tracks a user listens to on a regular basis and compares the user's listening behavior against the listening behavior of other users. The music recommendation service may create a set of recommended tracks for a user by identifying a set of tracks the user plays frequently, identifying other users who play some or all of the same tracks frequently, and then identifying tracks are also played frequently by those other users but that have not been played by the user requesting the recommendation. Such a system requires a large amount of information about its users in order to make accurate recommendations (sometimes referred to as the "cold start problem").

A music recommender system that uses content filtering uses the properties of a selected song or artist to identify other songs or artists with similar properties and create a set of songs with those properties. User feedback may be used to refine the system's results, deemphasizing certain attributes when a user "dislikes" a particular song with those attributes and emphasizing other attributes when a user "likes" a song with those attributes. A content filtering recommender system requires minimal information about the user to generate recommendations but therefore is not able to effectively utilize such personalized information in making its recommendations.

As discussed above, an online media store is a type of digital media distribution system which may offer users access to various media works through an interactive media service. However, the online media store may place non-technical restrictions on the services provided to users. A "non-technical restriction" is defined herein as an artificially imposed limitation on the way a device can access, use, and/or otherwise interact with a copy of a digital media work. A non-technical restriction is not an inherent technical limitation of the device. Non-technical restrictions may, for example, be based on intellectual property law, a contractual agreement between the online media store and the owner(s) of some or all of the intellectual property rights of a given media work, or the like. An online media store may utilize a digital rights management (DRM) system to impose and/or enforce non-technical restrictions on copies of media works provided by the online media store and/or accessed by software provided by the online media store. Some early peer-to-peer file sharing services were used in the creation of digital media distribution services that included minimal or no non-technical restrictions.

There are several conventional economic and commercial models for distributing digital media works to consumers. For example, an online media store may offer non-interactive media streaming at no cost to its users. An online media store may commercially support such non-interactive media streaming by exposing users to advertising in conjunction with the stream of media works. Due to non-technical restrictions imposed by the online media store (e.g. to comply with licensing agreements with the owners of some or all of the intellectual property rights to the media work), such non-interactive media streaming may, for example, result in a user experience similar to the experience of receiving a terrestrial radio or television broadcast. For example, a user may not choose the media works that are to be presented; instead, users are provided with a pre-programmed or semi-random combination of media works, the specific selection of which remains unknown to and uncontrollable by the users.

An online media store may also (or alternatively) offer interactive media streaming, which provides on-demand streaming access to some or all of the media works in the online media store's media work catalog to the user's client device in exchange for a monthly subscription fee (e.g. ten dollars per month), without the user purchasing/licensing a specific media work. Interactive media streaming may have fewer non-technical restrictions than non-interactive streaming. Additional features and benefits may be provided as part of the subscription, such as the media recommendation and/or playlist generation services described above, the ability to store local copies of media works, and the like.

The online media store may also allow a user to "purchase" a media work from the online media store's media work catalog. Although such a transaction may be presented to the user as being a similar economic experience as the retail purchase of a tangible object, the commercial and legal relationships underlying such a transaction may be more similar to a long term license agreement between the online media store and the user, where, in exchange for a one-time fee (e.g. one dollar) the online music store may grant the user the right, subject to various restrictions and limitations, to make one or more copies of the media work and the right to interact with those copies of the media work, such as by causing a copy to be rendered by a client device, causing a copy to be stored in the memory of the client device, or the like.

An online media store may utilize one or more of the conventional commercial/legal models described above. For example, an online media store may exclusively provide a non-interactive streaming service at no cost to users and generate all of its revenue from advertisements. Alternatively, an online media store may provide a non-interactive streaming service as a mechanism for exposing its services and media work catalog to consumers and encouraging those consumers to purchase media works from the online media store and/or subscribe to an interactive streaming service offered by the online media store.

Conventional models may require users to choose between paying nothing and having no interactive access to any media works and paying a full priced subscription fee in order to have full interactive access to all media works in the online media store's media catalog. Such models may not provide access to media works at cost/benefit ratio that a potential user finds optimal.

BRIEF DESCRIPTION OF THE DRAWINGS

FIG. 5 illustrates a first exemplary series of communications between various devices in accordance with at least one embodiment.

FIGS. 6A-C illustrate second, third, and fourth exemplary series of communications between various devices in accordance with at least one embodiment.

DESCRIPTION

Figure 1A:
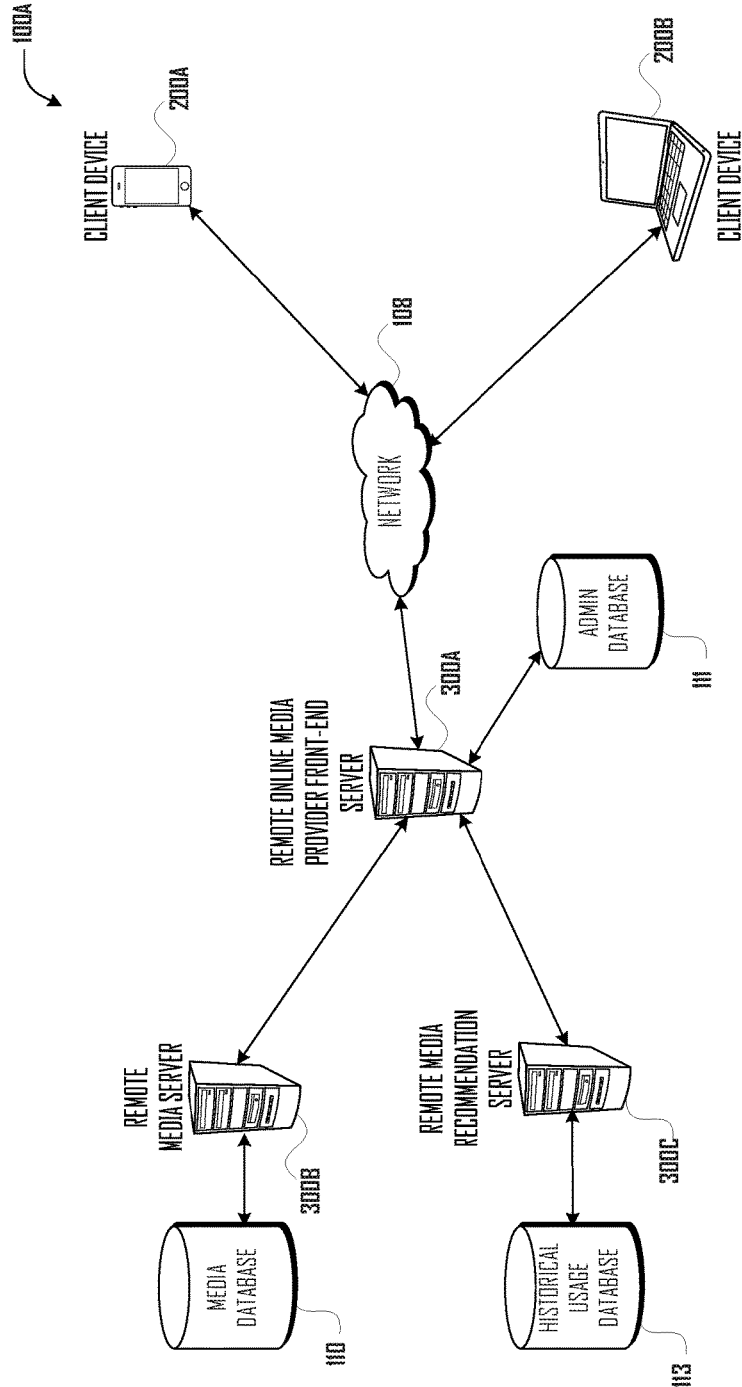
FIGS. 1A-B illustrate exemplary network topologies of client/server-based media distribution systems in accordance with various embodiments.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file servers, computer servers, and/or memory storage devices. Each of these conventional distributed computing components is accessible by the processor via a communication network, which may include, but is not limited to, the Internet.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein. For example, the embodiments set forth below are primarily described in the context of providing recommendations of media works, specifically sound recordings, based on a given input, or seed, media work. However, these embodiments are exemplary and are in no way limited to the type of item for which recommendations are being generated.

Exemplary Client/Server-Based Digital Media Distribution Systems

FIG. 1A illustrates a first exemplary client/server-based digital media distribution system 100A in accordance with various embodiments. Client devices 200A-B and a remote online media provider front-end server ("remote front-end server") 300A are in data communication with a network 108. In various embodiments, network 108 may include the Internet, one or more local area networks ("LANs"), one or more wide area networks ("WANs"), cellular data networks, and/or other data networks. Network 108 may, at various points, be a wired and/or wireless network. Remote front-end server 300A may be in data communication with a remote interactive media server 300B, a remote media recommendation server 300C, and an administrative database 111. Remote interactive media server 300B may be in data communication with a media database 110. Remote media recommendation server 300C may be in data communication with a historical usage database 113.

Figure 1B:
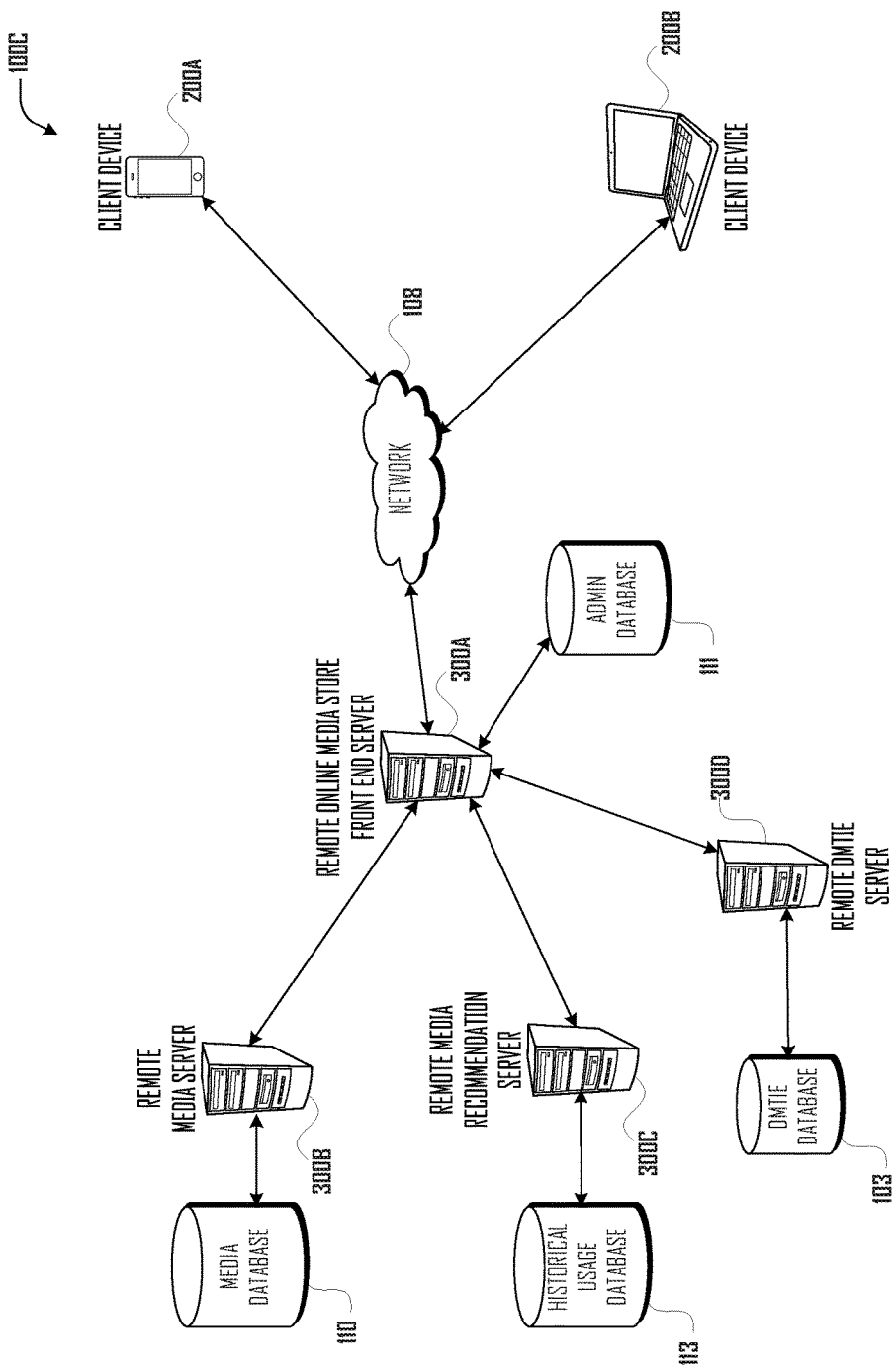

FIG. 1B illustrates a second exemplary client/server-based digital media distribution system 100B in accordance with various embodiments. As in the exemplary embodiment illustrated in FIG. 1A, client devices 200A-B and remote front-end server 300A are in data communication with network 108; the remote front-end server is in data communication with remote interactive media server 300B and administrative database 111; and remote interactive media server 300B is in data communication with media database 110. Remote front-end server 300A may also be in data communication with a remote dynamic micro-licensing transaction and interaction entitlement ("DMTIE") server 300D. Remote DMTIE server 300D may be in data communication with a DMTIE database 115.

In these and other embodiments, client devices 200, such as client device 200A and client device 200B, may be networked computing devices having form factors including general purpose computers (including "desktop," "laptop," "notebook," "tablet" computers, or the like); mobile phones; watches, glasses, or other wearable computing devices; dedicated media players; motor vehicle head units; audio-video on demand (AVOD) systems; dedicated media consoles; or the like. For simplified exemplary purposes, two client devices are shown, one of which is depicted as a mobile phone and the other of which is depicted as a laptop computer. In various embodiments there may be many more client devices 200. The primary functional components of an exemplary, form-factor-independent client device 200 are described below in reference to FIG. 2.

In various embodiments, remote front-end server 300A, remote interactive media server 300B, remote media recommendation server 300C, and remote DMTIE server 300D may be networked computing devices generally capable of accepting requests over network 108, e.g. from client devices 200, each other, various databases, and/or other networked computing devices (not shown), and providing responses accordingly. The primary functional components of an exemplary remote server 300, such as remote front-end server 300A, remote interactive media server 300B, remote media recommendation server 300C, and remote DMTIE server 300D are described below in reference to FIG. 3.

Exemplary Client Device

Figure 2:
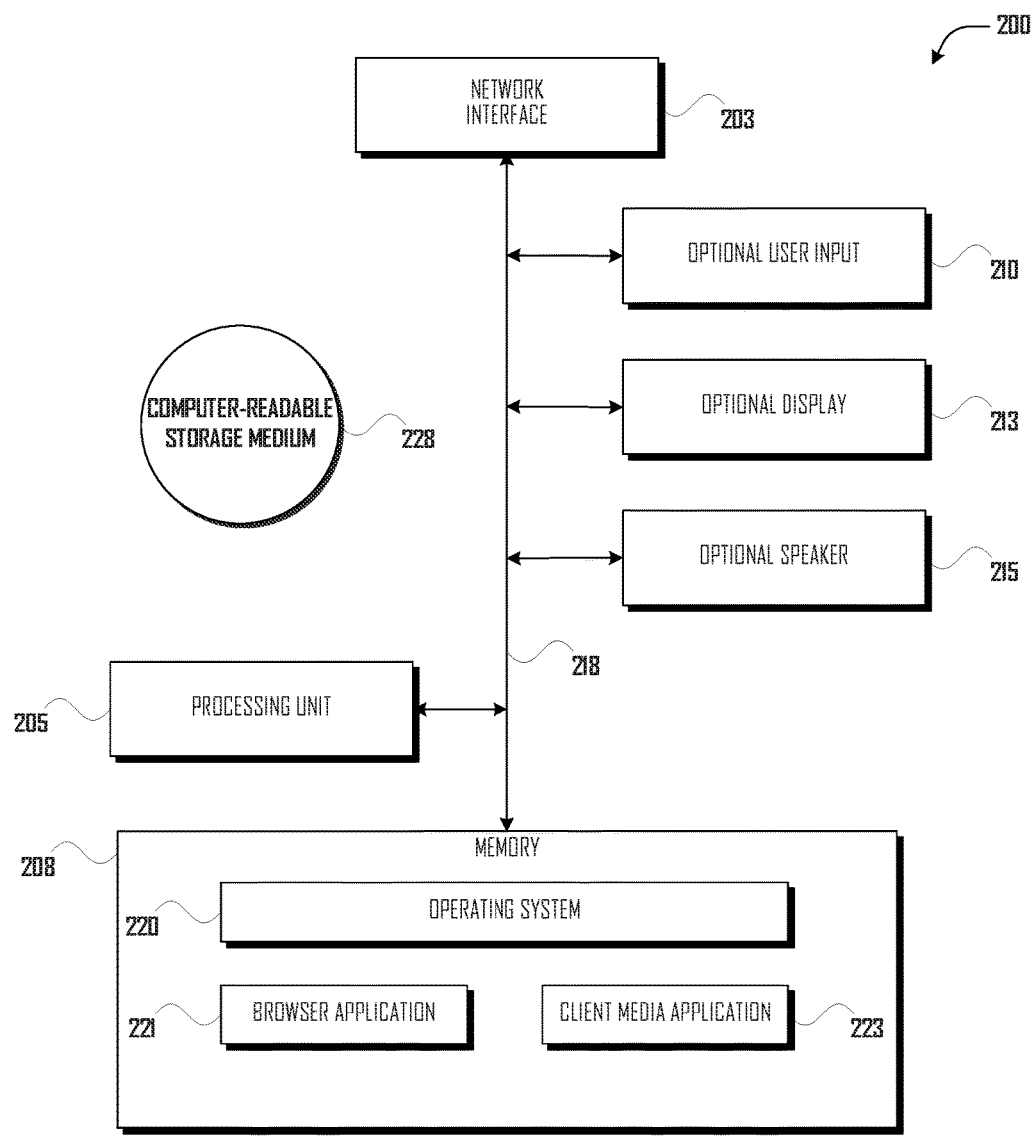
FIG. 2 illustrates several components of an exemplary client device in accordance with at least one embodiment.

Referring to FIG. 2, several components of an exemplary client device 200 are illustrated. In some embodiments, a client device 200 may include many more components than those shown in FIG. 2. However, it is not necessary that all of these generally conventional components be shown in order to disclose an illustrative embodiment. As shown in FIG. 2, exemplary client device 200 includes a network interface 203 for connecting to a network, such as network 108. Exemplary client device 200 also includes a processing unit 205, a memory 208, an optional user input 210 (e.g. an alphanumeric keyboard, keypad, a touchscreen, and/or a microphone), an optional display 213, an optional speaker 215, all interconnected along with the network interface 203 via a bus 218. The memory 208 generally comprises a RAM, a ROM, and a permanent mass storage device, such as a disk drive, flash memory, or the like.

The memory 208 of exemplary client device 200 stores an operating system 220 as well as program code for a number of software applications, such as a browser application 221 and/or a client media application 223. Browser application 221 is a software application for retrieving, presenting, and traversing information resources on a network, such as network 108. Although browser application 221 may be primarily intended to use the World Wide Web, it may also be used to access information resources provided by remote servers in private networks. An information resource may be a web page, an image, a video, or other piece of content and may be identified by a Uniform Resource Identifier (URI/URL) on network 108. An information resource may also provide browser application 221 executable program code for web applications, i.e. a software application that runs in and is rendered by browser application 221.

Memory 208 may also store executable instructions for decoding data files encoded according to various known coding standards and for presenting data files representing audio and/or video content, e.g. via optional display 213 and/or optional speaker 215, as well as media data files (not shown) representing copies of media works, such as, by way of non-limiting examples, sound recordings, audio/video recordings, images, songs, videos, photographs, books, articles, or the like. These software components and media data files may be loaded into memory 208 via network interface 203 (or via a computer readable storage medium 228, such as a memory card or the like). Although an exemplary client device 200 has been described, a client device 200 may be any of a great number of networked computing devices capable of communicating with network 108 and executing program code, such as the program code corresponding to browser application 221 and/or client media application 223.

In operation, the operating system 220 manages the hardware and other software resources of the client device 200 and provides common services for software applications, such as browser application 221 and/or client media application 223. For hardware functions such as network communications via network interface 203, receiving data via input 210, outputting data via optional display 213 and/or optional speaker 215, and allocation of memory 208, operating system 220 acts as an intermediary between software executing on client device 200 and the hardware. (In the case of a web application, the browser application 221 similarly acts as an intermediary between the web application's program code and the operating system 220.)

For example, operating system 220 may cause a representation of available software applications, such as client media application 223, to be presented to a user of client device 200 via display 213. If the user indicates, e.g. via optional input 210, a desire to use client media application 223, operating system 220 may instantiate a client media application process (not shown), i.e. cause processing unit 205 to begin executing the executable instructions of the client media application and allocate a portion of memory 208 for its use. If the user indicates, e.g. via optional input 210, a desire to use browser application 221, operating system 220 may instantiate a browser application process (not shown), i.e. cause processing unit 205 to begin executing the executable instructions of the browser application and allocate a portion of memory 208 for its use.

Exemplary Remote Server

Figure 3:
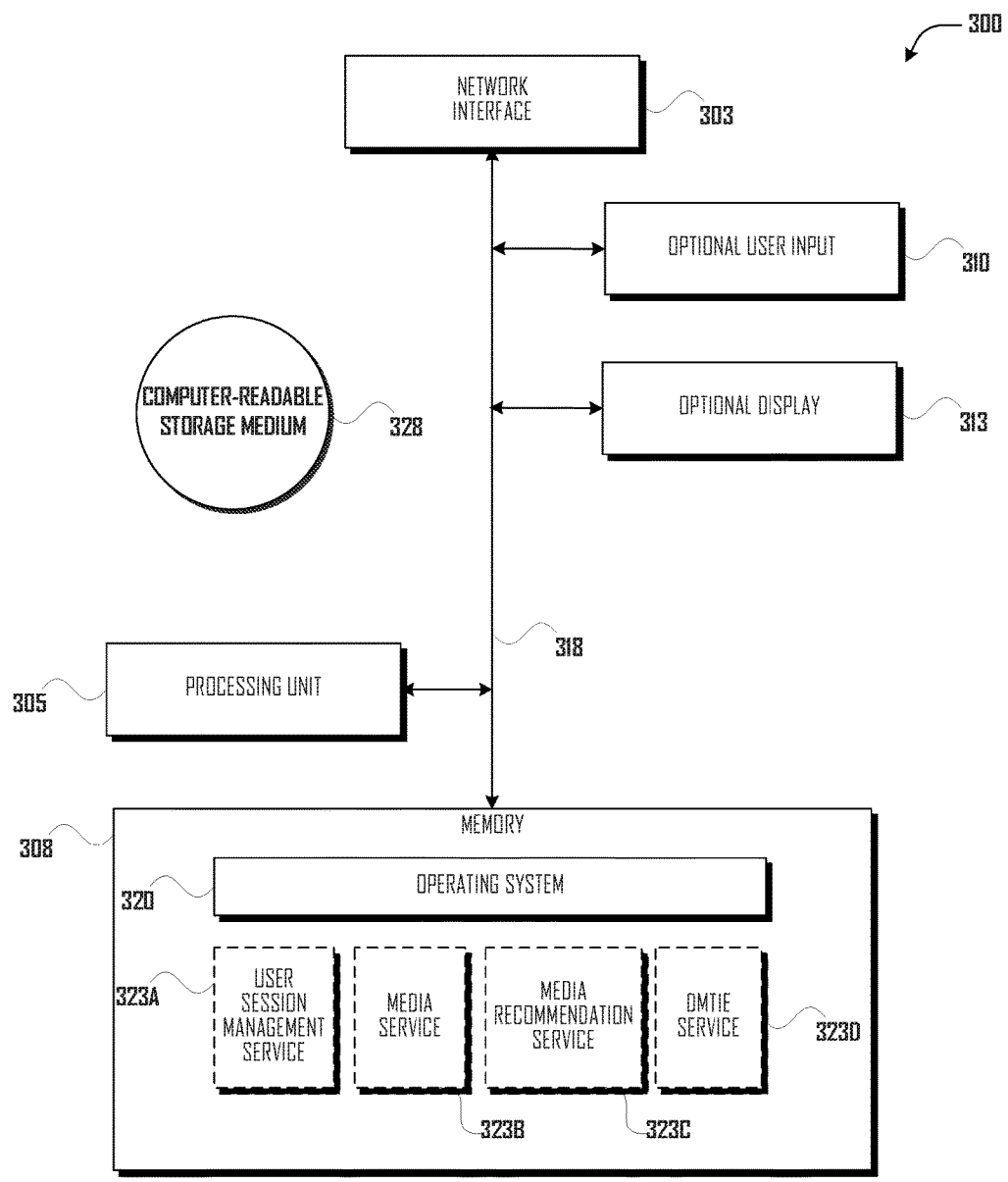
FIG. 3 illustrates several components of an exemplary remote server in accordance with at least one embodiment.

Referring now to FIG. 3, several components of an exemplary remote server 300, such as remote interactive media server 300A and remote media recommendation server 300C, in accordance with at least one exemplary embodiment are illustrated. In some embodiments, a remote server 300 may include many more components than those shown in FIG. 3. However, it is not necessary that all of these generally conventional components be shown in order to disclose an illustrative embodiment. As shown in FIG. 3, a remote server 300 includes a network interface 303 for connecting to a network, such as network 108. A remote server 300 also includes a processing unit 305, a memory 308, an optional user input 310, and an optional display 313, all interconnected along with the network interface 303 via a bus 318. The memory 308 generally comprises a random access memory ("RAM"), a read only memory ("ROM"), and a permanent mass storage device, such as a disk drive.

Memory 308 stores an operating system 320 and program code for various software services. For example, remote front-end server 300A may include executable instructions for performing remote user session management service 323A (indicated by dotted lines); remote interactive media server 300B may include executable instructions for performing remote interactive media service 323B (indicated by dotted lines); remote media recommendation server 300C may include executable instructions for performing remote media recommendation service 323C (indicated by dotted lines); and remote DMTIE server 300D may include executable instructions for performing DMTIE service 323D (indicated by dotted lines).

Program code for these and other such software services or other software components may be loaded into memory 308 from a non-transient computer readable storage medium 328 of a remote server 300 using a drive mechanism (not shown) associated with the non-transient computer readable storage medium, such as, but not limited to, a DVD/CD-ROM drive, memory card, or the like. Software components may also be loaded into memory 308 via the network interface 303, rather than via a computer readable storage medium 328. Remote server 300 may also communicate via bus 318 with a database, such as media database 110, or other local or remote data store (not shown). In some embodiments, a remote server 300 may comprise one or more replicated and/or distributed physical or logical devices. In some embodiments, one or more of remote front-end server 300A, remote interactive media server 300B, remote media recommendation server 300C, and/or remote DMTIE server 300D may be embodied by the same physical device.

Client/Server-Based Digital Media Distribution Systems

Referring collectively to FIGS. 1A-3, and as is described in more detail below, remote user session management service 323A operating on remote front-end server 300A and remote interactive media service 323B operating on remote interactive media server 300B may be operated in furtherance of an online media provider (not shown) providing digital copies of media works, such as audio content, video content, and the like, on a per-work and/or subscription basis e.g. to users of client devices 200 via client media application 223 (or a web application with similar functionality). Digital copies of such media works (interchangeably referred to herein as "tracks") may be retained in media database 110, indexed by identifying indicia, e.g. a string of alphanumeric characters uniquely corresponding to a particular media work (referred to herein as a "media work ID" and/or a media work identifier). Media database 110 may also contain meta-data for such media works, also indexed by media work ID. Media database 110 may also contain data relating to users of the on-line media store, including data relating to a given user's usage history.

Client media application 223 may act as an interface between a user of client device 200 and remote user session management service 323A operating on remote front-end server 300A. Upon instantiation, client media application 223 may send a "create new session" request to remote user session management service 323A, for example including identifying information for client device 200, identifying information for the particular instantiation of client media application 223, and/or user-account credentials such as a user name and password, obtained from the user or stored in memory 208. If presented, the user-account credentials may be unique to the user or may represent a generic and/or anonymous "guest" account.

Remote user session management service 323A may create a corresponding user session (not shown) associated with the particular instantiation of client media application 223, identified by a user-session identifier (referred to herein as a "session ID") and may obtain entitlement information associated with the provided identifying information from administrative database 111 and provide a response to client media application 223, which may include information related to features and services provided by the on-demand media service which the user-account associated with the user-account credentials are authorized to access.

Client media application 223 may then present the user with a menu of options, e.g. via optional display 213, and wait for the user to indicate a selection of a specific option, e.g. via optional input 210. Such options may include requesting the presentation of a locally stored media work, i.e. interactively accessing media data files (not shown) stored in memory 208, and/or requesting the presentation of remotely stored media works, i.e. interactively accessing media data files stored in other locations on network 108, such as media database 110. Another option may be requesting recommendations of new content the user may not be familiar with. These requests are provided to remote user session management service 323A operating on remote front-end server 300A. User session management service 323A may process the requests, generate relate requests to provide to interactive media service 323B, media recommendation service 323C, and/or DMTIE service 323D, obtain responses from interactive media service 323B, media recommendation service 323C, and/or DMTIE service 323D, provide responses to client media application 223, and store records of these requests and responses and other related data in administrative database 111, e.g. indexed by user session identifier.

Client/Server Based Digital Media Distribution System with a Media Recommender Service One way a user may seek to discover new content from an online media provider is by identifying a particular media work the user enjoys and requesting recommendations based on the identified media work. Referring in particular to FIGS. 1A and 3, an online media provider may provide a media work recommendation capability such as media recommendation service 323C as a component of a digital media distribution system, such as digital media distribution system 100A. In accordance with various embodiments, and as is described in greater detail below, media recommendation service 323C may utilize a first media work to select a set of other media works that the media recommendation service predicts will have a high degree of user affinity with the identified media work. As used herein, a first media work's "user affinity" with respect to a second media work is an expression of the extent to which a population of users who had a subjective positive reaction to the second media work will also have a subjective positive reaction to the first media work.

In accordance with various embodiments, an instantiation of client media application 223 may provide a generate-recommendations request, which identifies a particular media work, referred to hereafter as a "seed work," to user session management service 323A. User session management service 323A may pass the generate-recommendations request to media recommendation service 323C. As is described below, media recommendation service 323C may analyze historical usage data related to the seed work and provide user session management service 323A with a ranked set of recommended media work identifiers corresponding to media works that are likely to have user affinity with the seed work. User session management service 323A may then provide the ranked set of recommended media work identifiers to the requesting instantiation of client media application 223. The requesting instantiation of client media application 223 may then select one or more media work identifiers from the ranked set of recommended media work identifiers, and provide corresponding media work requests to user session management service 323A. User session management service 323A may pass the media work requests to interactive media service 323B. Interactive media service 323B may obtain copies of media works corresponding to the requested media work identifiers, e.g. from media database 110, and provide them user session management service 323A, which in turn may provide the copies of the digital media works to the requesting instantiation of client media application 223.

In accordance with various embodiments, to determine which media works may have user affinity with the seed work, media recommendation service 323C searches historical usage data for co-occurrences between the seed work and other media works. As used herein, a first media work "co-occurs" (or has "co-occurrence") with a second media work if a particular user has had a positive interaction with both the first and second media works within a particular temporal range, i.e. a pre-defined time window. For example, if the historical usage data shows a particular user intentionally selected a first media work and a second media work for playback within one hour of each other, the first and second media works may be said to "co-occur" with one another. If the historical usage data further shows a particular user "liked" a third media work within one hour of selecting the second media work for playback but more than one hour after selecting the first media work for playback, the second and third media works may also be said to co-occur with one another while the first and third media works do not.

It has been found that for the present systems and methods to be particularly effective in predicting user affinity between media works in a commercial context, a minimum amount of historical usage data, in terms of the size of the user population and/or the number of media work interactions may be required. For example, in at least one embodiment, a minimum user population of 1.5 million (1,500,000) users and/or records of at least 650 million (650,000,000) media work interactions was shown to produce suitable results, as measured by the number of times users chose not to interact with a recommended media work. It has also been found that for the present systems and methods to be suitably effective in a commercial context, a set of recommended media works should be provided within a minimum amount of time from obtaining the request. In at least one embodiment, a response time of less than or equal to 0.4 seconds in at least 95% of cases was shown to produce suitable results.

In the illustrated embodiments, the historical usage data used to generate the ranked set of recommended media works is stored in historical usage database 113. As is explained in more detail below, in the illustrated embodiments, historical usage database 113 may be a graph database, meaning the historical usage database uses graph structures for semantic queries with nodes, edges, and properties used to represent and store data. It has been found that such a graph database is particularly well suited for performing the necessary analysis on a sufficiently large set of historical usage data and providing results in a sufficiently efficient amount of time. In such an embodiment, media work IDs and session IDs may be represented by nodes in the graph, interconnected by edges that represent interactions between the nodes, such as plays, skips, shares, "likes," "dislikes," etc. In other embodiments, historical usage database 113 may be another type of database, such as a relational database. In some embodiments, media recommendation service 323C may obtain the usage data directly from media database 110.

Figure 4:
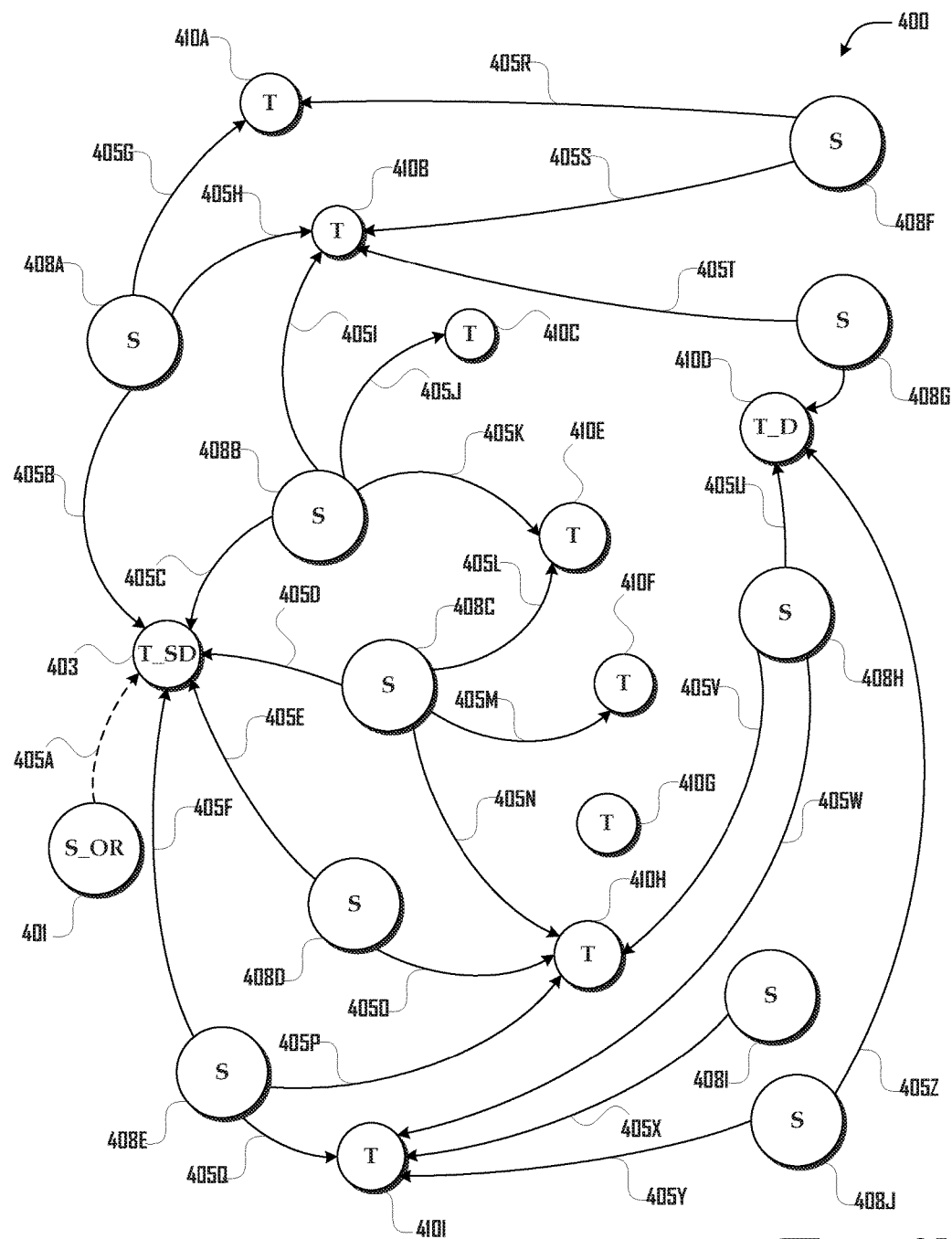
FIG. 4 illustrates a conceptual diagram of a graph data store in accordance with at least one embodiment.

FIG. 4 illustrates a simplified, exemplary graph data structure 400 including an originating user session-node (S_OR) 401, a seed work-node (W_SD) 403, historical user session-nodes (S) 408A-J, and media work-nodes (W) 410A-I, interconnected by event-edges 405A-Z. In various embodiments, event-edges such as event-edges 405A-Z may represent multiple types of interactions between the user session-nodes and the media-nodes, including interactions which may be characterized as positive, such as plays, "likes," and shares; interactions which may be characterized as negative, such as skips and "dislikes;" and interactions which may be characterized as neutral, such as a search. In the illustrated example, event-edge 405A represents a "create recommendation" event for seed work-node 403, originating from user session-node 401 and event-edges 405B-F represent interactions between the seed work-node (W_SD) and respective historical user session-nodes 408A-E. In various embodiments, there may be many more media-nodes (W) and session-nodes (S) and there may be many more event-edges interconnecting the various nodes than are shown in the simplified example of FIG. 4.

As is explained in more detail below, to create a set of recommended media works based on seed-media-node 403, media recommendation service 323C identifies a set of other media work-nodes (W) that co-occur with the seed work-node (W_SD) in historical user sessions (a "co-occurring media work set"). Each event-edge 405B-F connected to seed work-node 403 is analyzed to determine if the event-edge corresponds to a positive or negative interaction with the seed-media-node. To accomplish this, media recommendation service 323B traverses each positive event-edge to identify the user session-nodes (S) which had positive interactions with seed work-node 403. In the illustrated example, it is assumed event-edges 405B-F correspond to positive interactions between session-nodes 408A-E, respectively, and seed work-node 403.

From each user session-node 408A-E, media recommendation service 323C identifies event-edges between the user session-node and other media work-nodes 410 which occurred during a predetermined time window, e.g. within plus or minus thirty minutes, from the time of the event-edge 405 linking the particular user session-node 408 to the seed work-node 403. In the illustrated example, it is assumed all of the illustrated event-edges occurred during the predetermined time window. Media recommendation service 323C analyzes each event-edge 405 within the predetermined time window to determine if it corresponds to a positive or negative interaction between the user session-node and the linked media work-node 410.

Subject to certain qualifications, described below, each positive event-edge between a user session 408A-E and a secondary media work-node 410 within the predetermined time window of the positive event-edge linking the respective user session 408 to seed work-node (W_SD) 403 may be considered a co-occurrence between the seed work-node and the corresponding secondary media work-node. As is shown in Table 1, in the example shown in FIG. 4, co-occurrences occur between seed work-node 401 and secondary media work-nodes 410A-C, 410E-F, and 410H-I.

As can be seen from Table 1 and also from FIG. 4, secondary media work-nodes 410A, 410C, 410F, and 410I each co-occur with seed work-node 403 once; secondary media work-nodes 410BB and 410E each co-occur with seed work-node 403 twice; and secondary media work-node 410H co-occurs with seed work-node 403 three times, while secondary media work-nodes 410D and 410G have no co-occurrences with seed-media work-node 403. The number of co-occurrences, or "co-occurrence magnitude," of the secondary media work-nodes with respect to seed work-node 403 may be used to rank the media works in the co-occurring media work set.

TABLE 1

| Seed Work-Node (W_SD) | Event-Edge | User Session-Node (S) | Event-Edge | Secondary Media Work-Node (W) |
|---|---|---|---|---|
| 403 | 405B | 408A | 405G | 410A |
|  |  |  | 405H | 410B |
|  | 405C | 408B | 405I | 410B |
|  |  |  | 405J | 410C |
|  |  |  | 405K | 410E |
|  | 405D | 408C | 405L | 410E |
|  |  |  | 405M | 410F |
|  |  |  | 405N | 410H |
|  | 405E | 408D | 405O | 410H |
|  | 405F | 408E | 405P | 410H |
|  |  |  | 405Q | 410I |

However, a co-occurrence magnitude does not account for a secondary media work's broader popularity, i.e. the degree to which the user population of the online media provider as a whole has a subjectively positive reaction to the secondary media work, independent of any user affinity between the secondary media work and the seed work. For example, while secondary media work-node 410B and secondary media work-node 410E both co-occur with seed work-node 403 twice, if secondary media work-node 410B represents an extremely popular media work, it may have tens or hundreds of thousands of event-edges (e.g. 405S, 405T) linking it to tens or hundreds of thousands of other user session-nodes (e.g. 408F, 408G), while secondary media work-node 410E may have a much smaller number of total event-edges (not shown) linking to a correspondingly much smaller number of user session-nodes. It follows that the co-occurrence between seed work-node 403 and secondary media work-node 410B may be more attributable to the popularity of secondary media work-node 410B and less attributable to a user affinity between the two media works. It further follows that, conversely, the co-occurrence between the seed-media work-node 403 and secondary media work-node 410E is less attributable to any popularity of secondary media work-node 410E and more attributable to a user affinity between the two media works.

Therefore, in accordance with various embodiments, after all co-occurring secondary media work-nodes 410 are identified and their co-occurrence magnitude $CO_{mag}$ with respect to seed-media work-node 403 is determined, a co-occurrence score $CO_{scr}$ is calculated for each secondary media work-node:

$CO_{scr} = CO_{mag}/TPI$

Where TPI represents the total number of total positive interactions between the user population of the online media provider as a whole and the secondary media work-node. This consideration of the total positive interactions for the secondary media work-node results in a weighted co-occurrence score that takes into account the popularity of the secondary media work-node.

The co-occurrence score $CO_{scr}$ for the secondary media work-nodes 410 in the illustrated example are shown in Table 2.

TABLE 2

| Secondary media work-node | $CO_{mag}$ | Total Pos Int. | $CO_{scr}$ |
|---|---|---|---|
| 410A | 1 | 2 | 0.5 |
| 410B | 2 | 4 | 0.5 |
| 410C | 1 | 1 | 1 |
| 410E | 2 | 2 | 1 |
| 410F | 1 | 1 | 1 |
| 410H | 3 | 4 | 0.75 |
| 410I | 1 | 4 | 0.25 |

In the event two secondary media work-nodes have the same co-occurrence score, e.g. secondary media work-nodes 410C, 410E, and 410F, embodiments of the present methods and systems may use the secondary media work-node's co-occurrence magnitude as a secondary ranking factor. The ranking of the co-occurring media work set from Table 2 is shown in Table 3.

TABLE 3

| Arbitrary media work-node | $CO_{mag}$ | Total Plays | $CO_{scr}$ | $CO_{rank}$ |
|---|---|---|---|---|
| 410A | 1 | 2 | 0.5 | 5 |
| 410B | 2 | 4 | 0.5 | 4 |
| 410C | 1 | 1 | 1 | 2 |
| 410E | 2 | 2 | 1 | 1 |
| 410F | 1 | 1 | 1 | 2 |
| 410H | 3 | 4 | 0.75 | 3 |
| 410I | 1 | 4 | 0.25 | 6 |

In various embodiments, additional information may be taken into account in generating the ranked co-occurring media work set. For example, event-edges may be broadly grouped into positive event edges (plays, "likes," etc.) and negative event-edges (skips, "dislikes," etc.) and a secondary media work-node's co-occurrence magnitude may be increased for each positive event-edge and decreased for each negative event-edge. In other embodiments, different types of positive or negative event-edges could be given different weights and the formula adjusted so that, for example, a secondary media work-node's co-occurrence score could be higher if its event-edges are associated with "likes" rather than plays.

Client/Server Based Digital Media Distribution System with a Media Recommender Service and a DMTIE Service The features and services of the online media provider that a particular user-account is authorized to access may be expressed at least partially via an account entitlement level associated with the user-account. For example: (i) the account entitlement level may define a set of non-technical restrictions, applied to client device 200 via client media application 223, that control how the client media application can interact with copies of media works offered by the on-line media provider and/or (ii) the account entitlement level may define a set of non-technical restrictions, applied to one or more of the various remote servers 300A-D via various software services 323A-D, that control how the software services can interact with copies of the media works offered by the on-line media provider.

For example, a first account entitlement level may be associated with advertisement-supported non-interactive media streaming features and services where instantiations of client media application 223 are provided with a pre-programmed or semi-random set of media works for rendering, the specific selection and/or order of which remains unknown to and uncontrollable by the users. The non-interactive nature of a media work stream may be due to non-technical restrictions imposed by client media application 223 on client device 200. For example, although there is no guarantee a user will have a positive response with respect to any particular media work in the set, non-technical restrictions may only permit users to skip (i.e. bypass the rendering of) a limited number of media works in a given time period.

A second, relatively higher, account entitlement level may be associated with subscription-based interactive media streaming features and services, where instantiations of client media application 223 are permitted "on-demand" interactive access to some or all of the media works in the online media store's media work catalog, without the user purchasing/licensing a specific media work. Interactive media streaming may have fewer non-technical restrictions than non-interactive streaming. Additional features and benefits may also be associated with the second entitlement level, such as the media recommendation and/or playlist generation services described above, the ability to store local copies of media works in memory 208 of client device 200, and the like.

In accordance with various embodiments, client media application 223 and DMTIE service 323D may also present a user with opportunities to exercise granular control of the user's ability to interact with various media works by providing users with the ability to: maintain a media interaction credit (MIC) balance; increase the user's MIC balance by purchasing interaction credits or by performing designated actions (e.g. using the service, inviting a friend to use the service, or watching an advertisement, and the like); and use MICs to "purchase" discrete media work interactions. Although the latter transaction may be presented to the user as being a similar economic experience as a "purchase," the commercial and legal relationships between the user and the online media provider underlying such a transaction may be more similar to a short-term license agreement (referred to herein interchangeably as a "micro-license" or a "micro-license agreement"), where, in exchange for deducting a number of MICs from the user's MIC balance, DMTIE service 323D may cause the instantiation of client media application 223 to disable the non-technical restriction(s) preventing the client device from interacting with the media work in the desired way. The cost of an MIC may vary over time and by geographic region. In some embodiments, the cost of an MIC may be significantly less than the subscription fee associated with an interactive streaming service (e.g. one MIC may cost less than one percent of a monthly subscription fee associated with an interactive streaming service). The interaction cost of a particular transaction may be dependent on characteristics of the user account associated with the current user session, characteristics of the media work, characteristics of the desired interaction, and the like.

For example, an instantiation of client media application 223 operating on client device 200 and associated with the first account entitlement level described above may obtain an indication that a user of the client device desires to skip the media work currently being rendered. Client media application 223 may provide a media work interaction request to user session management service 323A. User session management service 323A may compare a minimum account entitlement level for the desired interaction to the account entitlement level associated with the current user session and instruct the instantiation of client media application 223 to permit or deny the interaction accordingly. In the present "skip" example, this may involve determining how many previous skip requests the user has made within a certain time window, such as during the sixty minutes prior to obtaining the current skip request, during the current user session, and/or during a current listening session (e.g. track list). If the determined number of previous skip requests, however measured, is less than a predefined maximum skip number, the minimum account entitlement level for the current skip request may be equivalent to the first account entitlement level described above. However, if the determined number of previous skips is greater than or equal to the predefined maximum skip number, the minimum account entitlement level for the current skip request may be increased to the second entitlement level described above.

Assuming the interaction is not permitted, e.g. because the user account is associated with the lower, first account entitlement level and the user has already exceeded the number of skips permitted by this account entitlement level, in accordance with various embodiments, user session management service 323A may obtain an interaction cost associated with permitting the current instance of the requested interaction from DMTIE service 323D, which may be expressed in MICs. User session management service 323A may provide the interaction cost to the instantiation of client media application 223.

The instantiation of client media application 223 may provide the user with the option to "purchase" the desired interaction, i.e., in this example, skipping the current media work, in exchange for the specified number of MICs. If client media application 223 obtains an indication the user wishes to proceed with the interaction, the client media application may disable the non-technical restriction(s) preventing client device 200 from bypassing the media work currently being rendered and notify the user-session management service 323A. User-session management service 323A may notify DMTIE service 323D and the DMTIE service may deduct the interaction cost from the user's interaction credit balance.

Other media work interactions that may be facilitated in accordance with the techniques described herein include: generating a set or recommended media works based on a seed media work (or works); temporarily removing the advertisements accompanying a non-interactive media work stream; obtaining unlimited access to a particular media work or group of works for a limited amount of time, e.g. an hour, a day, or a week; obtaining access to a specific number of plays or views of a particular media work (e.g. "play once", "play 10 times", etc.); re-rendering a particular media work; saving a local copy of a particular media work in the local memory 208 of client device 200 for a limited amount of time; obtaining a relatively higher quality copy of the media work, e.g. at an enhanced bitrate for higher fidelity audio and/or video; obtaining interactive access to a set of related media works, e.g. an album or a television season; and the like.

First Exemplary Series of Communications

FIG. 5 illustrates an exemplary series of communications 500 between client device 200, remote front-end server 300A, and remote media recommendation server 300C in accordance with various embodiments of a digital media distribution system, such as digital media distribution system 100A.

Client device 200 obtains 503 a recommendation request identifying a recommendation seed, such as a particular media work, a related set of media works (e.g. a television program), a genre of media works (e.g. jazz), or the like.

Client device 200 provides remote front-end server 300A with a generate recommendation request 505, including the recommendation seed.

Remote front-end server 300A may obtain 508 meta-data relating to the recommendation seed, e.g. by querying media database 110 via remote interactive media server 300B (not shown).

Remote front-end server 300A may provide remote media recommendation server 300C with a corresponding generate recommendation request 510, including the recommendation seed and related meta-data, if any.

As is described in more detail below, remote media recommendation server 300C may use the seed recommendation and any metadata to create 513 an initial co-occurrence set. Remote media recommendation server may then rank 515 the initial co-occurrence set and filter 518 the ranked co-occurrence set, which may include applying non-technical limitations and/or rules to filter or organize the co-occurrence set (for example, based on restrictions imposed by rights holders in exchange for licenses to the media works).

Remote media recommendation server 300C then provides the ranked, filtered co-occurrence set 520 to remote front-end server 300A.

Remote front-end server 300A may then provide the co-occurrence set to client device 200.

As is indicated by dotted lines in FIG. 5, in the communications described below in reference to FIGS. 6A-B, the steps indicated by reference numerals 508-520 are collectively referred to as the step of obtaining 523 a co-occurrence set.

Second Exemplary Series of Communications

FIG. 6A illustrates an exemplary series of communications 600A between client device 200, remote front-end server 300A, and remote interactive media server 300B in the context of digital media distribution system 100A obtaining a request for media work recommendations based on a seed work. (Similar processes could occur using a set of seed works, a seed genre, or the like.) As is described above in reference to FIG. 5, in FIG. 6A communications between remote front-end server 300A and remote media recommendation server 300C are subsumed in the step of generating 523 a co-occurrence set.

In the example shown in FIG. 6A, client device 200 obtains 602 a media work recommendation request and provides a recommendation request 604, including a seed work identifier, to remote front-end server 300A.

Remote front-end server 300A may obtain 523 a co-occurrence set, including identifiers for a plurality of recommended media works and provide the co-occurrence set 608 to client device 200.

Client device 200 may process 610 the co-occurrence set and present 612 one or more recommended media work identifiers obtained from the co-occurrence set, e.g. to a user of the client device.

Client device 200 may obtain 614 a selection of a media work identifier and provide a media work request 616, including the selected media work identifier, to remote front-end server 300A.

Remote front-end server 300A may process 618 the media work request, for example by determining whether a user-account associated with client device 200 is entitled to receive a copy of the selected media work (for example, because the user has subscribed to interactive media service 323B and made any necessary payments for access to the service). As is described below, if a user-account associated with client device 200 has a sufficient entitlement level then remote front-end server 300A may provide a media work request 620, including the selected media work identifier, to remote interactive media server 300B. If a user-account is not associated with client device 200, or if the user-account is not entitled to access interactive media service 323B, then additional steps may be needed to authorize the media work request, for example using DMTIE service 323D, described below.

Remote interactive media server 300B may process 622 the media work request, for example by searching for the corresponding media work identifier in the media database 110.

Remote interactive media server 300B may provide a copy of the requested media work 624 to remote front-end server 300A.

Remote front-end server 300A may provide a copy of the requested media work 626 to client device 200.

Client device 200 may then process 628 the copy of the requested media work, for example by rendering the media work for presentation to a user of client device, saving the copy to memory 208 of the client device, or the like.

Third Exemplary Series of Communications

Figure 6B:
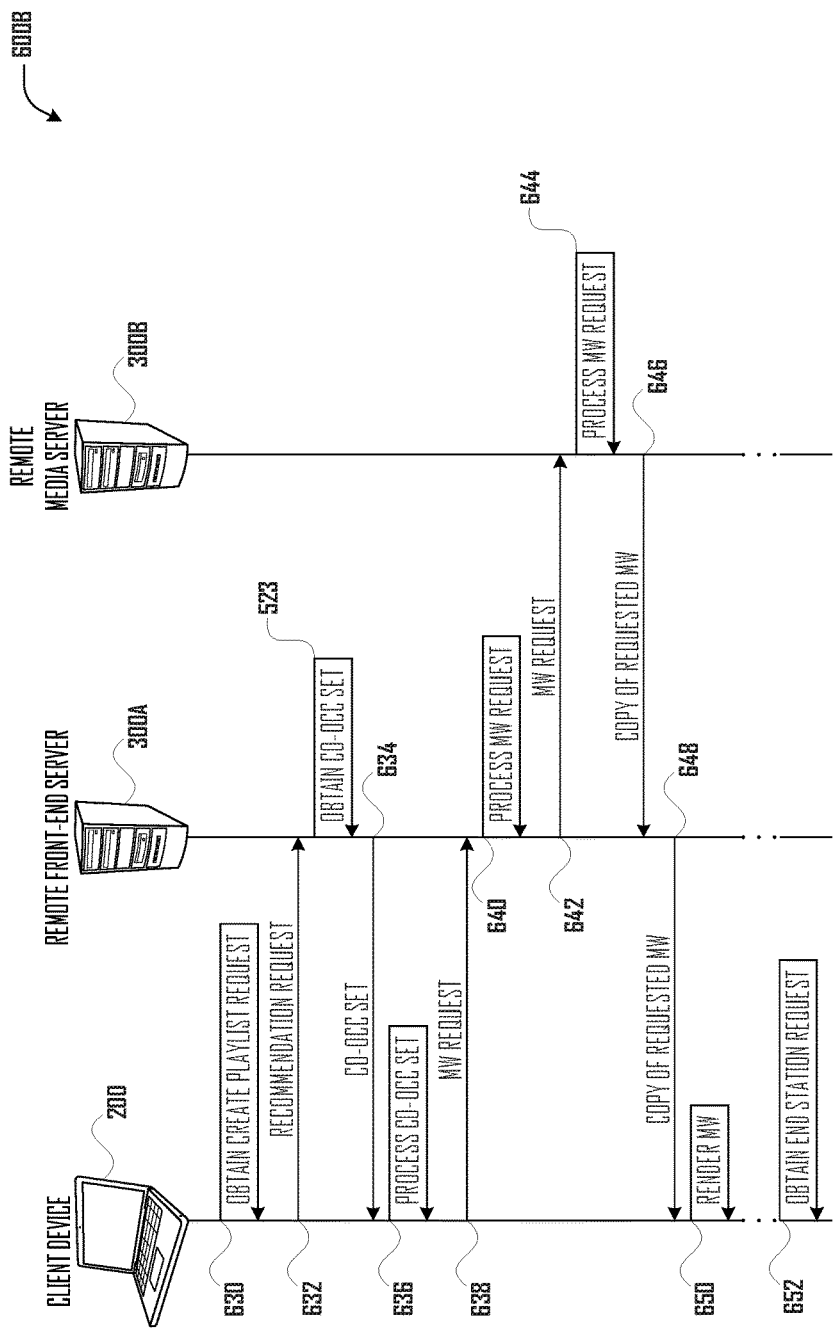

FIG. 6B illustrates an exemplary series of communications 600A between client device 200, remote front-end server 300A and remote interactive media server 300B in the context of digital media distribution system 100A obtaining a request to create and play a custom playlist based on a seed. In the example described below, the seed is a media work identifier; however, the seed could also be a genre identifier or some other type of identifier. As is described above in reference to FIGS. 5 and 6A, in FIG. 6B communications between remote front-end server 300A and remote media recommendation server 300C are subsumed in the step of obtaining 523 a co-occurrence set.

In the example shown in FIG. 6B, client device 200 obtains 630 a create playlist request including a seed work identifier, and provides a recommendation request 662, including a seed work identifier, to remote front-end server 300A.

Remote front-end server 300A may determine (not shown) whether client device 200 is authorized to receive a custom playlist. For example, as is described below, if a user-account associated with client device 200 has a sufficient user entitlement level, then remote front-end server 300A may proceed to provide the custom playlist to the client device. Otherwise, additional steps may be needed to authorize the create station request obtained by the client device, for example using DMTIE service 323D, described below.

Remote front-end server 300A may obtain 523 a co-occurrence set, including identifiers for a plurality of recommended media works and provide the co-occurrence set 634 to client device 200.

Client device 200 may process 636 the co-occurrence set and provide remote front-end server 300A with a media work request 638 for one or more of the media work identifiers in the co-occurrence set. For example, the initial media work request may specify several media work identifiers in order to fill a playlist buffer in memory 208 of client device.

Remote front-end server 300A may process 640 the media work request, for example by determining whether client device 200 is entitled to receive a copy of the selected media work, for example because the user has subscribed to interactive media service 323B and made any necessary payments for access to the service. As is described below, if a user-account associated with client device 200 has such a sufficient entitlement level then remote front-end server 300A may provide a media work request 642, including the selected media work identifier, to remote interactive media server 300B. However, if a subscription is not associated with client device 200 and it is therefore not entitled to receive the media work, then additional steps may be needed to authorize the media work request, for example using DMTIE service 323D.

Remote interactive media server 300B may process 644 the media work request, for example by searching for the corresponding media work or media works in media database 110.

Remote interactive media server 300B may provide a copy of the requested media work 646 to remote front-end server 300A.

Remote front-end server may 300A provide a copy of the requested media work 646 to client device 200.

Client device 200 may then render 648 the copy of the requested media work.

This process of client device 200 providing media work requests 638 to remote front-end server 300A, obtaining copies of the requested media works 648 from the interactive media server, and rendering 650 the copies of the requested media works may continue indefinitely until the client device obtains 652 an end station request.

Fourth Exemplary Series of Communications

FIG. 6C illustrates an exemplary series of communications 600A between client device 200, remote front-end server 300A, and interactive media server 300B in the context of digital media distribution system 100A obtaining a request to recommend media works based on a seed genre identifier. As is described above in reference to FIGS. 5 and 6A-B, in FIG. 6C communications between remote front-end server 300A and remote media recommendation server 300C are subsumed in the step of obtaining 523 a co-occurrence set.

In the example shown in FIG. 6C client device 200 obtains 654 a genre recommendation request including a seed genre identifier, and provides a recommendation request 656, including a seed genre identifier, to remote front-end server 300A.

Remote front-end server 300A may obtain 523 a co-occurrence set, including identifiers for a plurality of recommended genres and provide the co-occurrence set 658 to client device 200.

Client device 200 may process 660 the co-occurrence set and present 662 one or more recommended genre identifiers obtained from the co-occurrence set, e.g. to a user of the client device.

Client device 200 may obtain 664 a selection of a recommended genre identifier and provides a browse genre request 666, including the selected genre identifier, to remote front-end server 300A.

Remote front-end server 300A may obtain 668 a genre-based media work set, for example by identifying a seed work associated with the provided genre identifier (e.g. the most popular media work associated with the genre identifier, the media work associated with the genre identifier that the user has most recently interacted with, or the like) and obtaining a co-occurring media work set in the manner described above. Remote front-end server 300A may then provide the genre-based media work set 670 to client device 200.

Client device 200 may process 672 the genre-based media work set and present 674 one or more genre-based media work identifiers obtained from the genre-based set, e.g. to a user of the client device.

Client device 200 may obtain 676 a selection of a genre-based media work identifier and provides a media work request 678, including the selected media work identifier, to remote front-end server 300A.

Remote front-end server 300A may process 680 the media work request, for example by searching for the corresponding media work in the media database 110 and determining whether client device 200 is authorized to receive a copy of the selected media work. As is described below, if a user-account associated with client device 200 has a sufficient user entitlement level, through a subscription to interactive media service 323B or otherwise, then remote front-end server 300A may provide a media work request 682, including the selected media work identifier, to remote interactive media server 300B. However, if a subscription is not associated with client device 200, then additional steps may be needed to authorize the media work request (not shown).

Remote interactive media server 300B may process 684 the media work request, for example by searching for the corresponding media work identifier in the media database 110.

Remote interactive media server 300B may provide a copy of the requested media work 686 to remote front-end server 300A.

Remote front-end server 300A may provide a copy of the requested media work 688 to client device 200.

Client device 200 may then process 690 the copy of the requested media work, for example by rendering the media work for presentation to a user of client device, saving the copy of the media work to memory 208 of the client device, or the like.

Remote Recommendation Generation Sub-Routine

Figure 7:
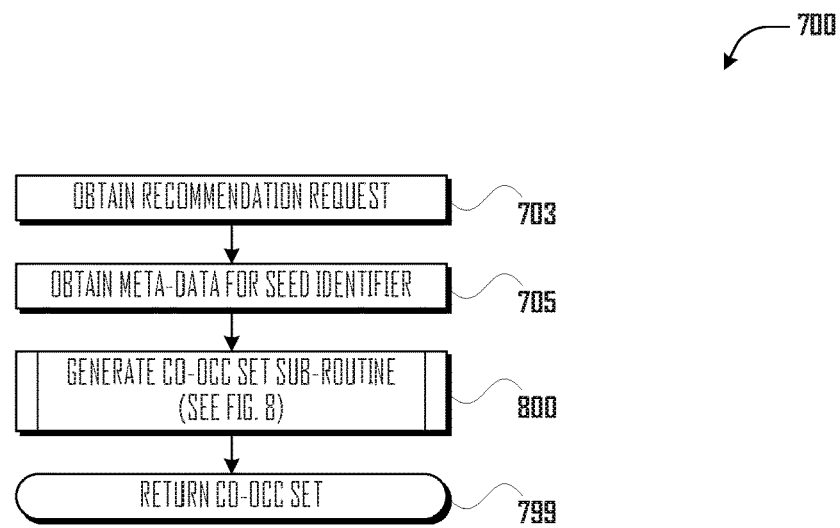
FIG. 7 illustrates a flow-diagram of a recommendation generation sub-routine in accordance with at least one embodiment.

FIG. 7 illustrates a remote recommendation generation sub-routine 700 which may be implemented by user session management service 323A operating on remote front-end server 300A, e.g. in response to a recommendation request obtained via network 108 from an instantiation of client media application 223 operating on a client device 200 as part of an existing user session (or as part of an instantiation of a new user session) being maintained by the remote front-end server.

Remote recommendation generation sub-routine 700 obtains a recommendation request at execution block 703, including a seed identifier, such as a media work identifier, a compilation identifier, a series identifier, an artist or author identifier, a genre identifier, or the like.

Remote recommendation generation sub-routine 700 obtains meta-data associated with the seed-identifier at execution block 705, e.g. from media database 110.

Remote recommendation generation sub-routine 700 provides a generate co-occurrence set request, including the seed identifier and any associated meta-data, to a remote co-occurrence set generation sub-routine 800, described below in reference to FIG. 8, which returns a co-occurrence set to remote recommendation generation sub-routine 700.

Remote recommendation generation sub-routine 700 returns the co-occurrence set, e.g. to the source of the recommendation request, at return block 799.

Remote Co-Occurrence Set Generation Sub-Routine

Figure 8:
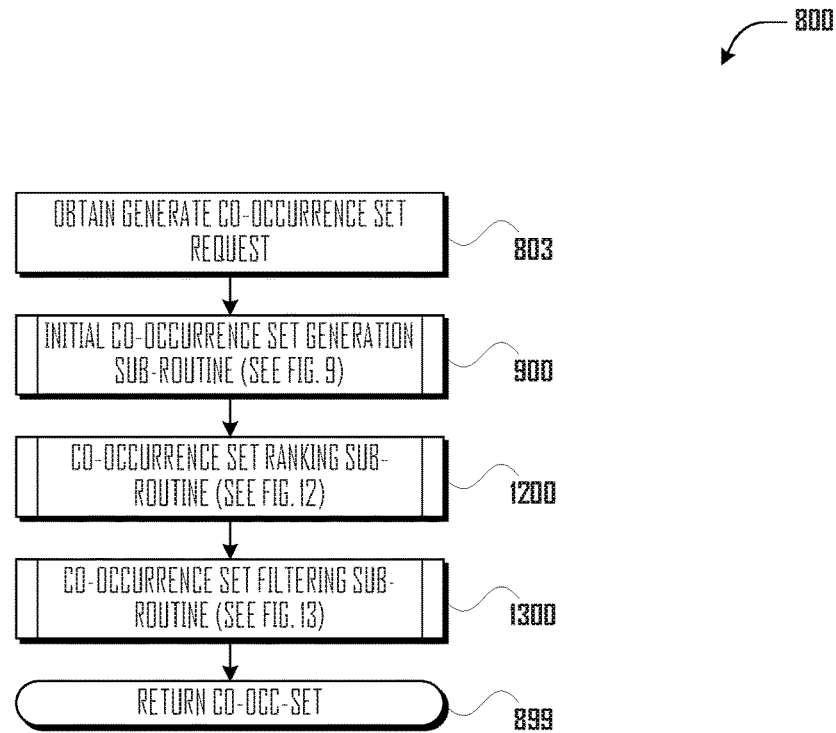
FIG. 8 illustrates a flow-diagram of a co-occurrence set generation sub-routine in accordance with at least one embodiment.

FIG. 8 illustrates remote co-occurrence set generation sub-routine 800 which may be implemented by media recommendation service 323C operating on remote media recommendation server 300C, e.g. in response to a generate co-occurrence set request obtained via network 108 from user session management service 323A operating on remote front-end server 300A.

Remote co-occurrence set generation sub-routine 800 obtains a generate co-occurrence set request at execution block 803, including a seed identifier, such as a media work identifier, a series identifier, an artist or author identifier, a genre identifier, or the like, as well as optional meta-data associated with the seed identifier.

Remote co-occurrence set generation sub-routine 800 provides a generate initial co-occurrence set request, including the seed identifier, to an initial co-occurrence set generation sub-routine 900, described below in reference to FIG. 9, which returns an initial co-occurrence set based on the seed identifier.

Remote co-occurrence set generation sub-routine 800 provides a co-occurrence set ranking request, including the initial co-occurrence set, to a co-occurrence set ranking sub-routine 1200, described below in reference to FIG. 12, which returns a ranked co-occurrence set.

Remote co-occurrence set generation sub-routine 800 provides a co-occurrence set filtering request, including the ranked co-occurrence set as well as optional meta-data, to a co-occurrence set filtering co-occurrence set filtering sub-routine 1300, described below in reference to FIG. 13, which returns a filtered co-occurrence set.

Remote co-occurrence set generation sub-routine 800 returns the filtered, ranked co-occurrence set, e.g. to the source of the generate co-occurrence set request, at return block 899.

Remote Initial Co-Occurrence Set Generation Sub-Routine

Figure 9:
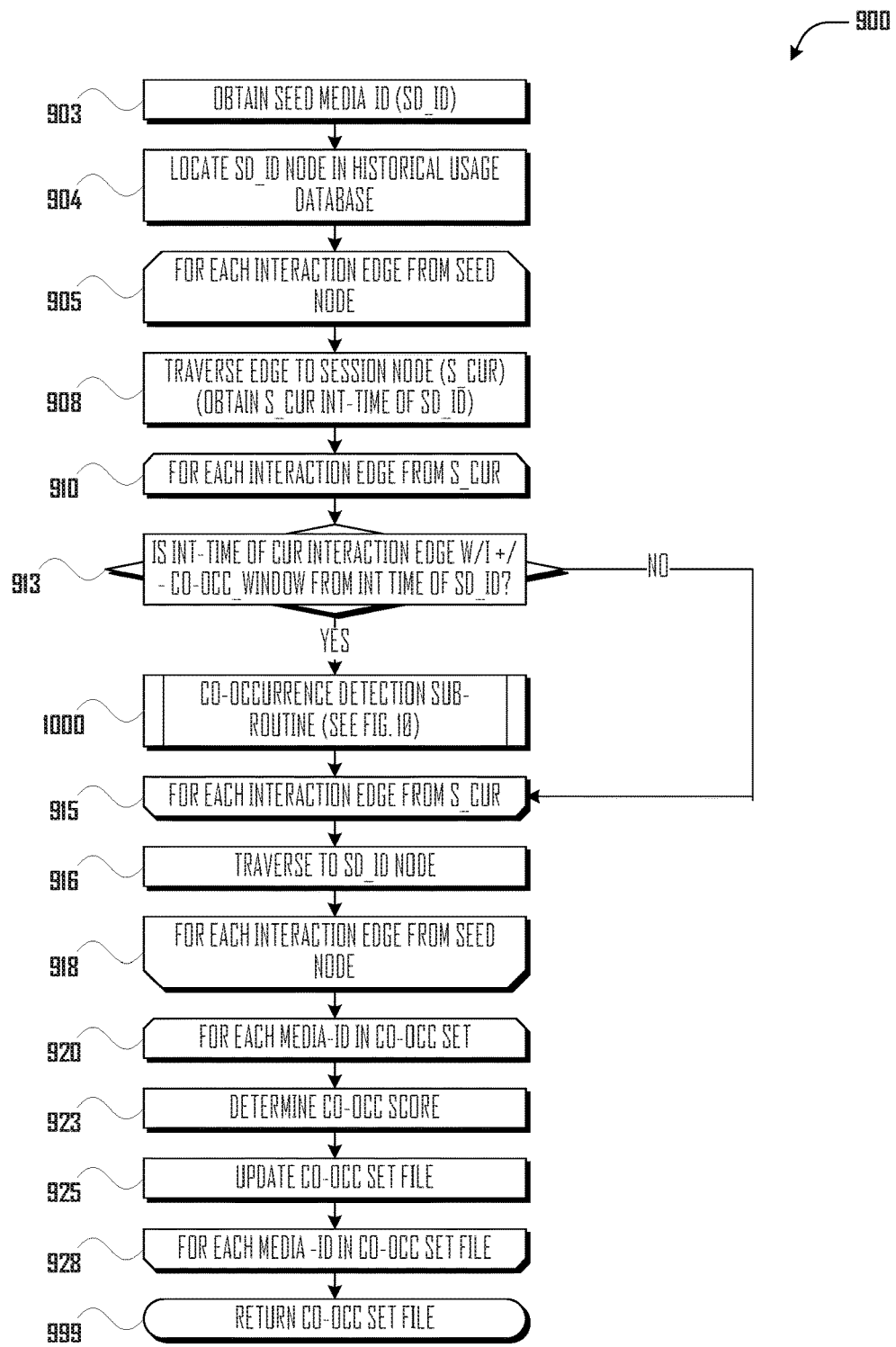
FIG. 9 illustrates a flow diagram of an initial co-occurrence detection sub-routine in accordance with at least one embodiment.

FIG. 9 illustrates an initial co-occurrence set generation sub-routine 900, which may be implemented by media recommendation service 323C operating on remote media recommendation server 300C, e.g. in response to a generate initial co-occurrence set request obtained from remote co-occurrence set generation sub-routine 800.

Initial co-occurrence set generation sub-routine 900 obtains a generate co-occurrence set request, including a seed identifier (SD_ID) at execution block 903.

Initial co-occurrence set generation sub-routine 900 may then locate a node corresponding to the seed identifier (the "seed node") in historical usage database 113 at execution block 904. As described above, the seed node may have one or more interaction edges linking the seed node to various user session nodes in historical usage database 113.

At starting loop block 905, initial co-occurrence set generation sub-routine 900 addresses each interaction edge linking the seed node to a user session node in turn.

Initial co-occurrence set generation sub-routine 900 traverses the current interaction edge to a current user session-node at execution block 908. The current user session-node may be linked to a plurality of media work-nodes via interaction edges, wherein the plurality of media work-nodes may represent specific media works, albums, artists, authors, genres, series, etc., in historical usage database 113 and the interaction edges represent an interaction, such as a search, a play, a skip, a rating, etc., between the user session node and the media work-node.

At starting loop block 910, initial co-occurrence set generation sub-routine 900 addresses each interaction-edge linked to the current user session node in turn.

At decision block 913, if the event time of the current interaction edge is not within a predetermined time window (e.g. plus or minus thirty minutes, plus or minus 60 minutes, etc.) of the event time of the interaction edge between the current user session-node and the seed-node, then initial co-occurrence set generation sub-routine 900 proceeds to ending loop block 915, at which point initial co-occurrence set generation sub-routine 900 will loop back to starting loop block 910 and address the next interaction edge linked to the current user session node.

If, at decision block 913, the event time of the current interaction edge is within the predetermined time window, then initial co-occurrence set generation sub-routine 900 provides a co-occurrence detection request, including an identifier of the current interaction edge, to a co-occurrence detection sub-routine 1000, described below with reference to FIG. 10. Co-occurrence detection sub-routine 1000 may determine whether the current interaction edge qualifies as "co-occurring" between the seed node and the media work-node at the other end of the current interaction edge. If so, co-occurrence detection sub-routine 1000 adds the identifier of the media work-node at the other end of the current interaction edge to the co-occurrence set for the seed node.

At ending loop block 915, initial co-occurrence set generation sub-routine 900 loops back to starting loop block 910 to address the next interaction edge linked to the current user session node.

After each interaction edge linked to the current user session node has been addressed, initial co-occurrence set generation sub-routine 900 traverses back to the seed node at execution block 916.

At ending loop block 918, initial co-occurrence set generation sub-routine 900 loops back to starting loop block 905 and addresses the next interaction edge linked to the seed node. As is described below, after each interaction edge linked to the seed node has been addressed, the co-occurrence set will have been populated with identifying indicia and corresponding co-occurrence magnitude for media work-nodes that co-occur with the seed node.

At starting loop block 920, initial co-occurrence set generation sub-routine 900 addresses each media work-node identifier in the co-occurrence set in turn.

Initial co-occurrence set generation sub-routine 900 determines a co-occurrence score for the current media work-node identifier at execution block 923, for example in accordance with the techniques described above with respect to FIG. 4, and updates the corresponding entry in the co-occurrence set at execution block 925.

At ending loop block 928, initial co-occurrence set generation sub-routine 900 loops back to starting loop block 920 and addresses the next media work-node identifier in the co-occurrence set.

After a co-occurrence score has been determined for each co-occurring media work-node, initial co-occurrence set generation sub-routine 900 returns the co-occurrence set, e.g. to remote co-occurrence set generation sub-routine 800, at return block 999.

Remote Co-Occurrence Detection Sub-Routine

Figure 10:
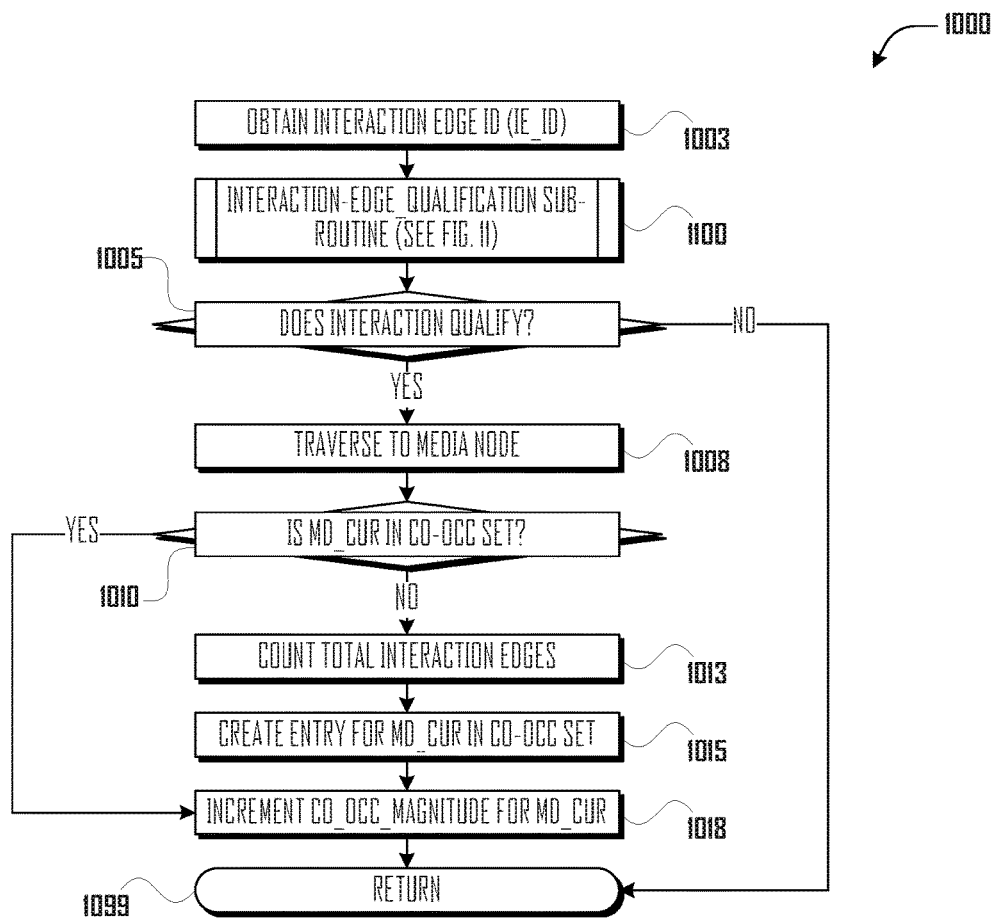
FIG. 10 illustrates a flow diagram of a co-occurrence detection sub-routine in accordance with at least one embodiment.

FIG. 10 illustrates co-occurrence detection sub-routine 1000, which may be implemented by media recommendation service 323C operating on remote media recommendation server 300C, e.g. in response to a co-occurrence detection request obtained from initial co-occurrence set generation sub-routine 900. Co-occurrence detection sub-routine 1000 may determine whether a given node, e.g. a media work-node in historical usage database 113, co-occurred with a seed node during the user session represented by the current user session-node and, if so, makes an appropriate entry for the corresponding media work-node in the co-occurrence set.

Co-occurrence detection sub-routine 1000 obtains a co-occurrence detection request, e.g. from initial co-occurrence set generation sub-routine 900, including an interaction edge identifier at execution block 1003.

Co-occurrence detection sub-routine 1000 then provides an interaction edge qualification request to an interaction-edge qualification sub-routine 1100, described below in reference to FIG. 11. Interaction-edge qualification sub-routine 1100 tests whether the identified interaction edge meets certain criteria and returns a true or false result.

At decision block 1005, if interaction-edge qualification sub-routine 1100 returns a "false" result, then co-occurrence detection sub-routine 1000 proceeds to return at block 1099 and terminates. If, at decision block 1005, co-occurrence detection sub-routine 1000 returns a "true" result then the media work-node at the other end of the current interaction edge co-occurred with the seed node during the current user session and co-occurrence detection sub-routine 1000 proceeds to execution block 1008.

Co-occurrence detection sub-routine 1000 traverses the current interaction edge to the co-occurring media work-node at execution block 1008.

At decision block 1010, if the identifying indicia of the co-occurring media work-node is already in the co-occurrence set, then co-occurrence detection sub-routine 1000 proceeds to execution block 1018, described below. If the identifying indicia of the co-occurring media work-node is not already in the co-occurring media work set, then co-occurrence detection sub-routine 1000 proceeds to execution block 1013.

Co-occurrence detection sub-routine 1000 counts the total number of positive interaction edges linked to the co-occurring media work-node at execution block 1013 and creates an entry for the co-occurring media work-node in the co-occurrence set, including the co-occurring media work-nodes' identifying indicia and total the number of positive interaction edges at execution block 1015.

Co-occurrence detection sub-routine 1000 increments the current media work-node's co-occurrence magnitude at execution block 1018.

Co-occurrence detection sub-routine 1000 terminates, e.g. by returning to co-occurrence set generation sub-routine 800, at termination block 1099.

Remote Interaction-Edge Qualification Sub-Routine

Figure 11:
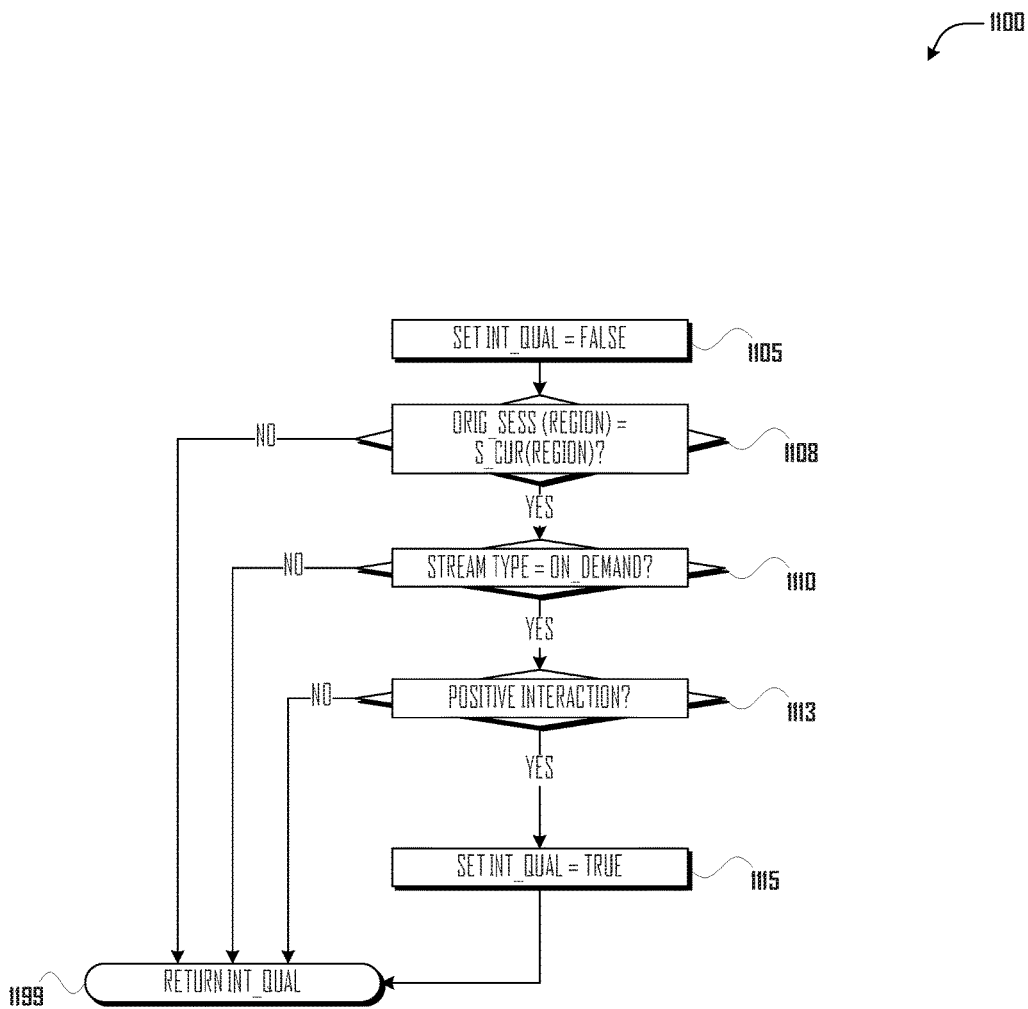
FIG. 11 illustrates a flow diagram of an interaction-edge qualification sub-routine in accordance with at least one embodiment.

FIG. 11 illustrates interaction-edge qualification sub-routine 1100, which may be implemented by media recommendation service 323C operating on remote media recommendation server 300C, e.g. in response to an interaction edge qualification request obtained from co-occurrence detection sub-routine 1000. Interaction-edge qualification sub-routine 1100 may determine whether an interaction edge meets certain criteria necessary to represent a co-occurrence between a media work-node and the seed node.

Interaction-edge qualification sub-routine 1100 may set an interaction qualification value (INT_QUAL) to "False" at execution block 1105.

At decision block 1108, if the current user session-node and the user session-node that originated the generate recommendation request are not from the same geographic region (e.g. the same country of origin), then the interaction edge does not qualify and interaction-edge qualification sub-routine 1100 proceeds to return block 1199. Otherwise, interaction-edge qualification sub-routine 1100 proceeds to decision block 1110.

At decision block 1110, if the interaction edge between the current session-node and the current media work-node was not an "on-demand" interaction (e.g. the interaction originated as part of an automatically generated playlist), then the interaction edge does not qualify and interaction-edge qualification sub-routine 1100 proceeds to return block 1199. Otherwise, interaction-edge qualification sub-routine 1100 proceeds to decision block 1113.

At decision block 1113, if the current interaction edge represents a negative interaction, e.g. a negative user rating, a "skip" within the first thirty seconds, or the like), then the interaction edge does not qualify and interaction-edge qualification sub-routine 1100 proceeds to return block 1199. Otherwise, interaction-edge qualification sub-routine 1100 proceeds to execution block 1115.

At execution block 1115, interaction-edge qualification sub-routine 1100 sets the stream qualification value to "True" and then proceeds to return block 1199.

At return block 1199, interaction-edge qualification sub-routine 1100 returns the current value of the stream qualification value, e.g. to co-occurrence detection sub-routine 1000.

Remote Co-Occurrence Set Ranking Sub-Routine

Figure 12:
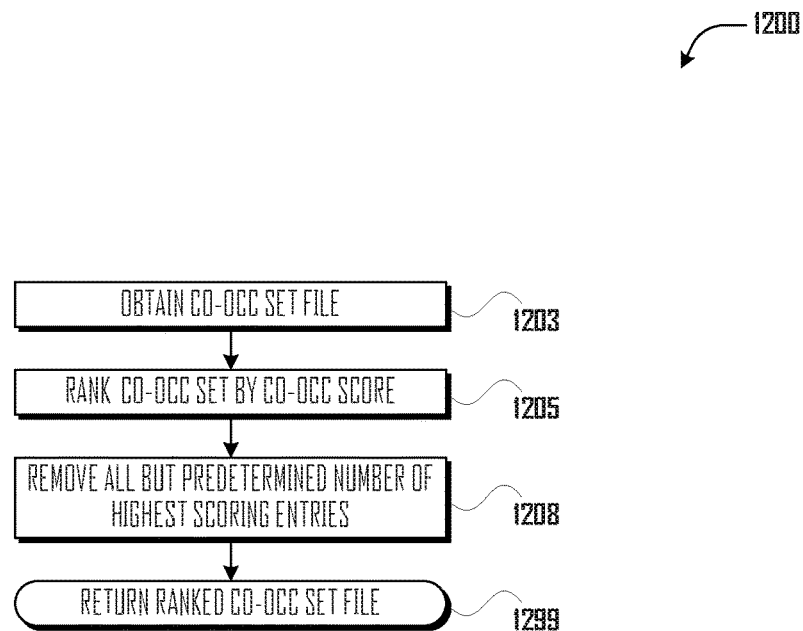
FIG. 12 illustrates a flow diagram of a co-occurrence set ranking sub-routine in accordance with at least one embodiment.

FIG. 12 illustrates co-occurrence set ranking sub-routine 1200 in accordance with various embodiments, which may be implemented by media recommendation service 323C operating on remote media recommendation server 300C, e.g. in response to a co-occurrence set ranking request obtained from remote co-occurrence set generation sub-routine 800. Co-occurrence set ranking sub-routine 1200 may obtain a co-occurrence set containing a plurality of co-occurring media work-node identifiers and associated co-occurrence scores with respect to a seed node and may assign some or all of the co-occurring media work-node identifiers a relative co-occurrence ranking within the co-occurrence set.

Co-occurrence set ranking sub-routine 1200 obtains a co-occurrence set, e.g. from remote co-occurrence set generation sub-routine 800, at execution block 1203.

Co-occurrence set ranking sub-routine 1200 ranks each co-occurring media work-node identifier in the co-co-occurrence set at execution block 1205. A co-occurring media work-node's co-occurrence ranking may be based on the co-occurrence score (e.g. co-occurring media work-nodes with a higher co-occurrence score may receive a higher co-occurrence ranking than co-occurring media work-nodes with a lower co-occurrence score) as well as other factors.

Co-occurrence set ranking sub-routine 1200 then identifies a predetermined number (e.g. 1000) of the highest ranked co-occurring media work-nodes and removes the remaining, lower ranking co-occurring media work-nodes from the co-occurring media work set at execution block 1208.

Co-occurrence set ranking sub-routine 1200 returns the ranked co-occurrence set, e.g. to remote co-occurrence set generation sub-routine 800, at return block 1299.

Remote Co-Occurrence Set Filtering Sub-Routine

Figure 13:
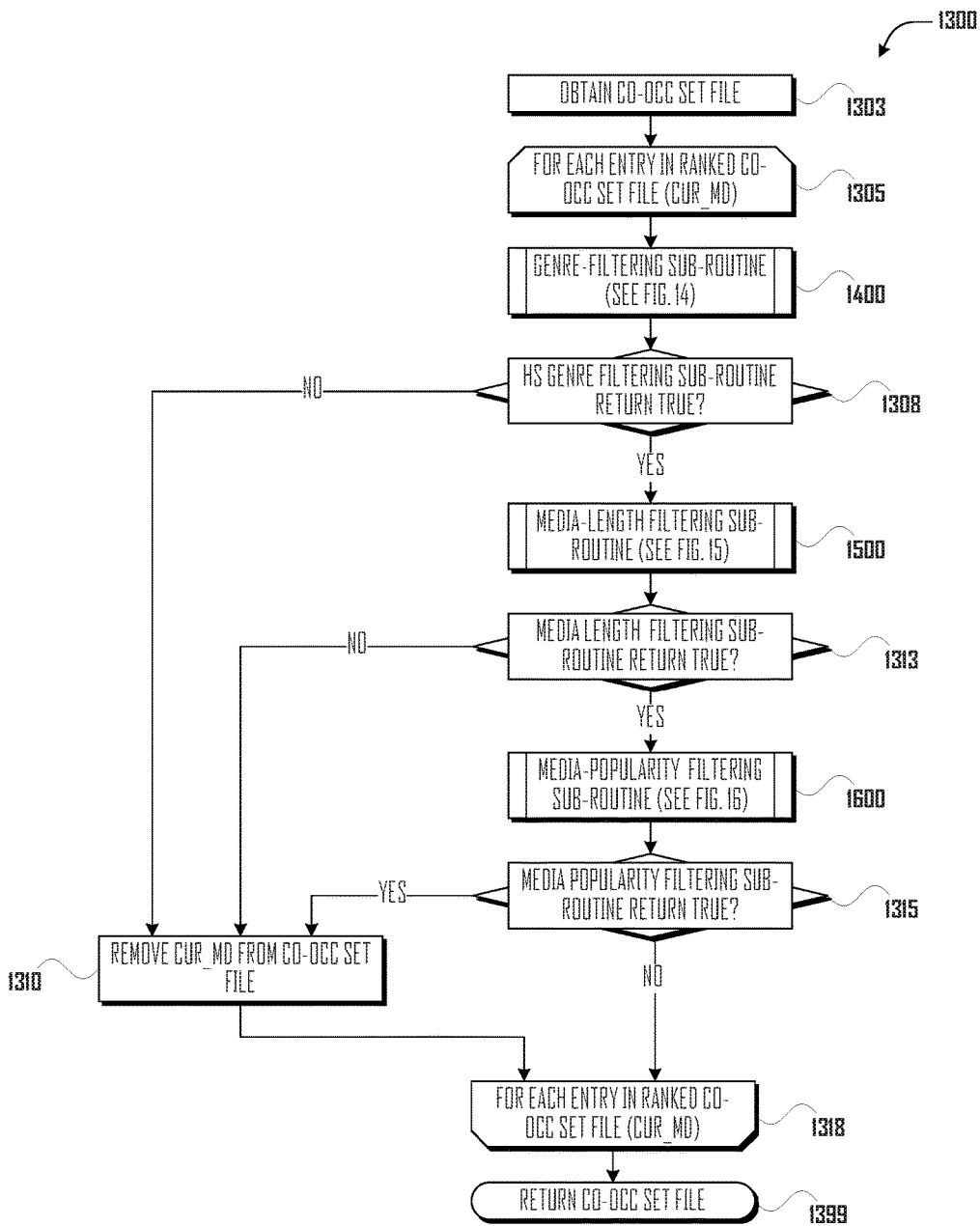
FIG. 13 illustrates a flow diagram of a co-occurrence set filtering sub-routine in accordance with at least one embodiment.

FIG. 13 illustrates co-occurrence set filtering sub-routine 1300, which may be implemented by media recommendation service 323C operating on remote media recommendation server 300C, e.g. in response to a co-occurrence set filtering request obtained from remote co-occurrence set generation sub-routine 800. Co-occurrence set filtering sub-routine 1300 may obtain a co-occurrence set containing a plurality of co-occurring media work-node identifiers and may remove some of the co-occurring media work-node identifiers based on a variety of criteria, described below.

In the illustrated embodiment, co-occurrence set filtering sub-routine 1300 applies three filtering sub-routines: a high-specificity genre filtering sub-routine 1400, described below in reference to FIG. 14; a media-length filtering sub-routine 1500, described below in reference to FIG. 15; and a media popularity filtering sub-routine 1600, described below in reference to FIG. 16. These three filtering sub-routines are shown by way of example and assume the co-occurring media work-nodes identified in the co-occurrence set correspond to specific media works, e.g. music media works, video media works, or the like. In situations where the co-occurring media work-nodes identified in the co-occurrence set correspond to genres of media works or sets of media works, e.g. music albums, television series, or the like, alternative and/or additional filtering techniques (not shown) may be applied to the co-occurrence set. Additional filtering techniques could be based on non-technical rules, such as restrictions imposed by rights-holders in exchange for a license to the media work.

Co-occurrence set filtering sub-routine 1300 obtains a co-occurrence set filtering request, which may include a co-occurrence set identifying a plurality of co-occurring media work-nodes at execution block 1303.

At starting loop block 1305, co-occurrence set filtering sub-routine 1300 addresses each co-occurring media work-node in the co-occurrence set in turn.

Co-occurrence set filtering sub-routine 1300 may then provide a node filtering request, including the current co-occurring media work-node identifier, to high-specificity genre-filtering sub-routine 1400, which returns a true or false value.

At decision block 1308, if co-occurrence set filtering sub-routine 1300 obtained a false value from high-specificity genre filtering sub-routine 1400, then co-occurrence set filtering sub-routine 1300 proceeds to execution block 1310; if co-occurrence set filtering sub-routine 1300 obtained a true value from high-specificity genre filtering sub-routine 1400, then co-occurrence set filtering sub-routine 1300 may provide a node filtering request, including the current co-occurring media work-node identifier, to media-length filtering sub-routine 1500, which returns a true or false value.

At decision block 1313, if co-occurrence set filtering sub-routine 1300 obtained a false value from media-length filtering sub-routine 1500, then co-occurrence set filtering sub-routine 1300 proceeds to execution block 1310; if co-occurrence set filtering sub-routine 1300 obtained a true value from media-length filtering sub-routine 1500, then co-occurrence set filtering sub-routine 1300 may provide a node filtering request, including the current co-occurring media work-node identifier, to media popularity filtering sub-routine 1600, which returns a true or false value.

At decision block 1315, if co-occurrence set filtering sub-routine 1300 obtained a false value from media popularity filtering sub-routine 1600, then co-occurrence set filtering sub-routine 1300 proceeds to execution block 1310; if co-occurrence set filtering sub-routine 1300 obtained a true value from media-length filtering sub-routine 1500, then co-occurrence set filtering sub-routine 1300 may proceed to ending loop block 1318.

If co-occurrence set filtering sub-routine 1300 reaches execution block 1310, co-occurrence set filtering sub-routine 1300 removes the current co-occurring media work-node from the co-occurrence set.

At ending loop block 1318, co-occurrence set filtering sub-routine 1300 loops back to starting loop block 1305 and addresses the next co-occurring media work-node in the co-occurrence set.

Co-occurrence set filtering sub-routine 1300 returns the filtered co-occurring media work set, e.g. to remote co-occurrence set generation sub-routine 800, at return block 1399.

Remote High-Specificity Genre Filtering Sub-Routine

Figure 14:
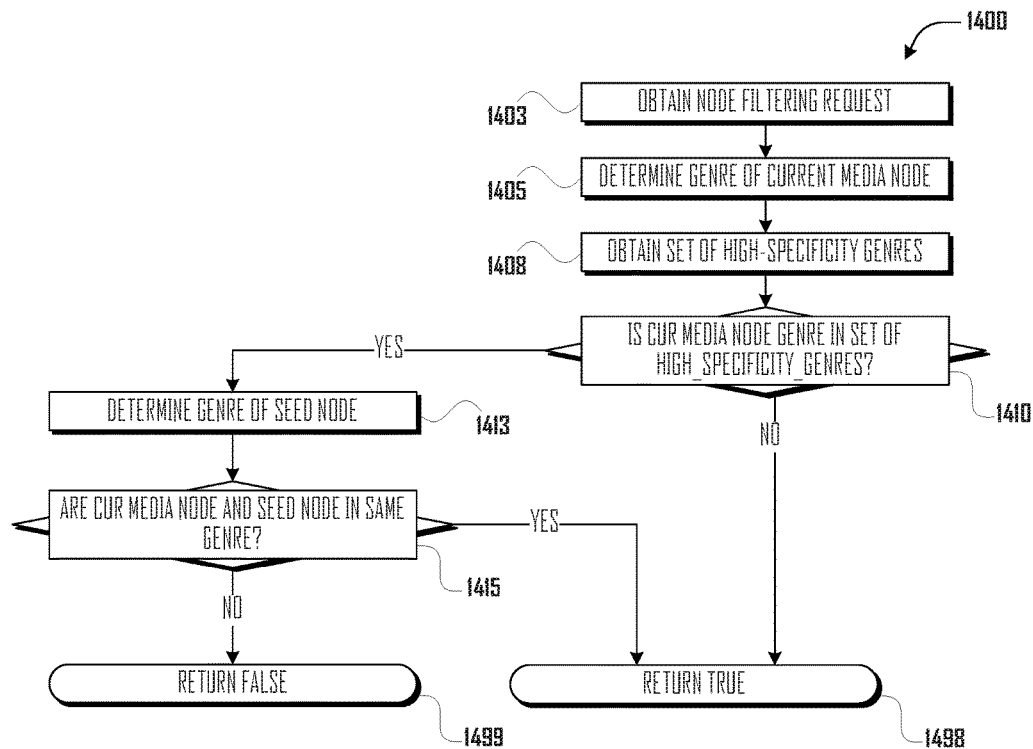
FIG. 14 illustrates a flow diagram of a high-specificity genre filtering sub-routine in accordance with at least one embodiment.

FIG. 14 illustrates high-specificity genre filtering sub-routine 1400, which may be implemented by media recommendation service 323C operating on remote media recommendation server 300C, e.g. in response to a node filtering request obtained from co-occurrence set filtering sub-routine 1300. High-specificity genre filtering sub-routine 1400 may obtain a media work-node identifier corresponding to a particular media work (e.g. a song, a video, or the like) and may return a true or false value depending on characteristics of the media work-node identified by the media work-node identifier, as is described below.

High-specificity genre filtering sub-routine 1400 may obtain a node filtering request at execution block 1403. The node filtering request may include a co-occurring media work-node identifier.

High-specificity genre filtering sub-routine 1400 may determine the genre of the identified media work-node at execution block 1405. For example, there may be various descriptive variables associated with those media work-nodes in historical usage database 113 corresponding to specific media works. Examples of such variables may be author, length, user rating, genre, popularity, and the like. In such an embodiment, high-specificity genre filtering sub-routine 1400 may query the media work-node to determine the value of the node's genre variable.

High-specificity genre filtering sub-routine 1400 may obtain a set of high-specificity genres at execution block 1408. High-specificity genres are genres where co-occurrence between an arbitrarily chosen media work and a media work in a high-specificity genre may be due to user affinity towards the high-specificity genre rather than a particular media work within that genre. Examples of high-specificity genres in audio works include holiday music, religious music, sound tracks, karaoke tracks, interviews, comedy, remixes, acoustical, instrumental, and the like. For example, there may be various descriptive variables associated with those media work-nodes in historical usage database 113 corresponding to categories of media works. In some embodiments, one such variable may be a true/false high-specificity genre flag. In such an embodiment, high-specificity genre filtering sub-routine 1400 may query each genre media work-node in historical usage database 113 to determine the value of each node's high-specificity genre flag variable and, if the high-specificity genre flag value is true, add the corresponding genre to the set of high-specificity genres.

At decision block 1410, if the current media work-node's genre is found in the set of high-specificity genres, then high-specificity genre filtering sub-routine 1400 proceeds to execution block 1413. If the current media work-node's genre is not found in the set of high-specificity genres, then high-specificity genre filtering sub-routine 1400 proceeds to return block 1498.

High-specificity genre filtering sub-routine 1400 returns a true value, e.g. to co-occurrence set filtering sub-routine 1300, at return block 1498.

High-specificity genre filtering sub-routine 1400 may determine the genre of the seed node, e.g. by querying the seed node to determine the value of the seed node's genre variable at execution block 1413.

At decision block 1415, if the current media work-node and the seed node are in the same genre, then high-specificity genre filtering sub-routine 1400 proceeds to return block 1498; if the current media work-nodes and the seed node are not in the same genre, then high-specificity genre filtering sub-routine 1400 proceeds to return block 1499.

High-specificity genre filtering sub-routine 1400 returns a false value, e.g. to co-occurrence set filtering sub-routine 1300, at return block 1499.

Remote Media-Length Filtering Sub-Routine

Figure 15:
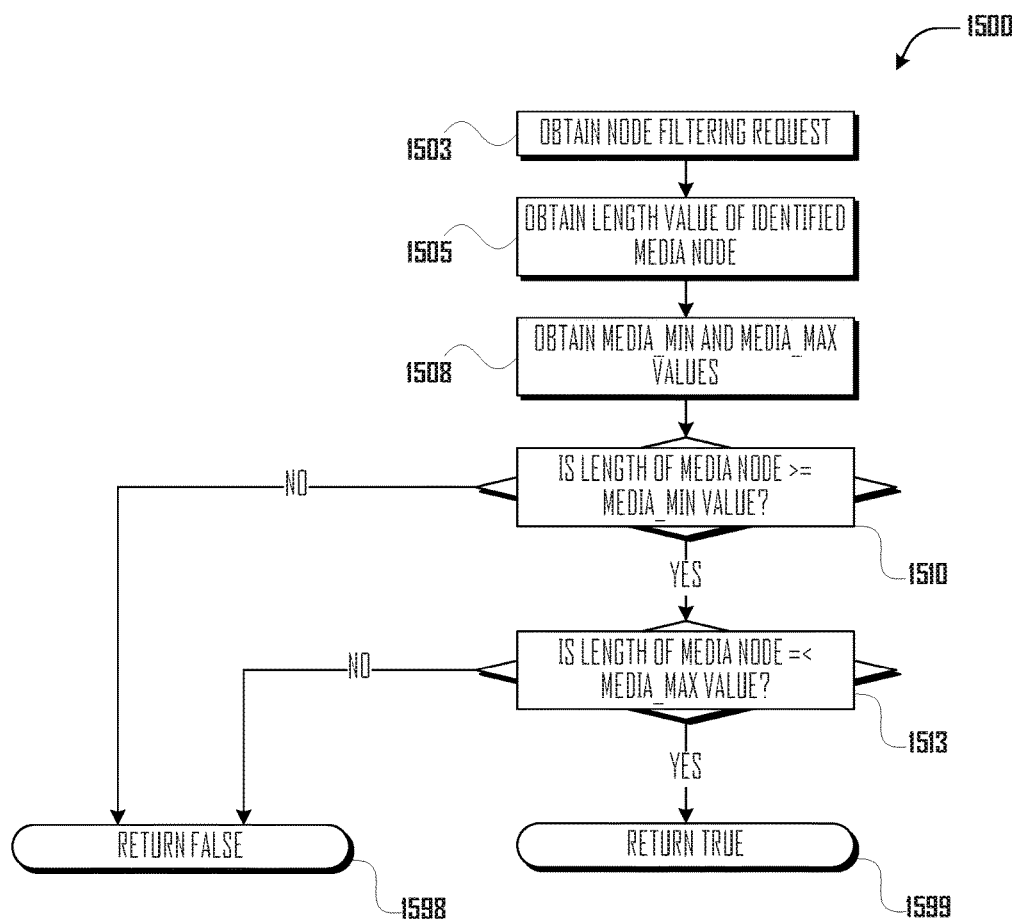
FIG. 15 illustrates a flow diagram of a media length filtering sub-routine in accordance with at least one embodiment.

FIG. 15 illustrates media-length filtering sub-routine 1500, which may be implemented by media recommendation service 323C operating on remote media recommendation server 300C, e.g. in response to a node filtering request obtained from co-occurrence set filtering sub-routine 1300. Media-length filtering sub-routine 1500 may obtain a media work-node identifier corresponding to a particular media work (e.g. a song, a video, or the like) and may return a true or false value depending on characteristics of the media work-node identified by the media work-node identifier, as is described below.

Media-length filtering sub-routine 1500 obtains a node filtering request at execution block 1503. The node filtering request may include a co-occurring media work-node identifier.

Media-length filtering sub-routine 1500 may obtain a length value corresponding to the duration of the media work associated with the identified co-occurring media work-node at execution block 1505. For example, there may be various descriptive variables associated with those media work-nodes in historical usage database 113 corresponding to specific media works. Examples of such variables may be author, length, user rating, genre, popularity, and the like. In such an embodiment, media-length filtering sub-routine 1500 may query the media work-node to determine the value of the node's length variable.

Media-length filtering sub-routine 1500 may obtain a minimum media length value and a maximum media length value at execution block 1508.

At decision block 1510, if the current media work-node's length value is greater than or equal to the minimum media length value, then media-length filtering sub-routine 1500 proceeds to decision block 1513. If the current media work-node's length value is less than the minimum media length value, then media-length filtering sub-routine 1500 proceeds to return block 1598.

At decision block 1513, if the current media work-node's length value is greater than the maximum media length value, then media-length filtering sub-routine 1500 proceeds to return block 1598; if the current media work-node's length value is less than or equal to the maximum media length value, then media-length filtering sub-routine 1500 proceeds to return block 1599.

Media-length filtering sub-routine 1500 returns a false value, e.g. to co-occurrence set filtering sub-routine 1300, at return block 1598.

Media-length filtering sub-routine 1500 returns a true value, e.g. to co-occurrence set filtering sub-routine 1300, at return block 1599.

Remote Media Popularity Filtering Sub-Routine

Figure 16:
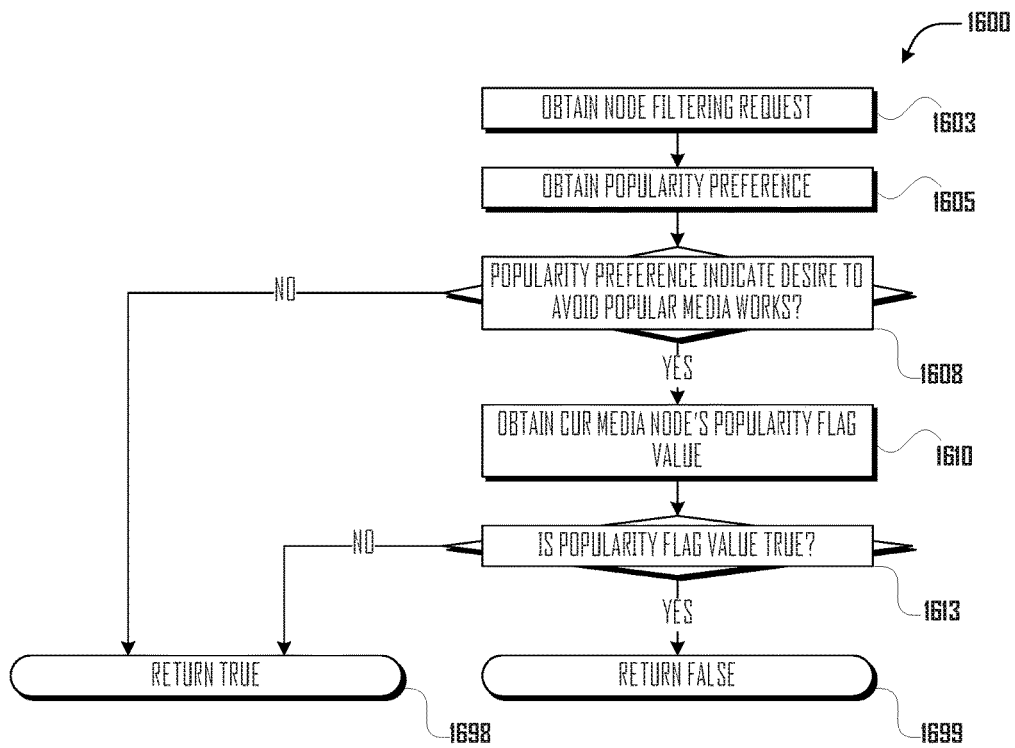
FIG. 16 illustrates a flow diagram of a media popularity filtering sub-routine in accordance with at least one embodiment.

FIG. 16 illustrates media popularity filtering sub-routine 1600, which may be implemented by media recommendation service 323C operating on remote media recommendation server 300C, e.g. in response to a node filtering request obtained from co-occurrence set filtering sub-routine 1300. Media popularity filtering sub-routine 1600 may obtain a media work-node identifier corresponding to a particular media work (e.g. a song, a video, or the like) and may return a true or false value depending on characteristics of the media work-node identified by the media work-node identifier, as is described below.

Media popularity filtering sub-routine 1600 obtains a node filtering request at execution block 1603. The node filtering request may include a co-occurring media work-node identifier.

Media popularity filtering sub-routine 1600 may obtain a true or false popularity preference corresponding to a user preference associated with the recommendation request at execution block 1605. For example, a user may have specified a preference related to whether the co-occurrence set should include media works that are considered popular (e.g. "top 40" or "most downloaded"). In such an embodiment, media popularity filtering sub-routine 1600 may query the user session node associated with the recommendation request to determine the value of a popularity flag variable.

At decision block 1608, if the popularity preference associated with the recommendation request indicates the corresponding user preference is to avoid popular media works, media popularity filtering sub-routine 1600 proceeds to execution block 1610; if the popularity preference associated with the recommendation request indicates corresponding user preference is not to avoid popular media works, then media popularity filtering sub-routine 1600 proceeds to return block 1698.

Media popularity filtering sub-routine 1600 returns a true value, e.g. to co-occurrence set filtering sub-routine 1300, at return block 1698.

Media popularity filtering sub-routine 1600 may obtain a popularity flag value associated with the identified media work-node at execution block 1610. For example, there may be various descriptive variables associated with those media work-nodes in historical usage database 113 corresponding to specific media works. Examples of such variables may be author, length, user rating, genre, popularity, and the like. In such an embodiment, media popularity filtering sub-routine 1600 may query the media work-node to determine a true or false value of the media work-node's popularity variable.

At decision block 1613, if the current media work-node's popularity variable is false, indicating the associated media work is not considered popular, then media popularity filtering sub-routine 1600 proceeds to return block 1698. If the current media work-node's popularity flag value is true, indicating the associated media work is considered popular, media popularity filtering sub-routine 1600 proceeds to return block 1699.

Media popularity filtering sub-routine 1600 returns a false value, e.g. to co-occurrence set filtering sub-routine 1300, at return block 1699.

Media Work Recommendation Routine

Figure 17:
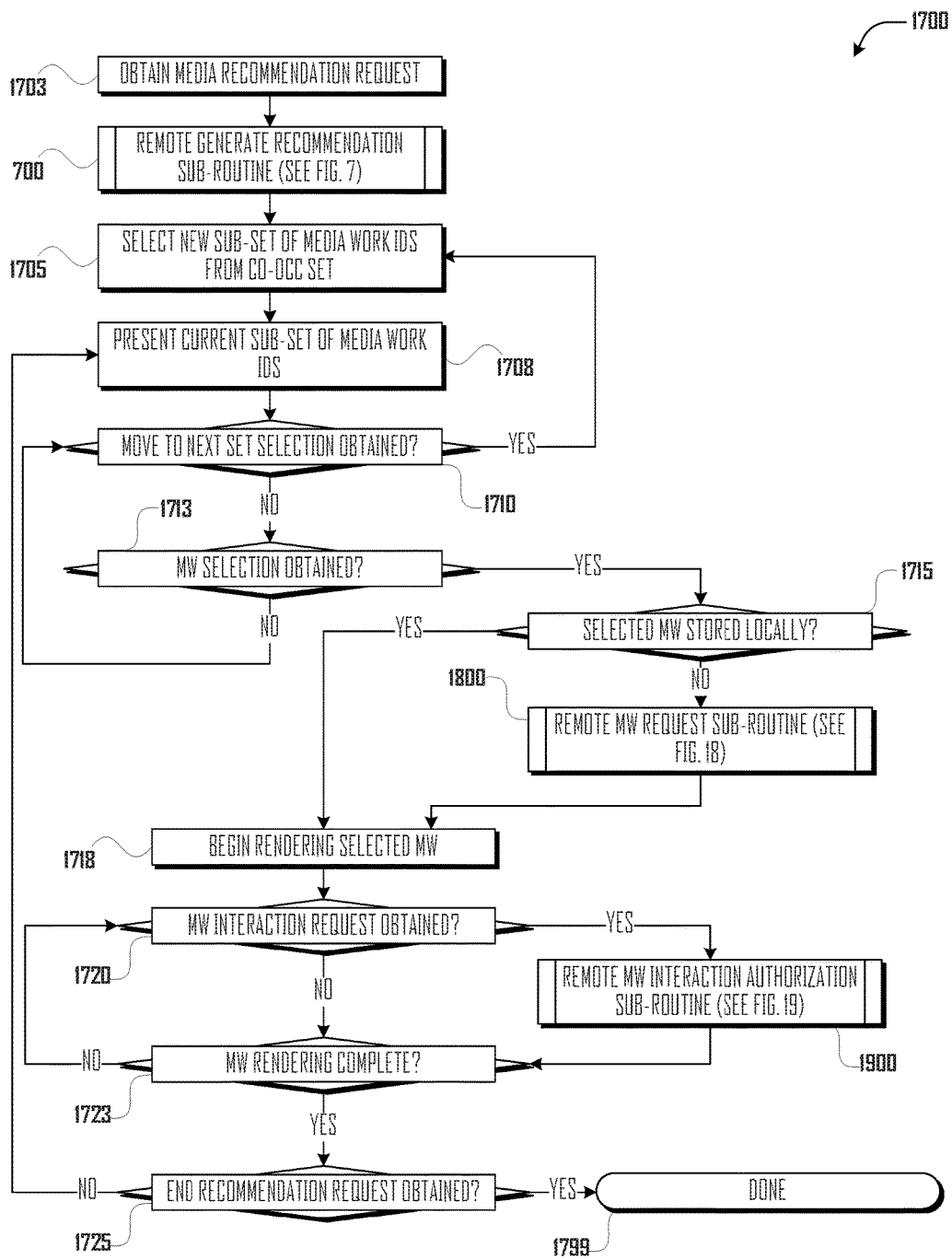
FIG. 17 illustrates a flow diagram of a media work recommendation routine in accordance with at least one embodiment.

FIG. 17 illustrates a media work recommendation routine 1700, which may be implemented by client media application 223 operating on a client device 200, e.g. in response to a media recommendation request, e.g. obtained from a user of the client device via user input 210. The media recommendation request may include a media work identifier corresponding to a particular media work (e.g. a song, a video, or the like).

Media work recommendation routine 1700 obtains a media recommendation request at execution block 1703. The media recommendation request may include a media work identifier corresponding to a particular media work.

Media work recommendation routine 1700 provides a generate recommendation request to remote recommendation generation sub-routine 700, described above with reference to FIG. 7. The recommendation request may include the media work identifier obtained as part of the media recommendation request. Media work recommendation routine 1700 may return a co-occurrence set including a plurality of media work identifiers and associated meta-data, including author, title, length, album (if applicable), series (if applicable), performer (if applicable), co-occurrence ranking, and the like.

Media work recommendation routine 1700 selects a sub-set of media work identifiers from the co-occurrence set at execution block 1705. The selection may be random or may be based on certain criteria, such as co-occurrence ranking, author, title, etc.

Media work recommendation routine 1700 presents the selected sub-set of media work identifiers at execution block 1708. For example, media work recommendation routine 1700 may cause client device 200 to render human-perceptible versions of the selected sub-set media work identifiers via optional display 213. Media work recommendation routine 1700 may further cause client device 200 to render the human perceptible version of the media work identifiers as part of a user interface which also includes options for permitting a user to indicate a selection of a particular media work identifier from the selected sub-set of media work identifiers as well as for permitting a user to indicate a desire to see a different or additional sub-set of media work identifiers, for example via optional user input 210.

At decision block 1710, if a user has indicated a desire to see a different or additional sub-set of media work identifiers, then media work recommendation routine 1700 may return to execution block 1705; otherwise media work recommendation routine 1700 may proceed to decision block 1713.

At decision block 1713, if a user has provided a selection of a particular media work identifier, media work recommendation routine 1700 may proceed to decision block 1715; otherwise media work recommendation routine 1700 returns to decision block 1710.

Figure 18:
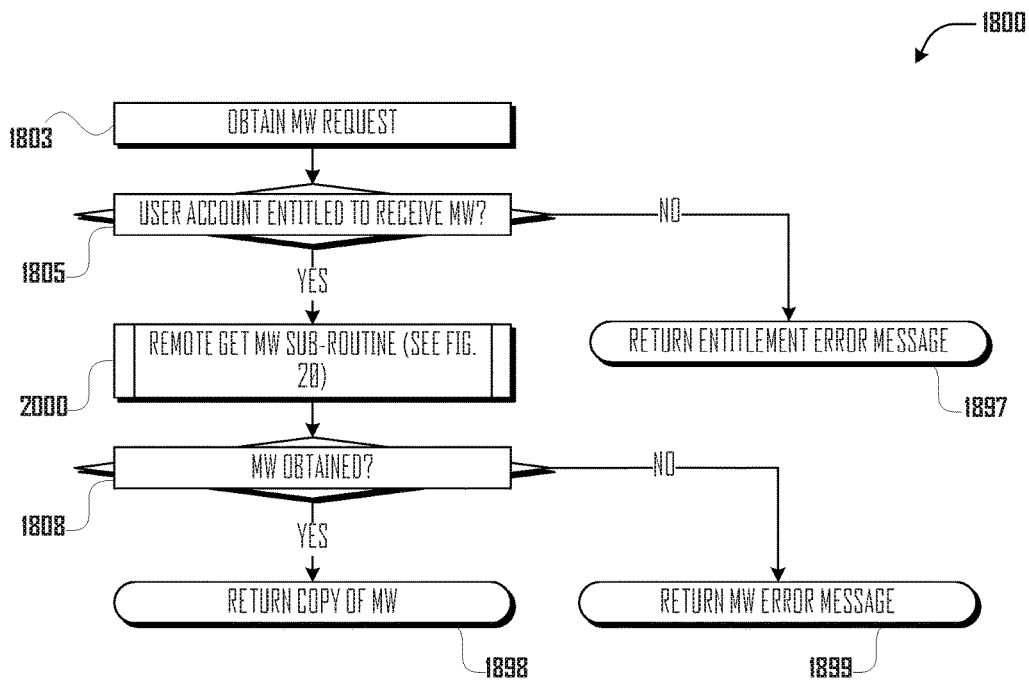
FIG. 18 illustrates a flow diagram of a remote media work request sub-routine in accordance with at least one embodiment.

At decision block 1715, if a complete copy of the media work corresponding to the selected media work identifier is stored locally on the client device, e.g. in memory 208 or in computer readable storage medium 228, media work recommendation routine 1700 may proceed to execution block 1718; otherwise, media work recommendation routine 1700 provides a get media work request, including the selected media work identifier, to a remote media work request sub-routine 1800, described below with reference to FIG. 18. Remote media work request sub-routine 1800 may return a copy of the media work corresponding to the selected media work identifier. Media work recommendation routine 1700 may then proceed to execution block 1718.

Media work recommendation routine 1700 begins rendering the media work corresponding to the selected media work identifier at execution block 1718, for example via optional display 213 and/or optional speaker 215 of client device 200. The rendering of the media work may also include options for permitting a user to indicate a desire to engage in additional interactions with the media work being rendered or to end the recommendation process, effectively terminating media work recommendation routine 1700, for example via optional user input 210.

At decision block 1720, if media work recommendation routine 1700 obtains a media work interaction request, for example via optional user input 210, media work recommendation routine 1700 may provide a media work interaction request to a remote media work interaction authorization sub-routine 1900, described below in reference to FIG. 19; otherwise media work recommendation routine 1700 proceeds to decision block 1723. One example of such a media work interaction request is to generate media work recommendations based on the media work currently being rendered.

At decision block 1723, if the rendering of the media work is complete, media work recommendation routine 1700 proceeds to decision block 1725; otherwise media work recommendation routine 1700 returns to decision block 1720.

At decision block 1725, if media work recommendation routine 1700 obtains an end recommendation process request, e.g. via optional user input 210, media work recommendation routine 1700 terminates at ending block 1799; otherwise media work recommendation routine 1700 returns to execution block 1708.

Remote Media Work Request Sub-Routine

FIG. 18 illustrates remote media work request sub-routine 1800, which may be implemented by user session management service 323A operating on remote front-end server 300A, e.g. in response to a get media work request obtained from an instantiation of client media application 223 operating on a client device 200. The get media work request may include a media work identifier corresponding to a particular media work (e.g. a song, a video, or the like) and a user session identifier associated with the instantiation of client media application 223 and a user-account.

Media work request sub-routine 1800 obtains a get media work request at execution block 1803. The get media work request may include a media work identifier and a user session identifier.

At decision block 1805, if the user-account associated with the user session identifier is entitled to obtain a copy of the requested media work, for example because the user account is associated with a subscription to interactive media service 323B, media work request sub-routine 1800 may call a get media work sub-routine 2000, described below in reference to FIG. 20; otherwise media work request sub-routine 1800 may proceed to return block 1897.

At decision block 1808, if a copy of the requested media work was obtained from get media work sub-routine 2000, then media work request sub-routine 1800 may proceed to return block 1898; otherwise media work request sub-routine 1800 may proceed to return block 1899.

Media work request sub-routine 1800 may return an entitlement error message, e.g. to routine 700, at return block 1897.

Media work request sub-routine 1800 may return a copy of the media work corresponding to the media work identifier, e.g. to routine 700, at return block 1898.

Media work request sub-routine 1800 may return a media work error message, e.g. to routine 700, at return block 1899.

Remote Media Work Interaction Authorization Sub-Routine

Figure 19:
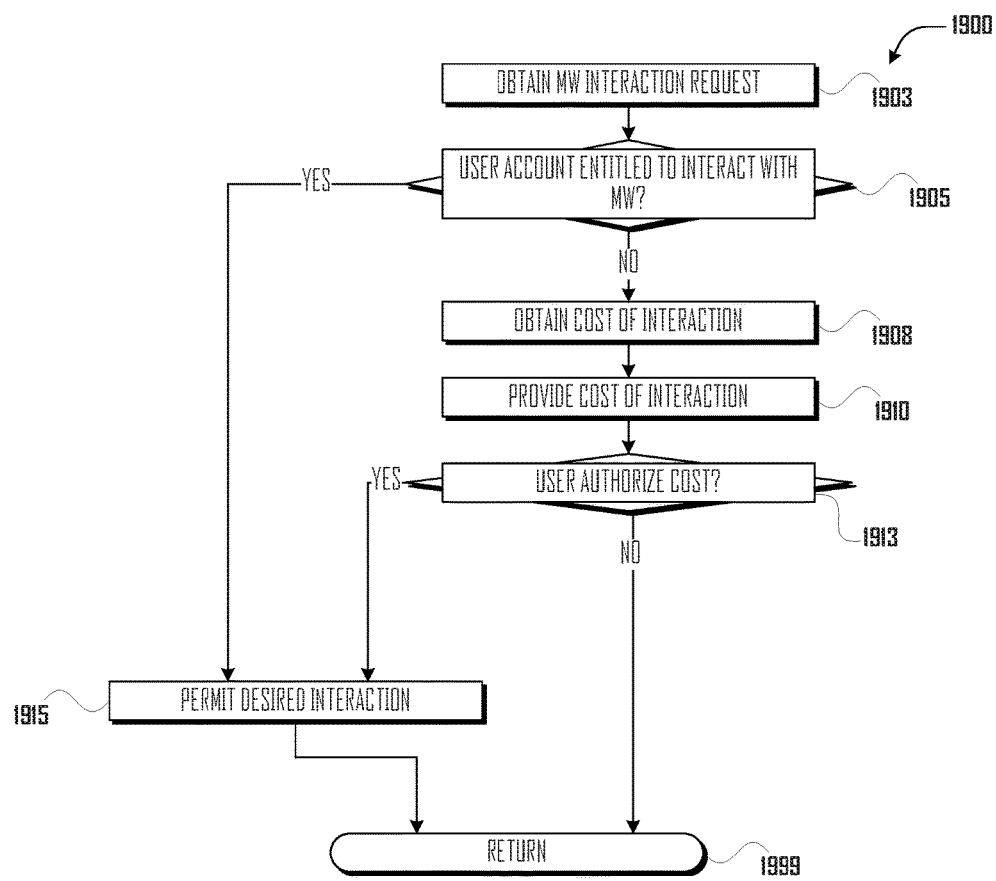
FIG. 19 illustrates a flow diagram of a remote media work interaction authorization sub-routine in accordance with at least one embodiment.

FIG. 19 illustrates remote media work interaction authorization sub-routine 1900, which may be implemented by user-session management service 323A operating on remote front-end server 300A or a dynamic micro-licensing transaction and interaction entitlement ("DMTIE") service, described above, which may be operating on the remote interactive media server or another server such as DMTIE server 300D, e.g. in response to a media work interaction request obtained from an instantiation of client media application 223 operating on a client device 200. The media work interaction request may include a media work identifier corresponding to a particular media work (e.g. a song, a video, or the like).

Media work interaction authorization sub-routine 1900 obtains a media work interaction request at execution block 1903. The media work interaction request may include a media work identifier and/or a user session identifier and/or a client device identifier.

At decision block 1905, if the user-account associated with the user session identifier is entitled to obtain a copy of the requested media work, for example because the user account is associated with a subscription to interactive media service 323B, media work interaction authorization sub-routine 1900 may proceed to execution block 1915; otherwise media work interaction authorization sub-routine 1900 may proceed to execution block 1908.

Media work interaction authorization sub-routine 1900 may obtain a cost of the desired interaction ("interaction cost") at execution block 1908. The interaction cost may be expressed in media interaction credits (MICs). MIC-funded media work interactions are described in more detail above and below with respect to DMTIE service 323D.

Media work interaction authorization sub-routine 1900 may provide the interaction cost at execution block 1910. For example, media work interaction authorization sub-routine 1900 may provide the interaction cost to client media application 223, which may, in turn, cause client device 200 to render a human perceptible version of the interaction cost via optional display 213 as part of a user interface which also includes options for permitting a user to indicate an authorization decision with respect to the interaction cost, for example via optional user input 210.

At decision block 1913, if media work interaction authorization sub-routine 1900 obtains a user authorization of the interaction cost, then media work interaction authorization sub-routine 1900 proceeds to execution block 1915; otherwise, if media work interaction authorization sub-routine 1900 does not obtain a user authorization of the interaction cost, then media work interaction authorization sub-routine 1900 proceeds to return block 1999.

At execution block 1915, media work interaction authorization sub-routine 1900 permits the desired interaction. As is described in more detail below, the implementation of this step depends on the desired interaction. For example, if the desired interaction is to obtain a short-term license for on-demand rendering of the identified media work, media work interaction authorization sub-routine 1900 may cause user session management service 323A to edit an entitlement profile associated with a corresponding user session identifier. As another example, if the desired interaction is to generate a new set of media recommendations based on the media work identifier associated with the media work interaction request, media work interaction authorization sub-routine 1900 may cause client media application 223 to execute media work recommendation routine 1700.

Media work interaction authorization sub-routine 1900 ends at return block 1999.

Get Media Work Sub-Routine

Figure 20:
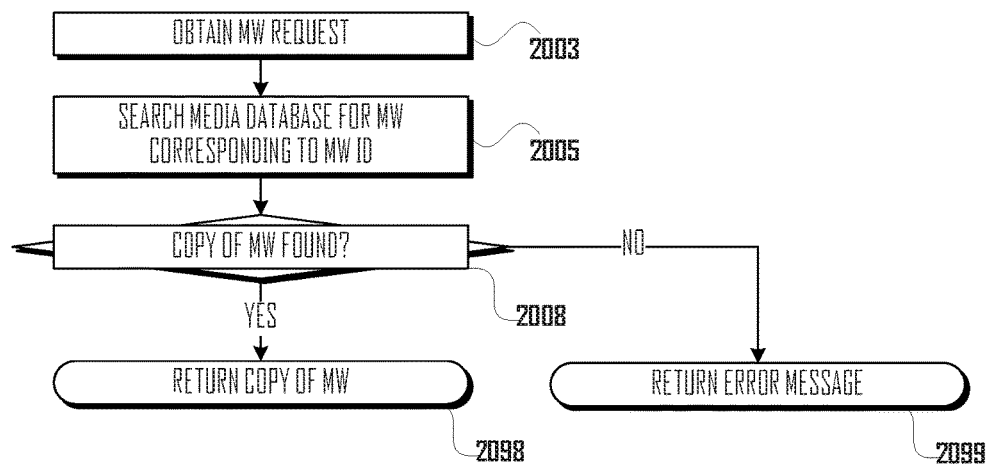
FIG. 20 illustrates a flow diagram of a remote get media work sub-routine in accordance with at least one embodiment

FIG. 20 illustrates a get media work sub-routine 2000, which may be implemented by interactive media service 323B operating on a remote interactive media server 300B, e.g. in response to a get media work request obtained from user session management service 323A. The get media work request may include a media work identifier corresponding to a particular media work (e.g. a song, a video, or the like).

Sub-routine 2000 may obtain a get media work request at execution block 2003.

Sub-routine 2000 may search media database 110 for a copy of a media work associated with the media work identifier at execution block 2003.

At decision block 2008, if sub-routine 2000 finds a copy of a media work associated with the media work identifier, then sub-routine 2000 proceeds to return block 2098; otherwise, sub-routine 2000 proceeds to return block 2099.

Sub-routine 2000 returns a copy of the media work associated with the media work identifier, e.g. to sub-routine 1800, at return block 2098.

Sub-routine 2000 returns an error message, e.g. to sub-routine 1800, at return block 2099.

Playlist Generation Sub-Routine

Figure 21A:
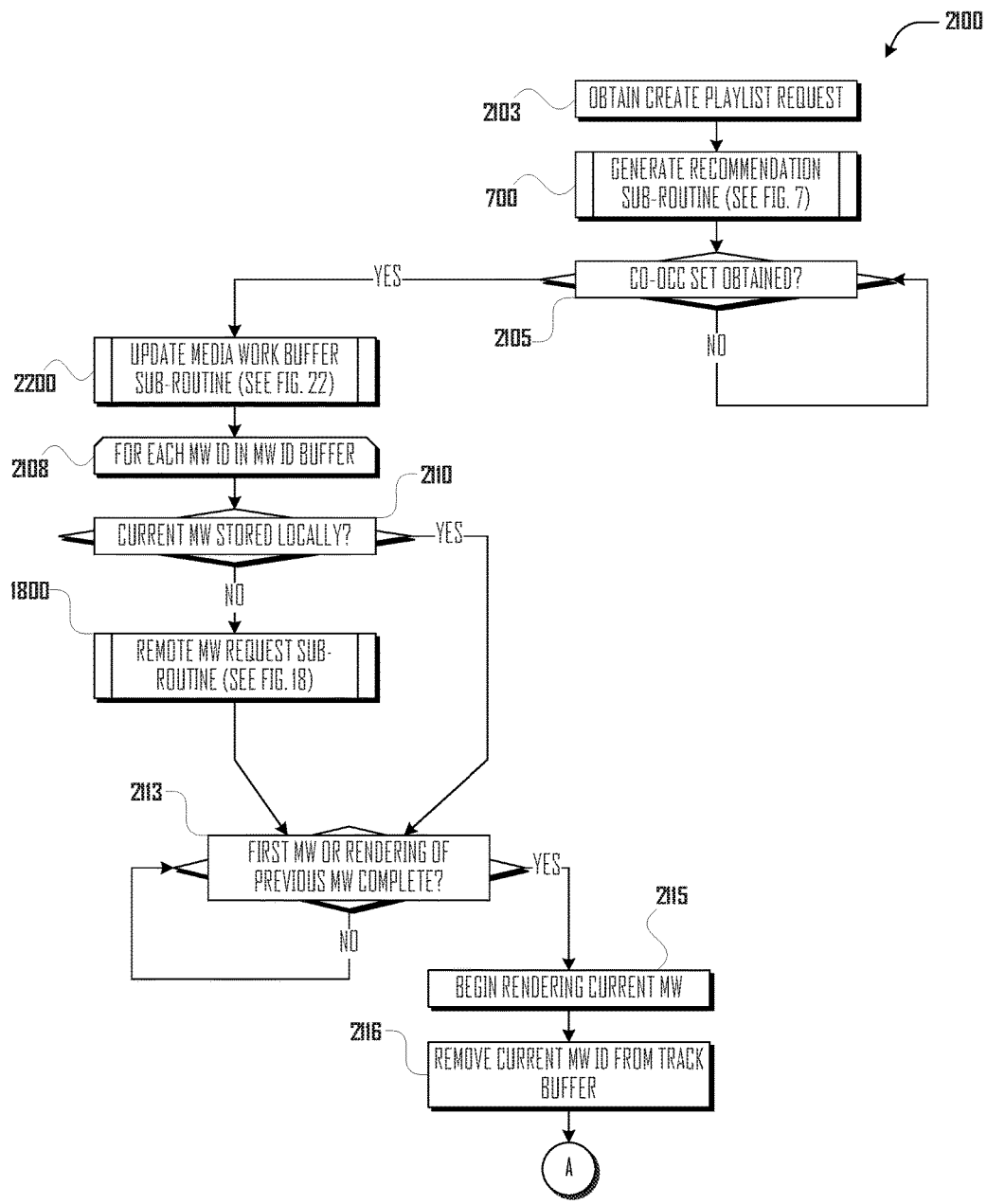
FIGS. 21A-B illustrate a playlist generation sub-routine in accordance with at least one embodiment.
Figure 21B:
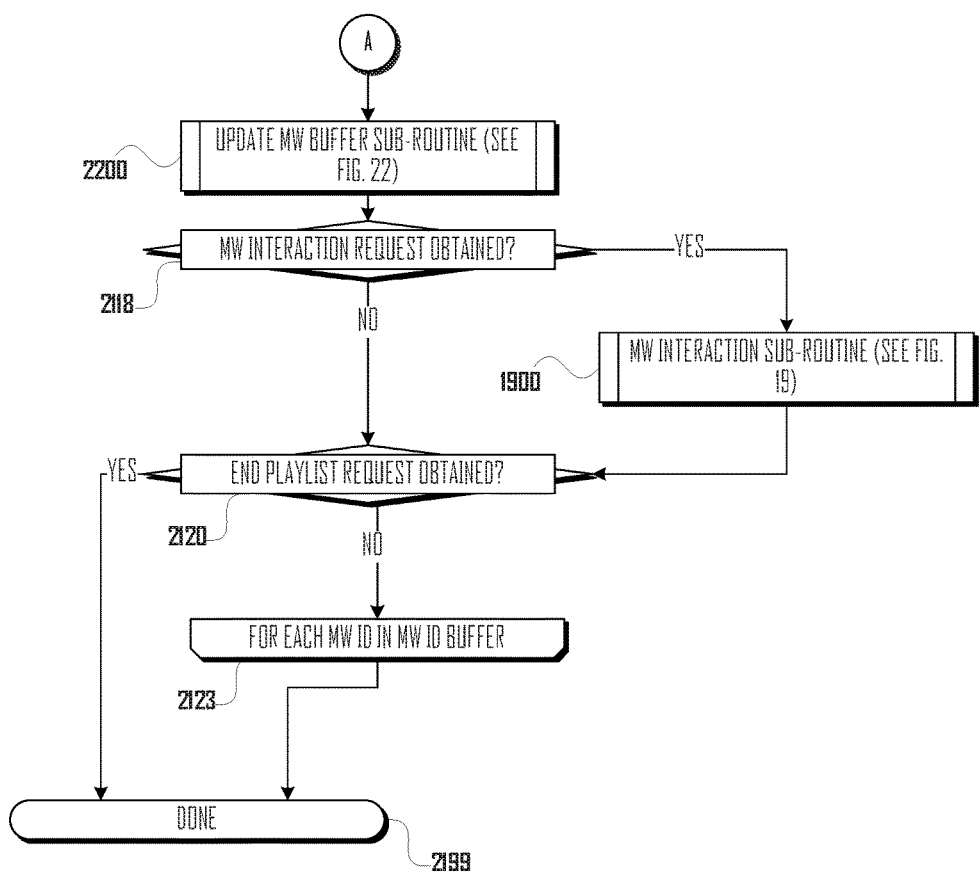

FIGS. 21A-B illustrate a playlist generation routine 2100, which may be implemented by client media application 223 operating on a client device 200, e.g. in response to a create playlist request obtained from user of the client device. The create playlist request may include a media work identifier corresponding to a particular media work (e.g. a song, a video, or the like).

Referring to FIG. 21A, playlist generation routine 2100 obtains a create playlist request at execution block 2103. The create playlist request may include a media work identifier corresponding to a particular media work.

Playlist generation routine 2100 provides a generate recommendation request to remote recommendation generation sub-routine 700, described above with reference to FIG. 7. The recommendation request may include the media work identifier obtained as part of the media recommendation request. Remote recommendation generation sub-routine 700 may return a co-occurrence set including a plurality of media work identifiers and associated meta-data, including author, title, length, album (if applicable), series (if applicable), performer (if applicable), co-occurrence ranking, and the like.

At decision block 2105, if a co-occurrence set is obtained from remote recommendation generation sub-routine 700, playlist generation routine 2100 may provide an update media work buffer request to an update media work buffer subroutine 2200, described below in reference to FIG. 22. Update media work buffer sub-routine 2200 may cause a media work identifier buffer associated with client media application 232 to be populated with a sub-set of co-occurring media work identifiers from the co-occurrence set. If no co-occurrence set is obtained from remote recommendation generation sub-routine 700, playlist generation routine 2100 may return to decision block 2105.

At starting loop block 2108, each co-occurring media work identifier in the media work identifier buffer may be processed in turn.

At decision block 2110, if a complete copy of the media work corresponding to the current co-occurring media work identifier is stored locally on the client device 200, e.g. in memory 208 or in computer readable storage medium 228, playlist generation routine 2100 may proceed to decision block 2113; otherwise, playlist generation routine 2100 provides a get media work request, including the current co-occurring media work identifier, to remote media work request sub-routine 1800. Remote media work request sub-routine 1800 may return a copy of the media work corresponding to the current co-occurring media work identifier. Playlist generation routine 2100 may then proceed to decision block 2113.

At decision block 2113, if the current co-occurring media work identifier is the first media work of the co-occurring set to be presented or if rendering of the previous media work of the co-occurring set has completed, then playlist generation routine 2100 may proceed to execution block 2115.

Playlist generation routine 2100 may begin rendering the media work associated with the current co-occurring media work identifier at execution block 2115, for example via optional display 213 and/or optional speaker 215 of client device 200. The rendering of the media work may also include options for permitting a user to indicate a desire to interact with the media work being rendered or to end the recommendation process, effectively terminating playlist generation routine 2100, for example via optional user input 210.

Playlist generation routine 2100 may remove the current co-occurring media work identifier from the media work identifier buffer at execution block 2116.

Referring now to FIG. 21B, while the media work associated with the current co-occurring media work identifier is rendering, playlist generation routine 2100 may call update media work buffer sub-routine 2200.

At decision block 2118, if playlist generation routine 2100 obtains a media work interaction request, for example via optional user input 210, playlist generation routine 2100 may provide a media work interaction request to a media work interaction authorization sub-routine 1900, described above in reference to FIG. 19; otherwise playlist generation routine 2100 proceeds to decision block 2120. One example of such a media work interaction request is to generate media work recommendations based on the media work currently being rendered.

At decision block 2120, if playlist generation routine 2100 obtains an end playlist request, then playlist generation routine 2100 proceeds to termination block 2199; otherwise playlist generation routine 2100 proceeds to ending loop block 2123.

At ending loop block 2123, playlist generation routine 2100 loops back to starting loop block 2108 to address the next co-occurring media work identifier in the media work identifier buffer.

Playlist generation routine 2100 ends at termination block 2199.

Update Media Work Buffer Sub-Routine

Figure 22:
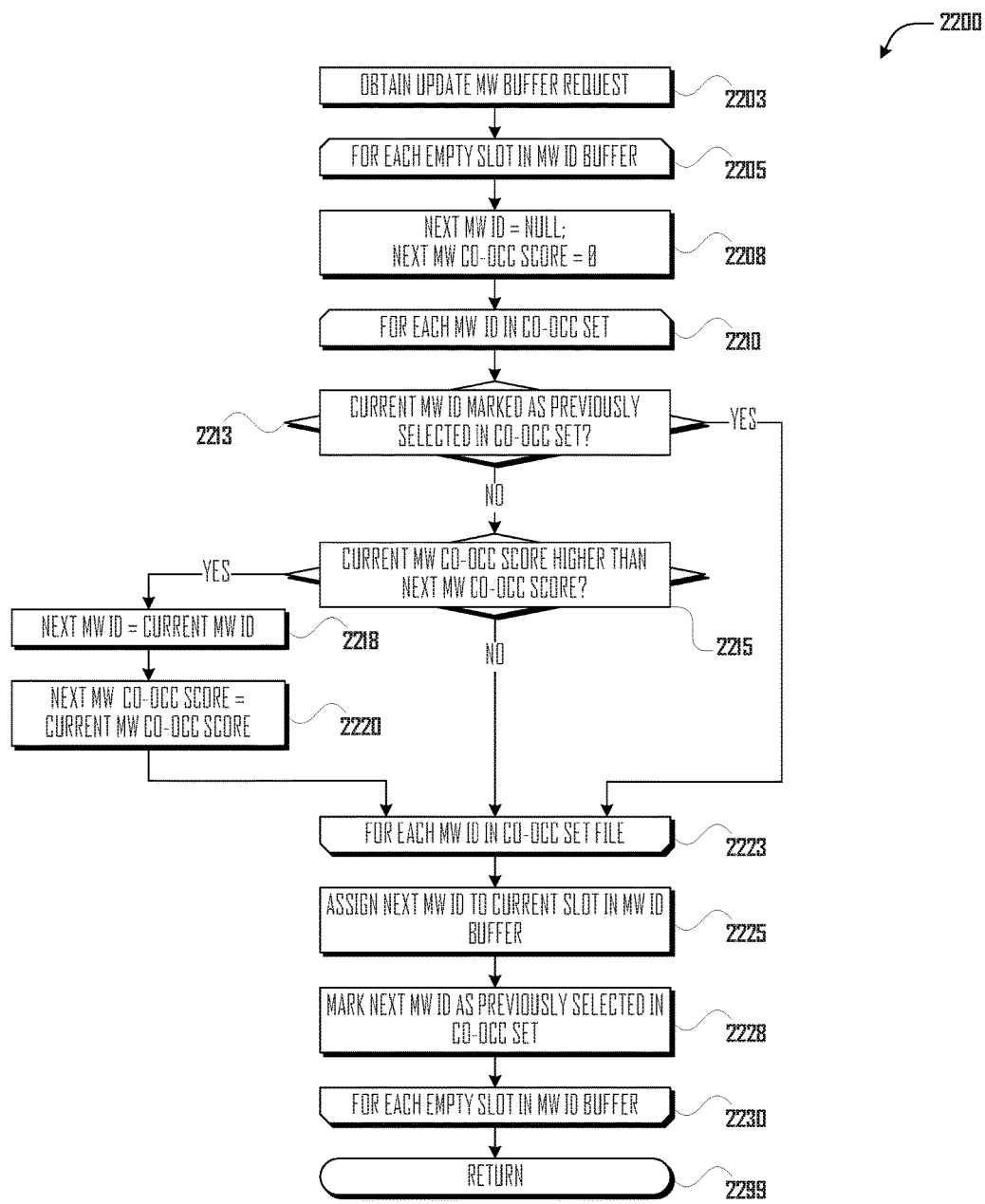
FIG. 22 illustrates a flow diagram of an update media work buffer sub-routine in accordance with at least one embodiment.

FIG. 22 illustrates an update media work buffer sub-routine 2200, which may be implemented by client media application 223 operating on a client device 200, e.g. in response to an update media work buffer request obtained from playlist generation routine 2100.

Update media work buffer sub-routine 2200 obtains an update media work buffer request at execution block 2203.

At starting loop block 2205, update media work buffer sub-routine 2200 addresses each empty slot in a media work identifier buffer in turn. The media work identifier buffer may represent a first-in-first-out list of size n slots, which may be empty or may contain a media work identifier.

Update media work buffer sub-routine 2200 may set a next media work identifier variable to a null value and a next media work co-occurrence score variable to zero at execution block 2208.

At starting loop block 2210, update media work buffer sub-routine 2200 may address each co-occurring media work identifier in the co-occurrence set in turn.

At decision block 2213, if the current co-occurring media work identifier is marked as previously selected in the co-occurrence set, then update media work buffer sub-routine 2200 may proceed to ending loop block 2223; otherwise, update media work buffer sub-routine 2200 may proceed to decision block 2215.

At decision block 2215, if the co-occurrence score associated with the current co-occurring media work identifier is higher than the current value of the next media work co-occurrence score variable, then update media work buffer sub-routine 2200 may proceed to execution block 2218; otherwise update media work buffer sub-routine 2200 proceeds to ending loop block 2223.

Update media work buffer sub-routine 2200 may set the next media work identifier variable to be the current co-occurring media work identifier at execution block 2218.

Update media work buffer sub-routine 2200 may set the next media work co-occurrence score variable to equal the co-occurrence score associated with the current co-occurring media work identifier at execution block 2220.

At ending loop block 2223, update media work buffer sub-routine 2200 may loop back to starting loop block 2210 to address the next co-occurring media work identifier in the co-occurrence set.

Update media work buffer sub-routine 2200 may assign the current value of the next media work identifier variable to the current slot of the media work identifier buffer at execution block 2225.

Update media work buffer sub-routine 2200 may mark the co-occurring media work identifier corresponding to the current value of the next media work identifier variable as previously selected in the co-occurrence set at execution block 2228.

At ending loop block 2230, update media work buffer sub-routine 2200 may loop back to starting loop block 2205 to address the next empty slot in the media work identifier buffer.

Update media work buffer sub-routine 2200 ends at termination block 2299.

Although specific embodiments have been illustrated and described herein, a variety of alternate and/or equivalent implementations may be substituted for the specific embodiments shown and described without departing from the scope of the present disclosure. For example, the above described embodiments are specific examples of a more general method, performable by a computer processing unit, that includes the steps of obtaining a first media work identifier corresponding to a first media work; identifying a first data record in a data store, the first data record being associated with said first media work identifier; identifying a first instance of interaction, the first instance of interaction being between the first data record and a second data record in the data store and occurring at a first time, the second data record being associated with a first user session; identifying a second instance of interaction, the second instance of interaction being between the second data record and a third data record in the data store and occurring at a second time, the third data record being associated with a second media work; determining that the third data record co-occurs with the first data record; and associating the third data record with a co-occurrence set for the first data record; and wherein the third data record is determined to co-occur with said first data record because a temporal difference between the first time and said second time is within a particular temporal range.

A variation on the above method may include identifying a third instance of interaction, the third instance of interaction being between the first data record and a fourth data record in the data store and occurring at a third time, the fourth data record being associated with a second user session; identifying a fourth instance of interaction, the fourth instance of interaction being between the fourth data record and a fifth data record in the data store and occurring at a fourth time, the fifth data record being associated with a third media work; determining that the fifth data record co-occurs with the first data record; associating the fifth data record with the co-occurrence set for the first data record; determining a co-occurrence score for the third data record, the co-occurrence score for the third data record being proportional to a number of co-occurrences between the third data record and the first data record and being inversely proportional to a number of instances of interaction between the third data record and a plurality of user session data records in the data store; determining a co-occurrence score for the fifth data record, the co-occurrence score for the fifth data record being proportional to a number of co-occurrences between the fifth data record and the first data record and being inversely proportional to a number of instances of interaction between the fifth data record and a plurality of user session data records in the data store; determining a co-occurrence ranking for the third data record relative to the co-occurrence score for the fifth data record, the fifth data record being associated with the co-occurrence set for the first data record for the first data record; and wherein the fifth data record is determined to co-occur with the first data record because a temporal difference between the third time and the fourth time is within the particular temporal range.

A further variation on the above method(s) may include determining that the co-occurrence ranking for the third data record is higher than a co-occurrence ranking for the fifth data record; providing a second media work identifier, the second media work identifier corresponding to the third data record; and subsequently providing a third media work identifier, the third media work identifier corresponding to the fifth data record.

This application is intended to cover any adaptations or variations of the embodiments discussed herein.

Client/Server-Based Interactive Media Delivery System Dynamic Micro-Licensing Transaction and Interaction Entitlement Capability As is described above, an online media provider may provide a dynamic micro-licensing transaction and interaction entitlement ("DMTIE") capability in conjunction with an interactive media service, such as interactive media service 323B.

Figure 23:
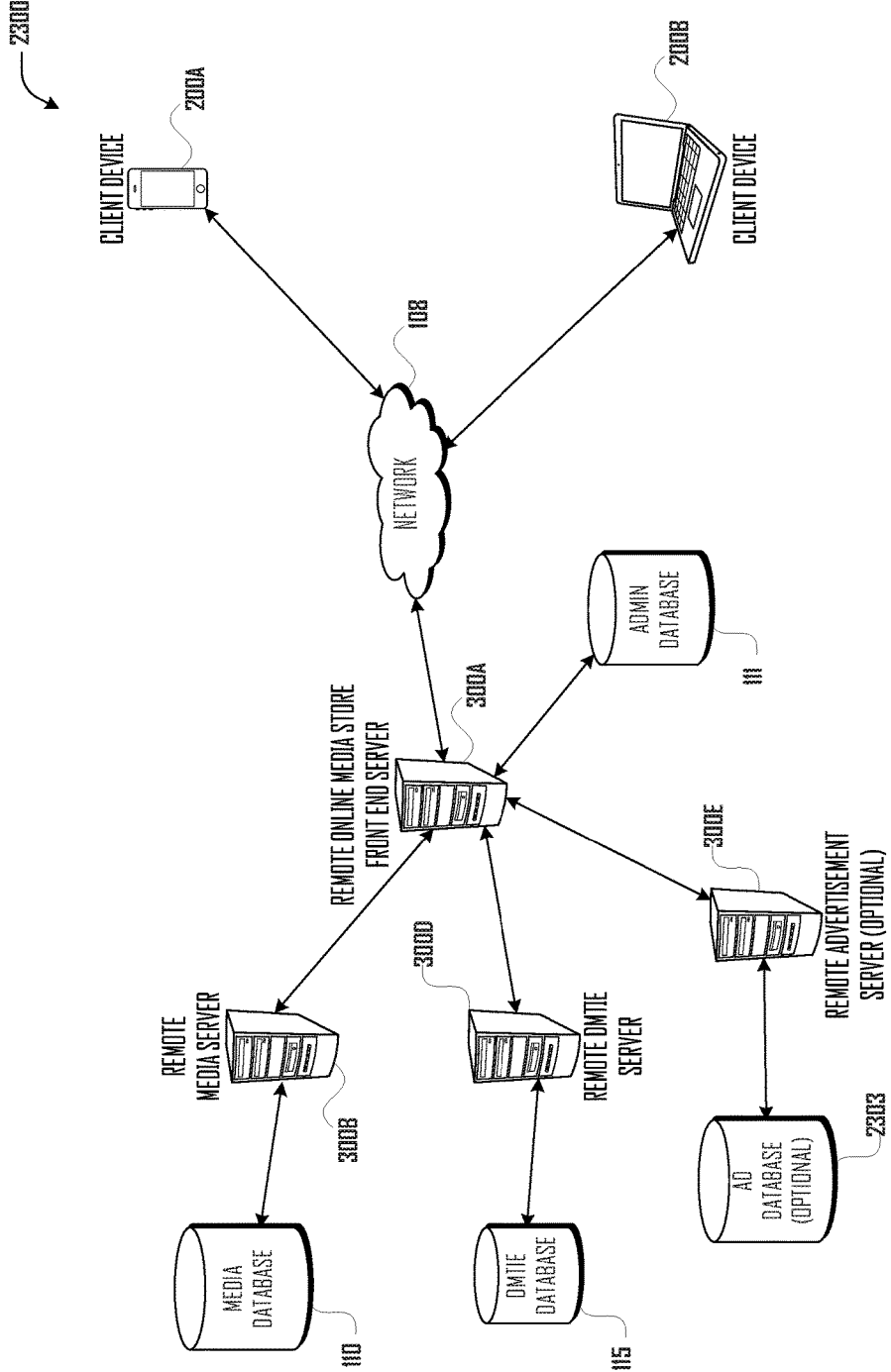
FIG. 23 illustrates an exemplary network topology of a media recommendation system with dynamic micro-licensing transaction and interaction entitlement ("DMTIE") capabilities in accordance with at least one embodiment.

FIG. 23 illustrates an exemplary client/server-based interactive media system 2300 including a DMTIE service in accordance with various embodiments. Where exemplary client/server-based interactive media system 2300 has elements in common with exemplary client/server-based interactive media system 100, the same reference numerals are used. Client devices 200 and remote front-end server 300A are in data communication with network 108. Remote front-end server 300A may be in data communication with remote media server 300B, administrative database 111, and a remote DMTIE server 300D. Remote DMTIE server 300D may be in data communication with a DMTIE database 2303.

As in the case of remote front-end server 300A, remote media server 300B, and remote media recommendation server 300C, described above, remote DMTIE server 300D may be a networked computing device generally capable of accepting requests over network 108, e.g. from client devices 200, remote front-end server 300A, and other networked computing devices (not shown), and providing responses accordingly. Remote DMTIE server 300D may or may not be a separate physical device from remote front-end server 300A and/or remote media server 300B. Remote DMTIE server 300D may include executable instructions for performing remote DMTIE service 323D (indicated by dotted lines in FIG. 3).

Referring generally to FIG. 23, and also to FIGS. 2 and 3 above, in various embodiments remote front-end server 300A, remote media server 300B, and remote DMTIE server 300D may be operated in furtherance of an on-line media provider (not shown) providing digital copies of media works, such as audio content, video content, and the like, on an advertisement supported, per-work fee, and/or subscription fee basis e.g. to instantiations of client media application 223 operating on client devices 200 via network 108.

As described above in the context of various embodiments of media recommendation service 323C, client media application 223 (or a web application with similar functionality) may act as an interface between a user of client device 200 and user session management service 323A operating on remote front-end server 300A. Upon instantiation, client media application 223 may send a "create new session" request to user-session management service 323A, for example including identifying information for client device 200, identifying information for the particular instantiation of client media application 223, and/or user-account credentials such as a user name and password, obtained from the user or stored in memory 208. If presented, the user-account credentials may be unique to the user or may represent a generic and/or anonymous "guest" account.

User-session management service 323A may create a corresponding user session (not shown) associated with the particular instantiation of client media application 223, identified by a user-session identifier (referred to herein as a "session ID") and may obtain information associated with the provided identifying information from administrative database 111 and provide a response to client media application 223, which may include information related to features and services provided by the on-demand media service which the user-account associated with the user-account credentials is authorized to access.

Client media application 223 may then present the user with a menu of options, e.g. via optional display 213, and wait for the user to indicate a selection of a specific option, e.g. via optional user input 210.

Client media application 223, user-session management service 323A, and interactive media service 323B may collectively present a user with many opportunities to interact with digital copies of media works, such as requesting the presentation of locally stored tracks, i.e. interactively accessing media data files (not shown) stored in memory 208, and/or requesting the presentation of remotely stored tracks, i.e. interactively accessing media data files stored in other locations on network 108, such as media database 110.

The features and services of the online media provider that a particular user-account is authorized to access may be expressed at least partially via an account entitlement level associated with the user-account. For example: (i) the account entitlement level may define a set of non-technical restrictions, applied to client device 200 via client media application 223, that control how the client media application can interact with copies of media works offered by the on-line media provider and/or (ii) the account entitlement level may define a set of non-technical restrictions, applied to one or more of the various remote servers 300A-D via various software services 323A-D, that control how the software services can interact with copies of the media works offered by the on-line media provider.

For example, a first account entitlement level may be associated with advertisement-supported non-interactive media streaming features and services where remote interactive instantiations of client media application 223 are provided with a pre-programmed or semi-random set of media works for rendering, the specific selection and/or order of which remains unknown to and uncontrollable by the users. The non-interactive nature of a media work stream is imposed due to non-technical restrictions imposed by client media application 223 on client device 200. For example, although there is no guarantee a user will have a positive response with respect to any particular media work in the set, non-technical restrictions may only permit users to skip (i.e. bypass the rendering of) a limited number of media works in a given time period.

A second, relatively higher, account entitlement level may be associated with subscription-based interactive media streaming features and services, where instantiations of client media application 223 are permitted "on-demand" interactive access to some or all of the media works in the online media store's media work catalog, without the user purchasing/licensing a specific media work. Interactive media streaming may have fewer non-technical restrictions than non-interactive streaming. Additional features and benefits may also be associated with the second entitlement level, such as the media recommendation and/or playlist generation services described above, the ability to store local copies of media works in memory 208 of client device 200, and the like.

In accordance with various embodiments, client media application 223 and DMTIE service 323D may also present a user with opportunities to exercise granular control of the user's ability to interact with various media works by providing users with the ability to: maintain a media interaction credit (MIC) balance; increase the user's MIC balance by purchasing interaction credits; and use MICs to "purchase" discrete media work interactions. Although the latter transaction may be presented to the user as being a similar economic experience as a "purchase," the commercial and legal relationships between the user and the online media provider underlying such a transaction is more analogous to a short-term license agreement (referred to herein interchangeably as a "micro-license" or a "micro-license agreement"), where, in exchange for deducting a number of MICs from the user's MIC balance, DMTIE service 323D may cause the instantiation of client media application 223 to disable the non-technical restriction(s) preventing the client device from interacting with the media work in the desired way. The cost of an MIC may vary over time and by geographic region. In some embodiments, the cost of an MIC may be significantly less than the subscription fee associated with an interactive streaming service (e.g. one MIC may cost less than one percent of a monthly subscription fee associated with an interactive streaming service). The media work interaction cost (or "interaction cost") of a particular transaction may be dependent on characteristics of the user account associated with the current user session, characteristics of the media work, characteristics of the desired interaction, and the like.

For example, an instantiation of client media application 223 operating on client device 200 and associated with the first account entitlement level described above may obtain an indication that a user of the client device desires to skip the media work currently being rendered. Client media application 223 may provide a media work interaction request to user session management service 323A. User session management service 323A may compare a minimum account entitlement level for the desired interaction to the account entitlement level associated with the current user session and instruct the instantiation of client media application 223 to permit or deny the interaction accordingly. In the present "skip" example, this may involve determining how many previous skip requests the user has made within a certain time window, such as during the sixty minutes prior to obtaining the current skip request, during the current user session, and/or during a current listening session (e.g. track list). If the determined number of previous skip requests, however measured, is less than a predefined maximum skip number, the minimum account entitlement level for the current skip request may be equivalent to the first account entitlement level described above. However, if the determined number of previous skips is greater than or equal to the predefined maximum skip number, the minimum account entitlement level for the current skip request may be increased to the second entitlement level described above.

Assuming the media work interaction is not permitted, e.g. because the user account is associated with the lower, first account entitlement level and the user has already exceeded the number of skips permitted by this account entitlement level, in accordance with various embodiments, user session management service 323A may determine a media work interaction cost associated with permitting the current instance of the requested interaction, which may be expressed in MICs. For example, in the present embodiment, user session management service 323A may obtain media work interaction data associated with the media work interaction from DMTIE service 323D including a discrete-entitlement definition for the media work interaction. The discrete-entitlement definition may include a base interaction cost for one or more media work interactions. User session management service 3232A may then determine a media work interaction cost by selectively adjusting the base interaction cost, e.g. in accordance with marketing promotions, etc., if applicable and provide the media work interaction cost to the instantiation of client media application 223.

The instantiation of client media application 223 may provide the user with the option to "purchase" the desired interaction, i.e., in this example, skipping the current media work, in exchange for the specified number of MICs. If client media application 223 obtains an indication the user wishes to proceed with the interaction, the client media application may disable the non-technical restriction(s) preventing client device 200 from bypassing the media work currently being rendered and notify the user-session management service 323A. User-session management service 323A may notify DMTIE service 323D and the DMTIE service may deduct the interaction cost from the user's interaction credit balance.

Other media work interactions that may be facilitated in accordance with the techniques described herein include: temporary removal of one or more advertisements accompanying an otherwise ad-supported non-interactive media work stream, or removal of all such advertisements for a limited amount of time, e.g. one hour, two hours, four hours, and the like; obtain unlimited access to a particular media work or group of works for a limited amount of time, e.g. an hour, a day, or a week; obtain access to a specific number of plays or views of a particular media work (e.g. "play once", "play 10 times", etc.); re-render a particular media work; save a local copy of a particular media work in the local memory 208 of client device 200 for a limited amount of time; obtain a relatively higher quality copy of the media work, e.g. at an enhanced bitrate for higher fidelity audio and/or video; obtain interactive access to a set of related media works, e.g. an album or a television season; and the like.

For example, an instantiation of client media application 223 operating on client device 200 may obtain an indication that a user of the client device desires to render a set of media works, e.g. a playlist, sequentially. In accordance with certain embodiments, by default, client media application 223 may obtain micro-licenses with respect to sub-sets of the set of media works by rendering one or more advertisements prior to rendering a sub-set of media works. Client media application 223 may further provide an option for selectively skipping or otherwise bypassing the rendering of advertisements in exchange for deducting a number of MICs from a MIC balance associated with a user account. This gives a user granular control over choosing to license the right to render sub-sets of the set of media works using either time, via allowing an advertisement to render between media works, or money, via permitting the deduction of MICs from the user's account balance.

In the present exemplary embodiment, if the user elects to obtain a micro-license via MICs, client media application 223 may perform an preliminary authorization test to determine whether the MIC balance associated with the user account is sufficient to cover the cost of the micro-license and, if so, proceed with rendering the next media work in the set of media works. While the media work is rendering, client media application 223 may validate the transaction with DMTIE service 323D. For example, client media application 223 may maintain a local MIC balance associated with a user account and compare the local MIC balance to a minimum MIC balance value. If the local MIC balance is greater than or equal to the minimum MIC balance value, client media application may provisionally grant the micro-license, begin rendering the media work, and request media work interaction data related to the media work, or set of media works, being rendered from user session management service 323A. In the present embodiment, the media work interaction data may include a set of media work interaction identifiers and associated media work interaction costs. Client media application 223 may select the appropriate media work interaction cost from the media work interaction data and provide user session management service 323A with a validation request including a user account identifier associated with the instantiation of client media application and the appropriate media work interaction cost. User session management service 323A may pass the validation request to DMTIE service 323D, which may, in turn, compare the media work interaction cost with a MIC balance associated with the identified user account. If the MIC balance associated with the user account is greater than or equal to the interaction cost, DMTIE service 323D may instruct user session management service to affirm the validation request, in which case client media application 223 may continue rendering the media work, and update the MIC balance associated with the user account, e.g. by deducting the media work interaction cost. If the MIC balance associated with the user account is less than the media work interaction cost, then DMTIE service 323D may instruct user session management service to deny the validation request, in which case client media application 223 may halt the rendering of the media work.

In various embodiments, client media application 223 may further provide options for changing the default licensing method from advertisement rendering to MIC deduction for set amounts of time (e.g. one hour, four hours, one day, or the like) or for quantities of sub-sets of media works (e.g. for an entire set of media works). Although the present embodiment focuses on the context of an advertisement supported media stream, micro-licensing for other media work interactions may also be enabled via a similar technique in various embodiments of the present systems and methods.

Fifth Exemplary Series of Communications

Figure 24A:
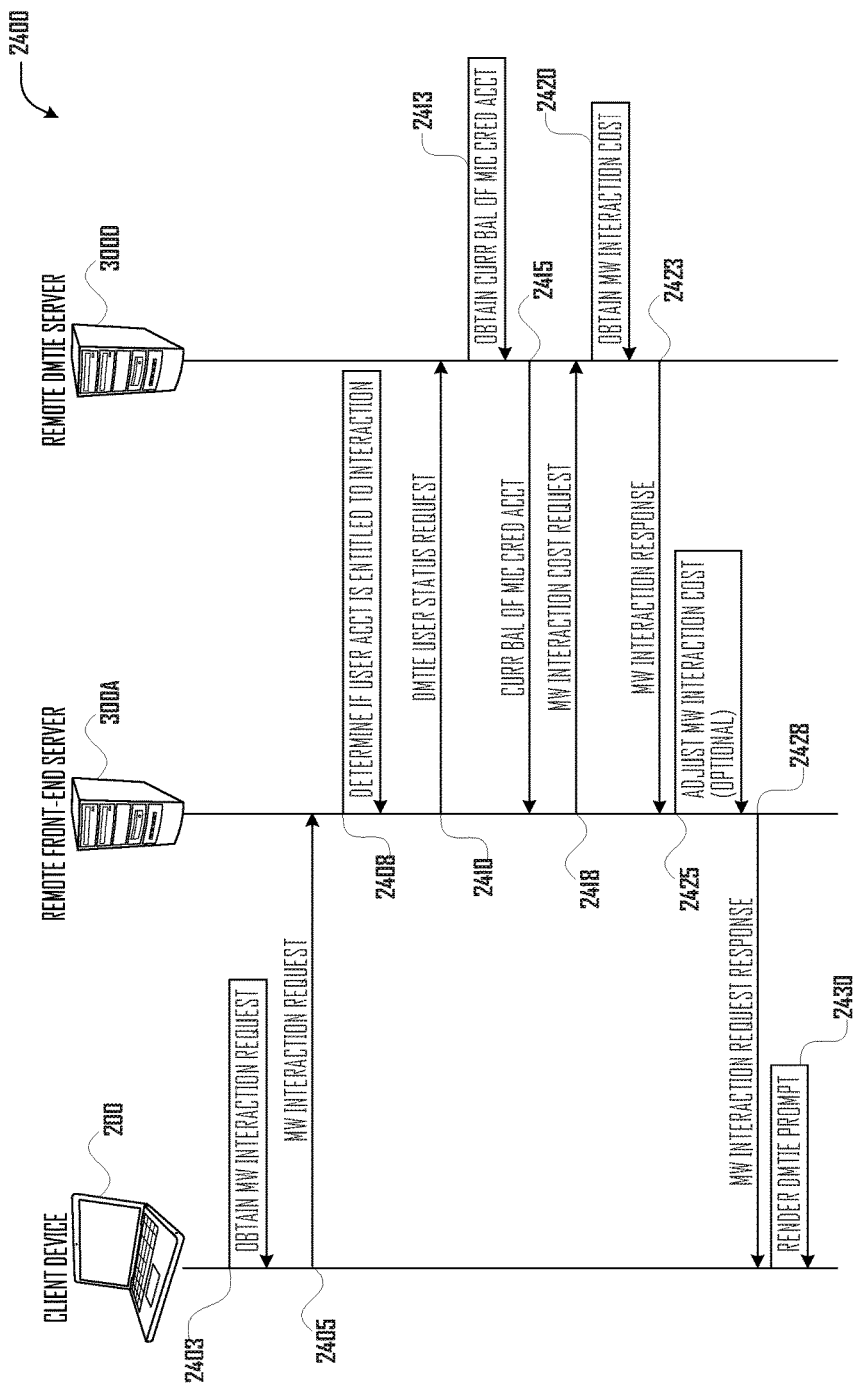
FIGS. 24A-B illustrate a fifth exemplary series of communications between various devices in accordance with at least one embodiment.
Figure 24B:
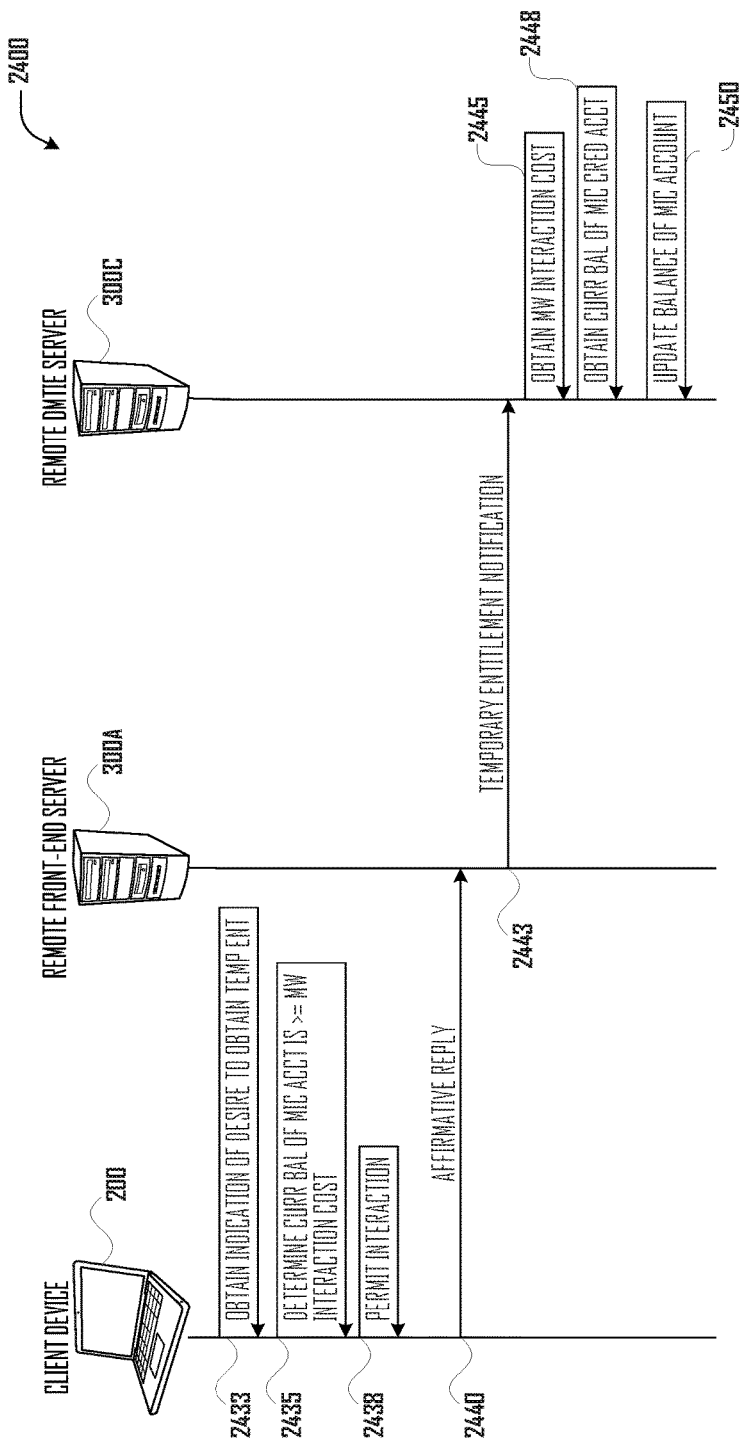

FIGS. 24A-B illustrate an exemplary series of communications 2400 between client device 200, remote front-end server 300A, and remote DMTIE server 300D in accordance with various embodiments.

Referring to FIG. 24A, client device 200 obtains 2403 a media work interaction request.

Client device 200 provides remote front-end server 300A with a media work interaction request 2405, which may include a user session identifier associated with a user-account, a media work identifier associated with a media work, and an interaction identifier associated with an interaction.

Remote front-end server 300A may determine 2408 if a user-account associated with the provided user session identifier is automatically entitled to interact with the media work in the desired manner, e.g. because the user-account is associated with a sufficiently high account entitlement level. For example, remote front-end server 300A may:

(1) query administrative database 111 with the provided interaction identifier to determine a minimum account entitlement level necessary to permit the desired interaction;

(2) query administrative database 111 with the user-account identifier associated with the provided user session identifier to determine an account entitlement level associated with the identified user-account; and (3) compare the obtained minimum entitlement level necessary to permit the desired interaction with the account entitlement level associated with the identified user-account.

For example, remote front-end server 300A may determine the account entitlement level associated with the identified user-account is a subscriber-level account entitlement level, which, in this example, grants the user essentially unlimited interactive access to the media works provided by the online media provider. In such a situation, the identified user-account would be found to be entitled to engage in the desired interaction with the media work because the account entitlement level associated with the identified user-account is equal to or greater than the minimum entitlement level necessary to permit the desired interaction.

If the user-account is entitled to engage in the desired interaction, remote front-end server 300A may provide a response (not shown) to media work interaction request 2405 approving the requested interaction. For illustrative purposes, the current example assumes remote front-end server 300A determines the requested interaction should be provisionally denied, for example because the account entitlement level associated with the identified user-account is an low level (e.g. free/ad-supported) account entitlement level, which, in this example, only permits access to non-interactive media streaming services.

Remote front-end server 300A may provide remote DMTIE server 300D with a DMTIE user status request 2410, including a user-account identifier associated with the provided user session identifier.

Remote DMTIE server 300D may obtain 2413 a current MIC balance associated with the provided user-account identifier, for example by querying DMTIE database 2303.

Remote DMTIE server 300D may provide a response 2415 to user DMTIE status request 2410, including the current MIC balance associated with the provided user-account identifier.

Remote media server may provide remote DMTIE server 300D with a media work interaction cost request 2418, including the provided interaction identifier.

Remote DMTIE server 300D may obtain 2420 a media work interaction cost associated with the provided interaction identifier, for example by querying DMTIE database 115. The media work interaction cost may, for example, be expressed in MICs.

Remote DMTIE server 300D may provide a response 2423 to media work interaction cost request 2418, including the media work interaction cost associated with the provided interaction identifier.

In at least some embodiments, remote front-end server 300A may optionally adjust 2425 the provided temporary media work interaction cost. For example, during promotional events, a global discount may be applied to some or all media work interaction costs.

Remote front-end server 300A may provide client device 200 with a media work interaction request response 2428 to media work interaction request 2405 provisionally denying the requested interaction. Because the requested interaction has been denied, response 2428 may include the current MIC balance associated with the user identifier and the media work interaction cost associated with the interaction identifier. Response 2428 may also include the minimum account entitlement level necessary to permit the desired interaction.

Client device 200 may render 2430 a DMTIE prompt, for example via optional display 213. For example, the DMTIE prompt may communicate to a user (1) that the user does not have a sufficient account entitlement level to permit the requested interaction; (2) an expression of the minimum account entitlement level necessary to permit the desired interaction, for example an upgrade to a subscriber-level account entitlement level; (3) a cost of obtaining the minimum account entitlement level necessary to permit the desired interaction, which may be expressed in terms of a subscription cost (e.g. $10/month); (4) the media work interaction cost associated with the interaction identifier, i.e. the cost to "purchase" the desired interaction, which may be expressed in MICs; and (5) the current MIC balance associated with the user-account identifier. The DMTIE prompt may also provide an option for the user to increase the MIC balance associated with the user-account identifier, e.g. by purchasing additional MICs.

Referring now to FIG. 24B, assuming for the sake of example the current MIC balance associated with the user-account identifier is greater than the media work interaction cost, client device 200 may obtain 2433 an indication, e.g. via optional user input 210, of a user's desire to "purchase," i.e. obtain a temporary entitlement for, the desired interaction.

Client device 200 may determine 2435 whether the current MIC balance associated with the user-account identifier is equal to or greater than the media work interaction cost associated with the interaction identifier. If so, client device 200 may permit 2438 the desired interaction and provide remote front-end server 300A with an affirmative reply 2440 to the media interaction request response, including a user session identifier, a media work identifier, and an interaction identifier. In some embodiments, client device 200 may pause prior to providing front end-server 300A with affirmative response 2440, e.g. to afford the client device time to obtain an indication, e.g. via optional user input 210, of the user's desire to cancel the interaction.

Remote media server 300A may provide remote DMTIE server 300D with a temporary entitlement notification 2443, including the user-account identifier associated with the provided user session identifier, the media work identifier, and the interaction identifier.

Remote DMTIE server 300D may obtain 2445 the media work interaction cost associated with the provided interaction identifier, for example by querying micro-transaction database 2613. The media work interaction cost may, for example, be expressed in MICs.

Remote DMTIE server 300D may obtain 2448 the current balance of the MIC account associated with the provided user-account identifier, for example by querying DMTIE database 2303.

Remote DMTIE server 300D may calculate 2450 a new MIC balance associated with the provided user-account identifier, e.g. by subtracting the temporary media work interaction cost from the previously obtained current balance of the MCI account, and then update the DMTIE database 115.

Sixth Exemplary Series of Communications

Figure 25:
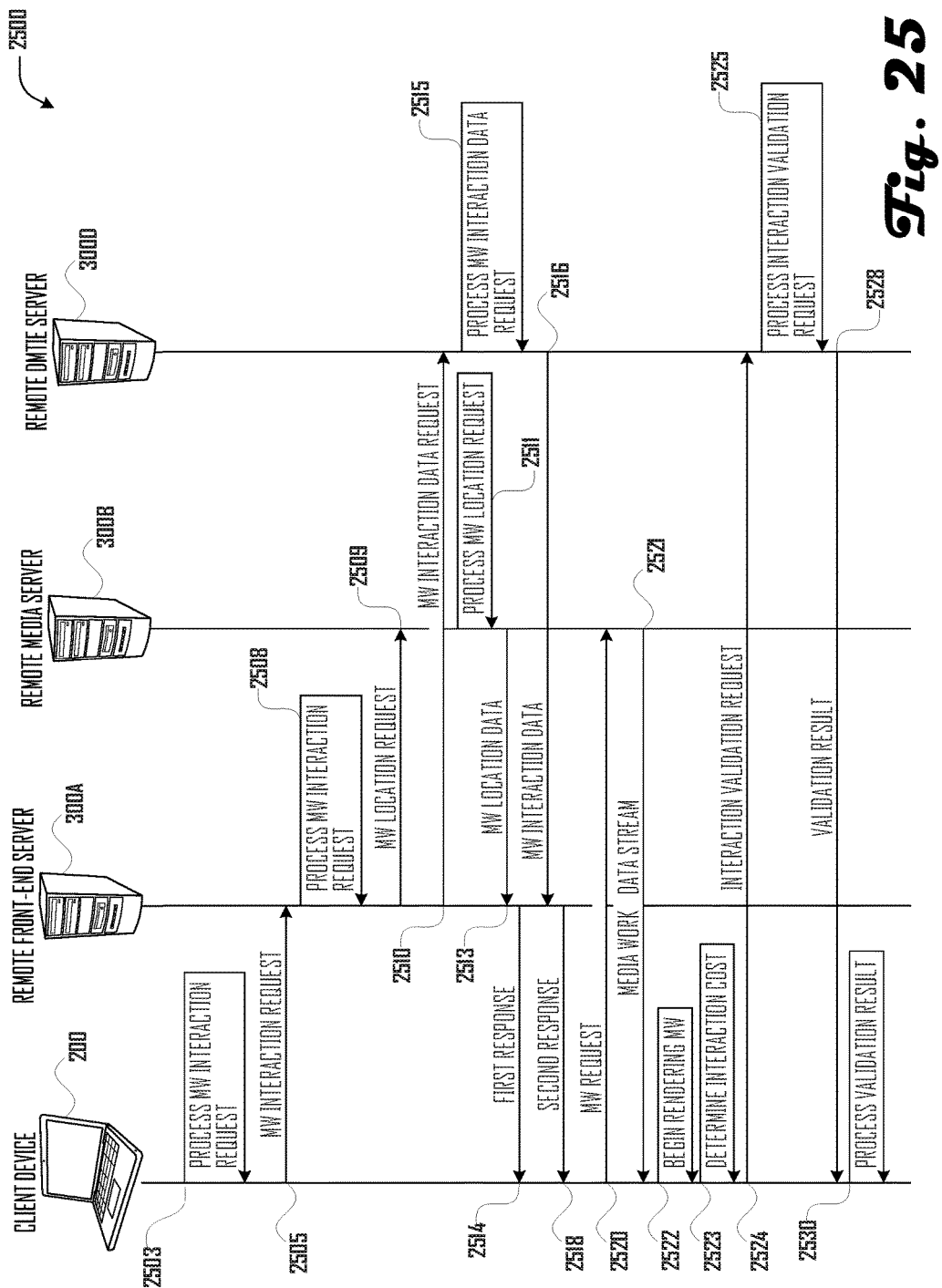
FIG. 25 illustrates as sixth exemplary series of communications between various devices in accordance with at least one embodiment.

FIG. 25 illustrates an exemplary series of communications 2500 between client device 200, remote front-end server 300A, remote media server 300B, and remote DMTIE server 300D in accordance with various embodiments.

Client device 200 processes 2503 a media work interaction request, e.g. obtained via optional user input 210, identifying a media work or group of media works. As is described in more detail below, client device 200 may make a preliminary determination with regard to whether or not an MIC account associated with the current user session has a sufficient balance to engage in the desired interaction. The series of communications 2500 illustrated in FIG. 25 assumes that (1) the desired interaction is the rendering of a selected media work and (2) in the course of processing 2503 the media work interaction request, client device 200 determines it is likely the MIC account associated with the current user session has a sufficient balance to cover the cost of engaging in the desired interaction.

Client device 200 provides remote front-end server 300A with a media work interaction request 2505, which may include a user session identifier associated with a user-account and a media work identifier associated with a media work (or an identifier associated with a group or compilation of media works or the like).

Remote front-end server 300A may process 2508 the media work interaction request 2505 and, as a result: (1) provide remote media server with a media work location request 2509 and (2) provide remote DMTIE server 300D with a media work interaction data request 2510, which may each include the media work identifier supplied in the media work interaction request 2505. remote media Remote media server 300B may process 2511 the media work location request and responsively provide remote front end server 300A with media work location data 2513, e.g. a URI of a renderable copy of the media work. Remote front-end server 300A may then provide a first response 2514 to the media work interaction request 2505 including the media work location data.

Remote DMTIE server 300D may process 2515 the media work interaction data request 2510 and responsively provide remote front end server 300A with media work interaction data 2516 associated with the media work identifier. Media work interaction data 2516 may include a set of interaction identifiers representing possible interactions with the identified media work (or group of media works) and associated temporary media work interaction costs (e.g. expressed in MICs). Remote front-end server 300A may then provide a second response 2518 to the media work interaction request 2505 including the media work interaction data.

Responsive to obtaining media work location data in first response 2514, and without necessarily waiting to receive second response 2518, client device 200 may provide a media work request 2520 to remote media server 300B based on the media work location data and remote media server 300B may responsively provide a media work data stream 2521 corresponding to a renderable copy of the media work to client device 200.

Client device 200 may then begin rendering 2522 the media work and may also use the media work interaction data obtained in the second response 2518 to determine 2523 a temporary media work interaction cost associated with the desired interaction (e.g. rendering the media work in the present example). Client device 200 may then provide an interaction validation request 2524 to remote DMTIE server 300D. Interaction validation request 2524 may include a user-account identifier and the temporary media work interaction cost.

Remote DMTIE server 300D may process 2525 the interaction validation request 2524 by obtaining the current balance of the MIC account associated with the provided user-account identifier, for example by querying DMTIE database 115, and comparing the current balance to the temporary media work interaction cost. If the current balance is greater than the temporary media work interaction cost, then remote DMTIE server 300D may calculate a new MIC balance associated with the provided user-account identifier, e.g. by subtracting the temporary media work interaction cost from the previously obtained current balance of the MIC account, and then update the DMTIE database with the new MIC balance. Remote DMTIE server 300D may then provide a validation result 2528, e.g. a true or false value corresponding to whether or not the original current MIC balance associated with the provided user-account identifier was greater than the temporary media work interaction cost, respectively.

Client device 200 may process 2530 the validation result 2528. If the validation result is true, client device may continue the rendering of the media work. If the validation result is false, client device 200 may halt (not shown) the rendering of the media work and, e.g., provide a prompt encouraging the purchase of additional MICs.

Seventh Exemplary Series of Communications

FIGS. 26a and b illustrate an exemplary series of communications 2600 between client device 200, remote front-end server 300A, remote DMTIE server 300D, and remote advertisement server 300E in accordance with various embodiments. The example shown in FIG. 26 relates to a DMTIE system wherein the online media provider allows a user to selectively obtain a micro-license for engaging in a desired media work interaction either through a deduction of one or more MICs from an MIC balance associated with a user account, similar to the examples described above, or through first viewing (or listening to) an advertisement (or a portion thereof).

Client device 200 processes 2603 a media work interaction request, e.g. obtained via optional user input 210, identifying a media work or group of media works and a desired interaction. As is described in more detail below, client device 200 may make a preliminary determination with regard to whether or not an MIC account associated with the current user session has a sufficient balance to engage in the desired interaction, such as by checking a locally stored MIC account balance value that may be intermittently synced with a MIC account balance value associated with the user account stored in DMTIE database and comparing the locally stored MIC account balance with a typical and/or average interaction cost. The series of communications 2600 illustrated in FIG. 26 assumes that (1) the desired interaction is the rendering of a selected media work and (2) in the course of processing 2603 the media work interaction request, client device 200 determines it is likely the MIC account associated with the current user session has a sufficient balance to cover the cost of engaging in the desired interaction.

Client device 200 provides remote front-end server 300A with a media work interaction request 2605, which may include a user session identifier associated with a user-account and a media work identifier associated with a media work (or an identifier associated with a group or compilation of media works).

Remote front-end server 300A may process 2608 the media work interaction request 2505 and, as a result: (1) provide remote advertisement server 300E with an advertisement location request 2609, which may include the media work identifier supplied in the media work interaction request 2605 and/or the user account identifier associated with the current user session; (2) provide remote media server 300B with a media work location request 2610; and (3) provide remote DMTIE server 300D with a media work interaction data request 2613.

Remote advertisement server 300E may process 2614 advertisement location request 2609 and responsively provide advertisement location data 2615 to remote front-end server 300A. Advertisement location data 2615 may include a URI of a renderable copy of an advertisement, such as an audio and/or video advertisement. The particular advertisement may be selected based on characteristics of the media work associated with the media work identifier (e.g. author, genre, style, release date, and the like) and/or characteristics of the user account associated with the user account identifier (age, gender, ethnicity, and the like). Remote front-end server 300A may then provide a first response 2616 to media work interaction request 2605 including advertisement location data 2615.

Remote media server 300B may process 2618 media work location request 2610 and responsively provide media work location data 2620 to remote front-end server 300A. Media work location data 2620 may include URI of a renderable copy of the media work accessed through remote media server 300B. Remote front-end server 300A may then provide a second response 2621 to media work interaction request 2605 including media work location data 2620.

Remote DMTIE server may process 2623 media work interaction request 2613 and responsively provide media work interaction data 2625 to remote front-end server 300A. Similar to exemplary series of communications 2500, described above, media work interaction data 2625 may be associated with the media work identifier provided by client device 200 and may include a set of interaction identifiers representing possible interactions with the identified media work (or group of media works) and associated temporary media work interaction costs. Remote front-end server 300A may then provide a third response 2626 to media work interaction request 2605 including media work interaction data 2625. In certain embodiments, portions of the media work interaction data provided to client device 200 may be encrypted or otherwise obfuscated to prevent the unauthorized manipulation thereof.

Responsive to obtaining first response 2616, client device 200 may provide an advertisement request 22635 to remote advertisement server 300E (or to another resource specified in the advertisement location data obtained via the first response). Remote advertisement server 300E may responsively provide an advertisement data stream 2638 corresponding to a renderable copy of an advertisement to client device 200.

Figure 26B:
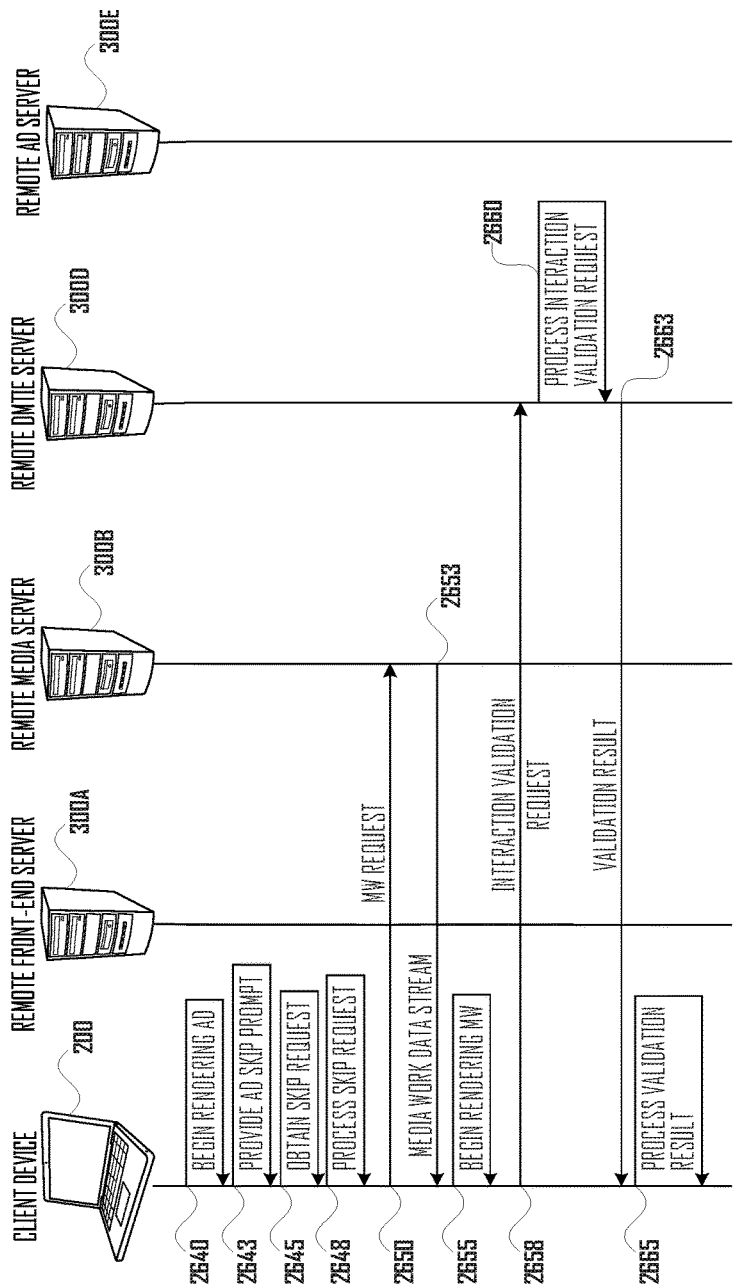
FIG. 26 illustrates as seventh exemplary series of communications between various devices in accordance with at least one embodiment.

Referring now to FIG. 26b, client device 200 may begin rendering 2640 the advertisement, e.g. via optional display 213 and/or optional speaker 215, and may provide 2643 an advertisement skip prompt, e.g. via optional display 213. (In various embodiments, the advertisement skip prompt may also be provided earlier in the sequence, such as during the initial step of processing the media work interaction request.)

Client device 200 may obtain 2645 a skip request in response to the advertising skip prompt, e.g. via optional user input 210. Client device may then process 2648 the skip request and provide a media work request 2650 to remote media server 300B (or some other resource identified in the media work location data obtained via second response 2621). Remote media server 300B may responsively provide a media work data stream 2653 corresponding to a renderable copy of the media work to client device 200.

Client device 200 may begin rendering 2655 the media work after a skip request is obtained 2645 or after the advertisement rendering completes (not shown), whichever occurs first.

Client device may then provide an interaction validation request 2658 to remote DMTIE server 300D. Interaction validation request 2658 may include a user-account identifier and a temporary media work interaction cost associated with the rendering of the media work. If a skip request has been obtained, e.g. such as at 2645 in exemplary series of communications 2600, client device 200 may set the temporary media work interaction cost associated with the rendering of the media work to be the cost specified in the media work interaction data obtained via third response 2626; if no skip request is obtained, i.e. the advertisement rendering completes, client device 200 may set the temporary media work interaction cost provided in interaction validation request 2658 to be zero.

Remote DMTIE server 300D may process 2660 the interaction validation request by obtaining the current balance of the MIC account associated with the provided user-account identifier, for example by querying DMTIE database 115, and comparing the current balance to the temporary media work interaction cost. Remote DMTIE server 300D may then provide a validation result 2663 to client device 200. Validation result 2663 may include a true or false value corresponding to whether or not the current MIC balance associated with the provided user-account identifier was greater than or equal to the temporary media work interaction cost obtained via the interaction validation request 2568 (which will be zero if no skip request was obtained during the rendering of the advertisement on client device 200). If the current MIC balance is greater than or equal to the temporary media work interaction cost provided in interaction validation request 2658, then remote DMTIE server 300D may calculate a new MIC balance associated with the provided user-account identifier, e.g. by subtracting the provided temporary media work interaction cost from the previously obtained current MIC balance, and then updating DMTIE database 115 with the new MIC balance. Client device 200 may process 2655 the validation result 2563. If the validation result is true, client device may continue the rendering of the media work, which was begun at 2640. If the validation result is false, client device 200 may halt the rendering of the media work and, e.g., provide a prompt encouraging the purchase of additional MICs (not shown).

First Exemplary Media Work Interaction Sub-Routine

Figure 27:
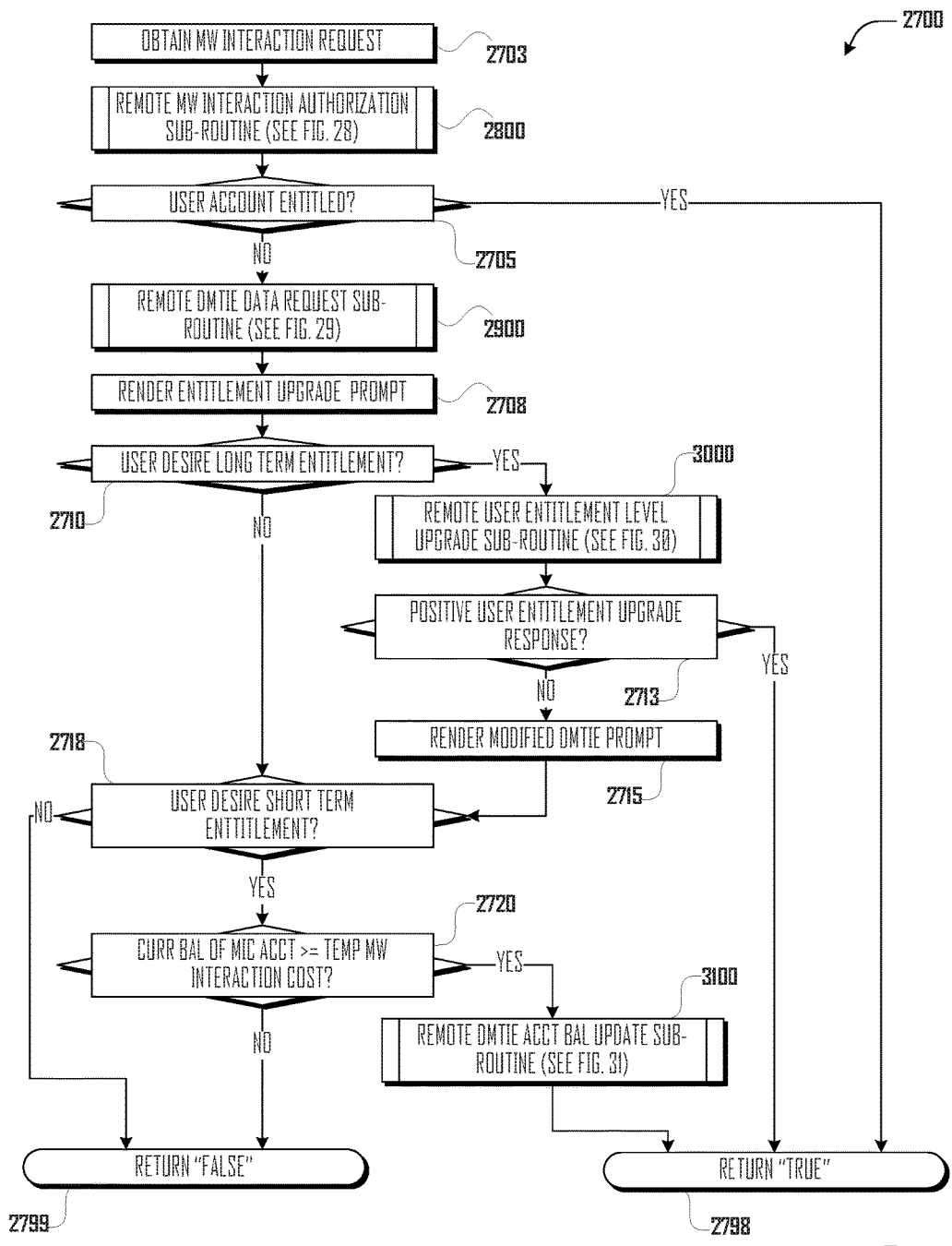
FIG. 27 illustrates a flow diagram of a media work interaction authorization sub-routine in accordance with at least one embodiment

FIG. 27 illustrates a media work interaction sub-routine 2700 which may be implemented by an instantiation of client media application 223 operating on client device 200 associated with an existing user session on the remote media server 300A.

Client media work interaction sub-routine 2700 obtains a media work interaction request, e.g. from another component (not shown) of client media application 223, at execution block 2703, including a media work identifier associated with a media work and an interaction identifier associated with a desired interaction with the identified media work.

Client media work interaction sub-routine 2700 may provide a media work interaction authorization request, including a user session identifier associated with the instantiation of client media application, the media work identifier, and the interaction identifier, to a remote media work interaction authorization sub-routine 2800, described below in reference to FIG. 28, which may return a media work interaction authorization response to media work interaction authorization sub-routine 2700.

Figure 29:
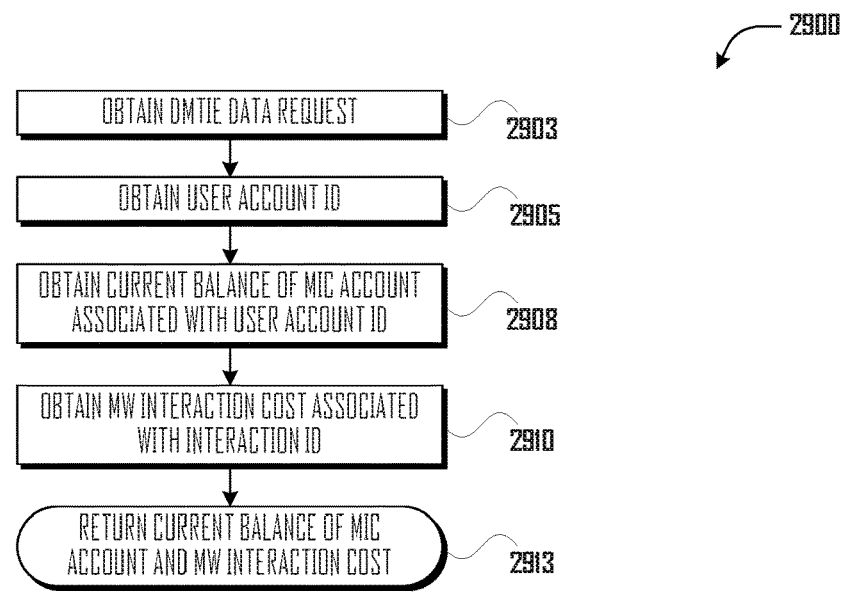
FIG. 29 illustrates a flow diagram of a remote DMTIE data request sub-routine in accordance with at least one embodiment.

At decision block 2705, if the media work interaction authorization response indicates that a user-account associated with the user session identifier is entitled to engage in the desired interaction with the media work, media work interaction authorization sub-routine 2700 may proceed to return block 2798; otherwise, media work interaction authorization sub-routine 2700 may provide a DMTIE data request, including a user session identifier associated with the instantiation of client media application, the media work identifier, and the interaction identifier, to a remote DMTIE data request sub-routine 2900, described below in reference to FIG. 29, which may return a current MIC balance associated with the user account and a media work interaction cost associated with the interaction identifier.

Media work interaction authorization sub-routine 2700 may render an entitlement upgrade prompt, for example via optional display 213, at execution block 2708. The entitlement upgrade prompt may provide for a selection between obtaining a relatively long-term entitlement with respect to the desired interaction and obtaining a relatively short-term entitlement with respect to the desired interaction. For example, the entitlement upgrade prompt may communicate to a user (1) that the user-account associated with the instantiation of client media application 223 does not have a sufficient account entitlement level to permit the requested interaction; (2) an expression of the minimum account entitlement level necessary to permit the desired interaction (e.g. a subscriber level account); (3) a cost of obtaining the minimum account entitlement level necessary to permit the desired interaction, which may be expressed in terms of a subscription cost (e.g. $10/month); (4) a cost of obtaining a temporary media work interaction entitlement associated with the interaction identifier, which may be expressed in MICs; and (5) a current MIC balance associated with the user-account identifier.

Figure 30:
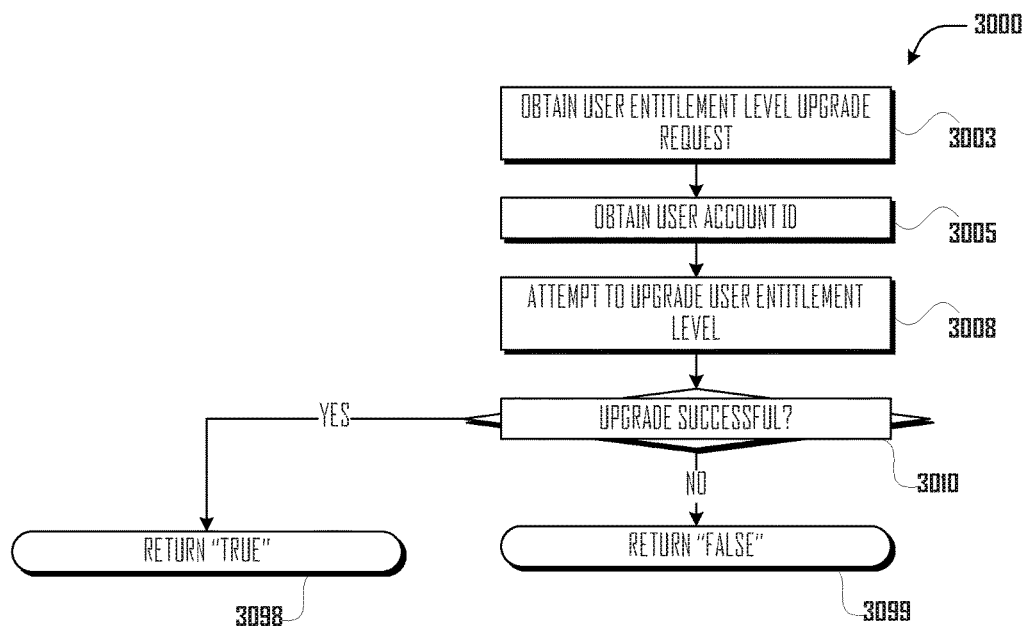
FIG. 30 illustrates a flow diagram of a remote account entitlement level upgrade sub-routine in accordance with at least one embodiment.

At decision block 2710, if media work interaction authorization sub-routine 2700 obtains a response to the entitlement upgrade prompt indicating a user desire to obtain a sufficient long-term account entitlement level necessary to engage in the desired interaction with the media work, media work interaction authorization sub-routine 2700 may provide an account entitlement level upgrade request, including a user session identifier associated with the instantiation of client media application and the desired entitlement level, to a remote entitlement level upgrade sub-routine 3000, described below in reference to FIG. 30; otherwise media work interaction authorization sub-routine 2700 may proceed to decision block 2718.

The result provided by remote entitlement level upgrade sub-routine 3000 is evaluated at decision block 2713. If media work interaction authorization sub-routine 2700 obtains a positive entitlement upgrade confirmation response from remote entitlement level upgrade sub-routine 3000, media work interaction authorization sub-routine 2700 proceeds to return block 2798; otherwise media work interaction authorization sub-routine 2700 may proceed to execution block 2715.

At execution block 2715, media work interaction authorization sub-routine 2700 may cause a modified entitlement upgrade prompt to be rendered, for example via optional display 213. The modified entitlement upgrade prompt may communicate to a user (1) that the user does not have a sufficient entitlement level to permit the requested interaction; (2) the previously requested account entitlement level upgrade was unsuccessful; (3) a cost of obtaining a temporary media work interaction entitlement associated with the interaction identifier, which may be expressed in MICs; and (4) the current balance of the MIC account associated with the user-account identifier.

At decision block 2718, if media work interaction authorization sub-routine 2700 obtains a response to either the entitlement upgrade prompt or the modified entitlement upgrade prompt indicating a user desire to obtain a short-term entitlement to engage in the desired interaction with the media work, media work interaction authorization sub-routine 2700 may proceed to execution block 2720; otherwise media work interaction authorization sub-routine 2700 may proceed to return block 2799.

Figure 31:
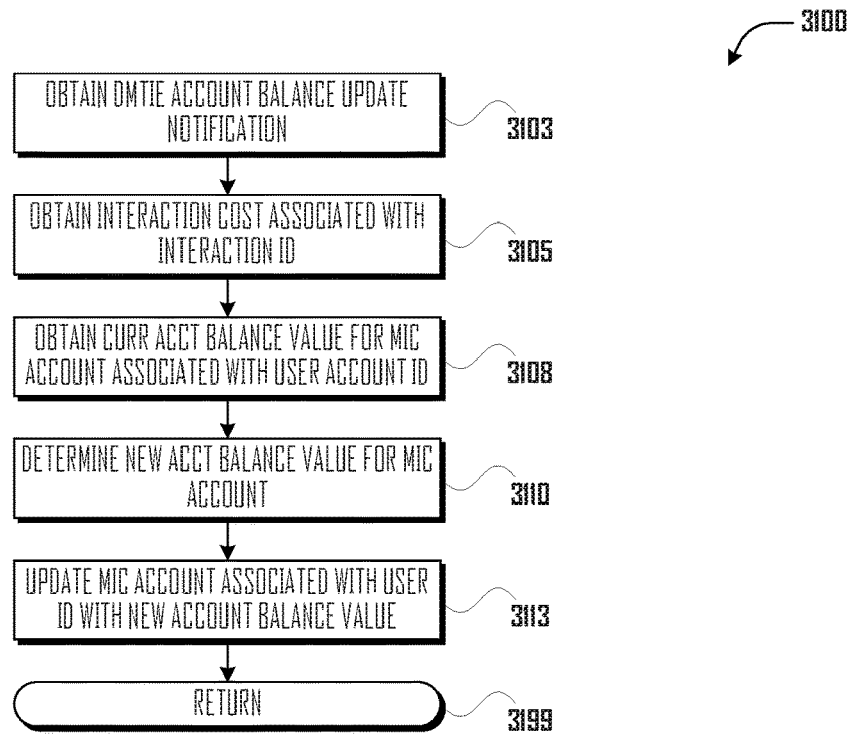
FIG. 31 illustrates a flow diagram of a remote DMTIE account balance update sub-routine in accordance with at least one embodiment.

At decision block 2720, if the current MIC balance associated with the user-account identifier is greater than or equal to the temporary media work interaction cost associated with the interaction identifier, media work interaction authorization sub-routine 2700 may provide a temporary entitlement notification, including a user session identifier associated with the instantiation of client media application, the media work identifier, and the interaction identifier, to a remote DMTIE account balance update sub-routine 3100, described below in reference to FIG. 31, and then proceed to return block 2798; otherwise media work interaction authorization sub-routine 2700 may proceed to return block 2799.

At return block 2798, media work interaction authorization sub-routine 2700 may return a "true" value, indicating client media application 223 may permit the desired interaction with the media work.

At return block 2799, media work interaction authorization sub-routine 2700 returns a "false" value, indicating client media application 223 may not permit the desired interaction with the media work.

First Exemplary Remote Media Work Interaction Authorization Sub-Routine

Figure 28:
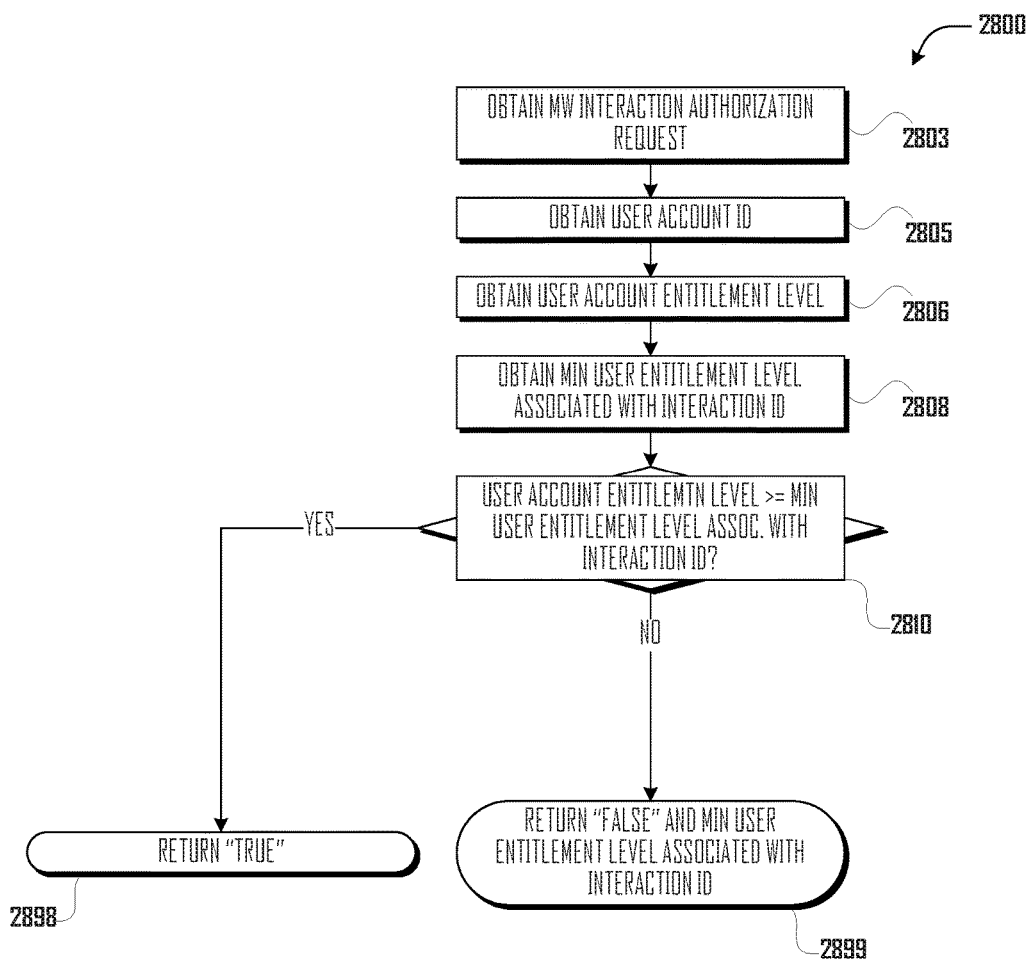
FIG. 28 illustrates a flow-diagram of a remote media work interaction authorization sub-routine in accordance with at least one embodiment.

FIG. 28 illustrates remote media work interaction authorization sub-routine 2800 which may be implemented by user session management service 323A operating on remote front-end server 300A, e.g. in response to a media work interaction authorization request obtained from an instantiation of client media application.

Media work interaction authorization sub-routine 2800 may obtain a media work interaction authorization request at execution block 2803. A media work interaction authorization request may, for example, include a user session identifier associated with an existing user session being maintained by interactive media service 323A, a media work identifier associated with a media work, and an interaction identifier associated with one of a plurality of media work interactions.

Media work interaction authorization sub-routine 2800 may obtain a user-account identifier associated with the user session identifier at execution block 2805. For example, media work interaction authorization sub-routine 2800 may query a user session management sub-routine (not shown) of interactive media service 323B with the provided user session identifier.

Media work interaction authorization sub-routine 2800 may obtain an account entitlement level associated with the user-account identifier at execution block 2806. For example, media work interaction authorization sub-routine 2800 may query administrative database 111 with the provided interaction identifier.

Media work interaction authorization sub-routine 2800 may obtain a minimum account entitlement level necessary to permit the interaction associated with the interaction identifier at execution block 2808. For example, media work interaction authorization sub-routine 2800 may query administrative database 111 with the provided interaction identifier and/or the provided media work identifier.

At decision block 2810, if the account entitlement level associated with the identified user-account is greater than or equal to the minimum entitlement level necessary to permit the desired interaction, media work interaction authorization sub-routine 2800 may proceed to return block 2898; otherwise, media work interaction authorization sub-routine 2800 may proceed to return block 2899.

At return block 2898, media work interaction authorization sub-routine 2800 may return a "true" result, indicating the user-account associated with the user session identifier is entitled to engage in the interaction associated with the interaction identifier with respect to a copy of the media work associated with the media work identifier.

At return block 2899, media work interaction authorization sub-routine 2800 may return a "false" result, indicating the user-account associated with the user session identifier is not entitled to engage in the interaction associated with the interaction identifier with respect to a copy of the media work associated with the media work identifier. The "false" result may also include the minimum account entitlement level necessary to permit the interaction associated with the interaction identifier.

Remote DMTIE Data Request Sub-Routine

FIG. 29 illustrates an exemplary remote DMTIE data request sub-routine 2900 which may be implemented by DMTIE service 323D operating on remote DMTIE server 300D, e.g. in response to a DMTIE data request obtained from media work interaction authorization sub-routine 2700 (either directly or via user-session management service 323A).

DMTIE data request sub-routine 2900 may obtain a DMTIE data request at execution block 2903. The DMTIE data request may include, for example, a user session identifier associated with an instantiation of client media application, a media work identifier, and an interaction identifier.

DMTIE data request sub-routine 2900 may obtain a user-account identifier associated with the user session identifier at execution block 2905. For example, DMTIE data request sub-routine 2900 may query the user session management service 323A with the provided user session identifier.

DMTIE data request sub-routine 2900 may obtain a current MIC balance associated with the provided user-account identifier at execution block 2908. For example, DMTIE data request sub-routine 2900 may query DMTIE database 111 with the user-account identifier.

DMTIE data request sub-routine 2900 may obtain a media work interaction cost associated with the provided interaction identifier at execution block 2910. For example, DMTIE data request sub-routine 2900 may query DMTIE database 111 with the provided interaction identifier.

In at least some embodiments, DMTIE data request sub-routine 2900 may optionally adjust the media work interaction cost (not shown). For example, during promotional events, a global discount may be applied to some or all media work interaction costs.

DMTIE data request sub-routine 2900 may return the current balance of the MIC account associated with the user identifier and the media work interaction cost associated with the interaction identifier at return block 2913

Remote Account Entitlement Level Upgrade Sub-Routine

FIG. 30 illustrates an exemplary remote account entitlement level upgrade sub-routine 3000 which may be implemented by user-session management service 323A operating on front-end server 300A, e.g. in response to an account entitlement level upgrade request obtained from media work interaction authorization sub-routine 2700

Account entitlement level upgrade sub-routine 3000 may obtain an account entitlement level upgrade request at execution block 3003. The account entitlement level upgrade request may include a user session identifier associated with an existing user session being maintained by user-session management service 323A and a desired entitlement level.

Account entitlement level upgrade sub-routine 3000 may obtain a user-account identifier associated with the user session identifier at execution block 3005.

Account entitlement level upgrade sub-routine 3000 may attempt to upgrade a user-account associated with the user session at execution block 3008. For example, account entitlement level upgrade sub-routine 3000 may provide an account management sub-routine (not shown) of user-session management service 323A with an account upgrade request including the user-account identifier and the desired entitlement level at execution block 3005.

At decision block 3010, if account entitlement level upgrade sub-routine 3000 succeeded in upgrading the user-account associated with the user session, then account entitlement level upgrade sub-routine 3000 may proceed to return block 3098; otherwise account entitlement level upgrade sub-routine 3000 may proceed to return block 3099.

At return block 3098, account entitlement level upgrade sub-routine 3000 may return a "true" result indicating a positive entitlement upgrade confirmation response.

At return block 3099, account entitlement level upgrade sub-routine 3000 may return a "false" result indicating a negative upgrade confirmation response.

Remote DMTIE Account Balance Update Sub-Routine

FIG. 31 illustrates a remote DMTIE account balance update sub-routine 3100 which may be implemented by DMTIE service 323C.

DMTIE account balance update sub-routine 3100 obtains a DMTIE account balance update notification at execution block 3103. The DMTIE account balance update notification may include a user-account identifier, a media work identifier and an interaction identifier.

DMTIE account balance update sub-routine 3100 may obtain an interaction cost associated with the interaction identifier and the media work identifier and/or the user-account identifier at execution block 3105.

DMTIE account balance update sub-routine 3100 may obtain a current MIC account balance associated with the user-account identifier at execution block 3108.

DMTIE account balance update sub-routine 3100 may determine a new value for the MIC account balance associated with the user-account identifier by subtracting the interaction cost associated with the interaction identifier from the previously obtained current MIC account balance associated with the user-account identifier at execution block 3110.

DMTIE account balance update sub-routine 3100 may update the MIC account balance associated with the user-account identifier with the new value for the MIC account balance at execution block 3113.

DMTIE account balance update sub-routine 3100 ends at return block 3199.

Alternative Media Work Recommendation Routine

Figure 32:
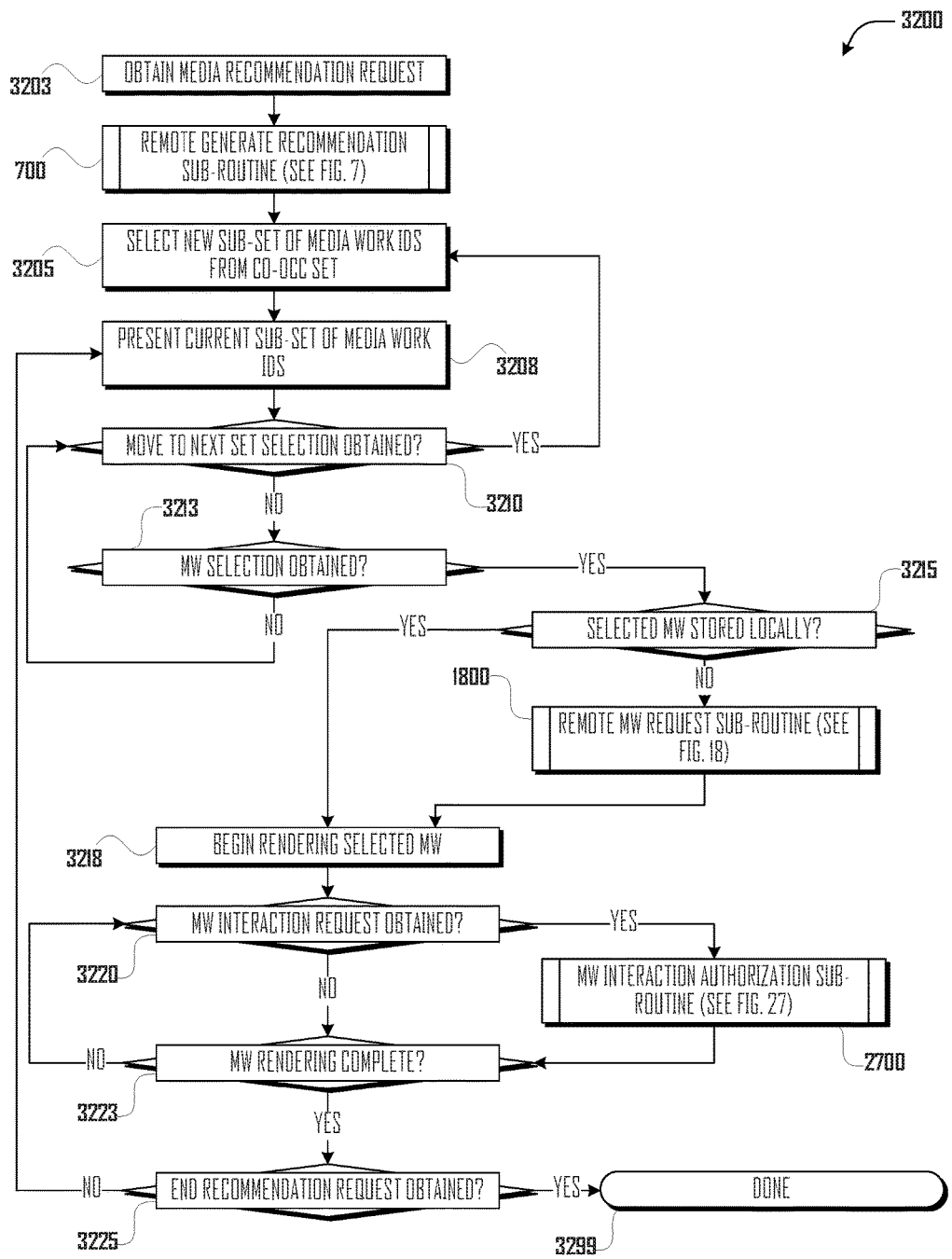
FIG. 32 illustrates a flow diagram of an alternative media work recommendation routine in accordance with at least one embodiment.

FIG. 32 illustrates an alternative media work recommendation routine 3200, which may be implemented by client media application 223 operating on a client device 200, e.g. in response to a media recommendation request, e.g. obtained from a user of the client device via user input 210. Alternative media work recommendation routine 3200 incorporates the recommendation capabilities provided by remote media recommendation service 323C and remote DMTIE service 323D. The media recommendation request may include a media work identifier corresponding to a particular media work (e.g. a song, a video, or the like).

Media work recommendation routine 3200 obtains a media recommendation request at execution block 3203. The media recommendation request may include a media work identifier corresponding to a particular media work.

Media work recommendation routine 3200 provides a generate recommendation request to remote recommendation generation sub-routine 700, described above with reference to FIG. 7. The recommendation request may include the media work identifier obtained as part of the media recommendation request. Media work recommendation routine 3200 may return a co-occurrence set including a plurality of media work identifiers and associated meta-data, including author, title, length, album (if applicable), series (if applicable), performer (if applicable), co-occurrence ranking, and the like.

Media work recommendation routine 3200 selects a sub-set of media work identifiers from the co-occurrence set at execution block 3205. The selection may be random or may be based on certain criteria, such as co-occurrence ranking, author, title, etc. This selection may be automatic or may be in response to input from the user, e.g. through optional user input 210.

Media work recommendation routine 3200 presents the selected sub-set of media work identifiers at execution block 3208. For example, media work recommendation routine 3200 may cause client device 200 to render human perceptible versions of the selected sub-set media work identifiers via optional display 213. Media work recommendation routine 3200 may further cause client device 200 to render the human perceptible version of the media work identifiers as part of a user interface which also includes options for permitting a user to indicate a selection of a particular media work identifier from the selected sub-set of media work identifiers as well as for permitting a user to indicate a desire to see a different or additional sub-set of media work identifiers, for example via optional user input 210.

At decision block 3210, if a user has indicated a desire to see a different or additional sub-set of media work identifiers, then media work recommendation routine 3200 may return to execution block 3205; otherwise media work recommendation routine 3200 may proceed to decision block 3213.

At decision block 3213, if a user has provided a selection of a particular media work identifier, media work recommendation routine 3200 may proceed to decision block 3215; otherwise media work recommendation routine 3200 returns to decision block 3210.

At decision block 3215, if a complete copy of the media work corresponding to the selected media work identifier is stored locally on the client device, e.g. in memory 208 or in computer readable storage medium 228, media work recommendation routine 3200 may proceed to execution block 3218; otherwise, media work recommendation routine 3200 provides a get media work request, including the selected media work identifier, to a remote media work request sub-routine 1800, described below with reference to FIG. 18. Remote media work request sub-routine 1800 may return a copy of the media work corresponding to the selected media work identifier. Media work recommendation routine 3200 may then proceed to execution block 3218.

Media work recommendation routine 3200 begins rendering the media work corresponding to the selected media work identifier at execution block 3218, for example via optional display 213 and/or optional speaker 215 of client device 200. The rendering of the media work may also include options for permitting a user to indicate a desire to interact with the media work being rendered or to end the recommendation process, effectively terminating media work recommendation routine 3200, for example via optional user input 210.

At decision block 3220, if media work recommendation routine 3200 obtains a media work interaction request, for example via optional user input 210, media work recommendation routine 3200 may provide a media work interaction request to a media work interaction authorization sub-routine 2700, described above in reference to FIG. 27; otherwise media work recommendation routine 3200 proceeds to decision block 3223. One example of such a media work interaction request is to generate media work recommendations based on the media work currently being rendered.

At decision block 3223, if the rendering of the media work is complete, media work recommendation routine 3200 proceeds to decision block 3225; otherwise media work recommendation routine 3200 returns to decision block 3220.

At decision block 3225, if media work recommendation routine 3200 obtains an end recommendation process request, e.g. via optional user input 210, media work recommendation routine 3200 terminates at ending block 3299; otherwise media work recommendation routine 3200 returns to execution block 3208.

Second Exemplary Media Work Interaction Sub-Routine

Figure 33A:
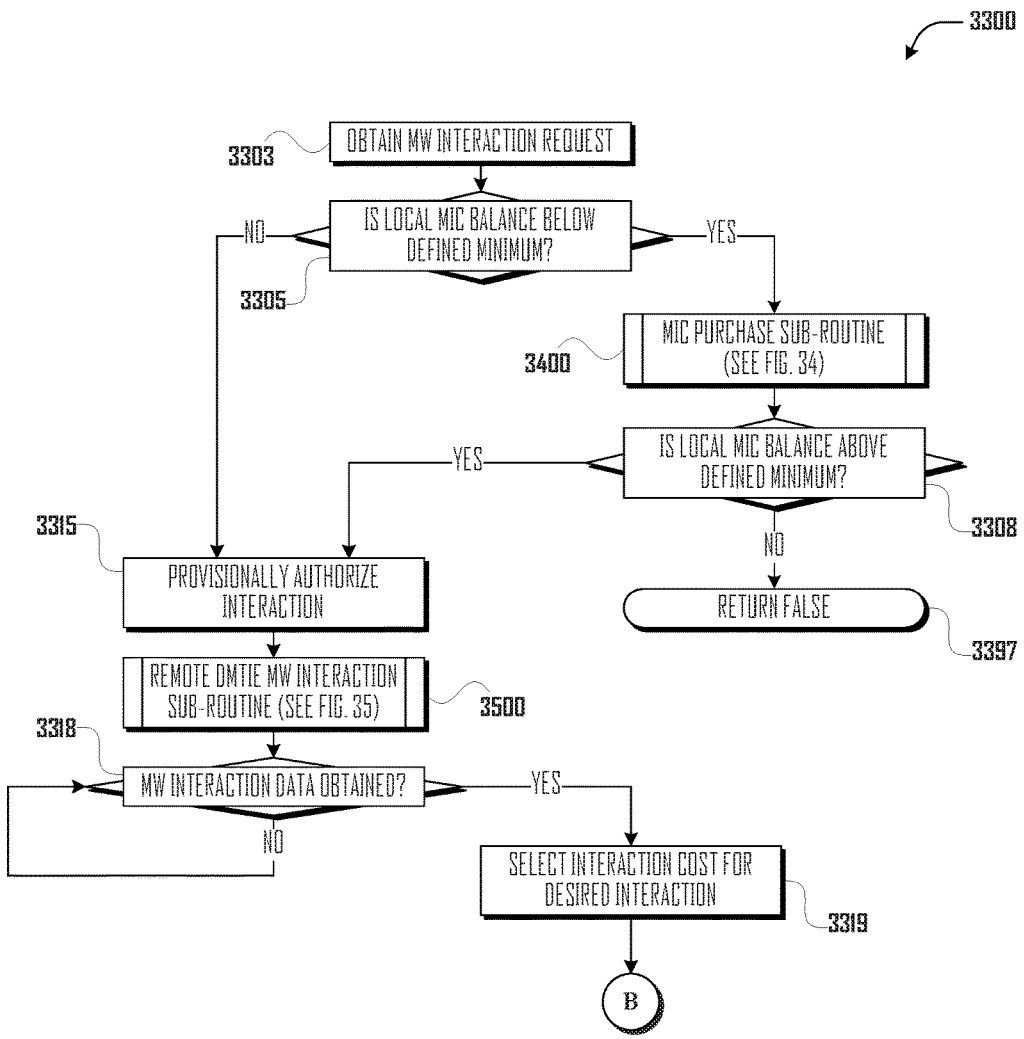
FIGS. 33A-B illustrate a flow diagram of a second media work interaction authorization sub-routine in accordance with at least one embodiment.
Figure 33B:
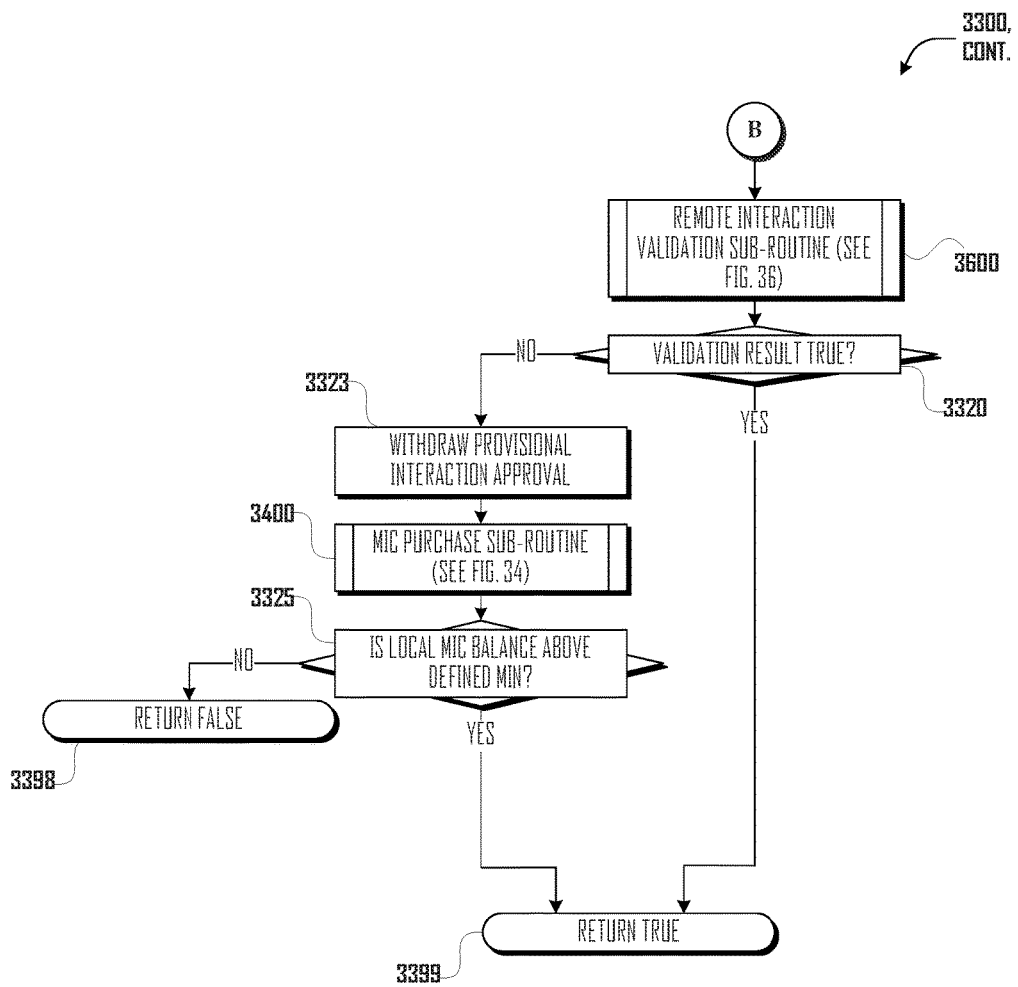

FIGS. 33A-B illustrate a second exemplary media work interaction sub-routine 3300 which may be called by another component (not shown, referred to below as the "calling component") of client media application 223 operating on client device 200, e.g. in response to a user indicating a desire via optional user input 210 to interact with a media work. Unlike first exemplary media work interaction sub-routine 2700, described above, media work interaction sub-routine 3300 is applicable to media work interactions authorizable through micro-licenses without regard to an account entitlement level.

Referring to FIG. 33A client media work interaction media work interaction sub-routine 3300 obtains a media work interaction request at execution block 3303, including a media work identifier associated with a media work and an interaction identifier associated with a possible interaction with the media work.

At decision block 3305, if a locally stored MIC balance associated with the current user session is less than a pre-defined minimum, which may, for example, correspond to an average interaction cost or a maximum interaction cost, then media work interaction sub-routine 3300 may call MIC purchase sub-routine 3400, described below in reference to FIG. 34, which may permit an increase in the locally stored MIC balance associated with the current user session; otherwise, media work interaction sub-routine 3300 may proceed to execution block 3315.

The result of MIC purchase sub-routine 3400 is evaluated at decision block 3308. If the locally stored MIC balance associated with the current user session is now above the pre-defined minimum, then media work interaction sub-routine 3300 may proceed to execution block 3315. Otherwise, media work interaction sub-routine 3300 may proceed to termination block 3397. At termination block 3397, media work interaction sub-routine 3300 may return a false value, indicating to the calling component of client media application 200 that the desired interaction is not authorized.

At execution block 3315, media work interaction sub-routine 3300 may provisionally authorize the desired interaction. For example, media work interaction sub-routine 3300 may set a provisional interaction approval flag in memory 208 to true, which may be read by the calling component.

Media work interaction sub-routine 3300 may then provide a DMTIE media work interaction request, including a user session identifier associated with the instantiation of client media application and the media work identifier, to remote DMTIE media work interaction sub-routine 3500. Remote DMTIE media work interaction sub-routine 3500, described below in reference to FIG. 35, may cause components of the interactive media service to provide media work interaction data to client device 200.

At decision block 3318, if client device 200 has obtained media work interaction data in response to calling remote DMTIE media work interaction sub-routine 3500, media work interaction sub-routine 3300 may proceed to execution block 3319.

At execution block 3319, media work interaction sub-routine 3300 selects an interaction cost associated with the interaction identifier obtained via the media work interaction data.

Referring now to FIG. 33B, media work interaction sub-routine 3300 may provide an interaction validation request, including a user session identifier and an interaction cost obtained from the media work interaction data, to remote interaction validation sub-routine 3600, described below in reference to FIG. 36. Remote interaction validation sub-routine 3600 may responsively provide a validation result having a true or false value to client device 200.

At decision block 3320, if the validation result obtained from remote interaction validation sub-routine 3600 is true, media work interaction sub-routine 3300 may proceed to termination block 3399; otherwise media work interaction sub-routine 3300 may proceed to execution block 3323.

At execution block 3323, media work interaction sub-routine 3300 may withdraw or cancel the provisional authorization of the desired interaction. For example, media work interaction sub-routine 3300 may set a provisional interaction approval flag in memory 208 to false, which may be read by the calling component. Media work interaction sub-routine 3300 may then call MIC purchase sub-routine 3400, which may permit an increase in the locally stored MIC balance associated with the current user session.

The result of MIC purchase sub-routine 3400 may be evaluated at decision block 3325. If the locally stored MIC balance associated with the current user session is now greater than or equal to the pre-defined minimum, then media work interaction sub-routine 3300 may proceed to termination block 3399; otherwise media work interaction sub-routine 3300 may proceed to decision block 3398.

At termination block 3398, media work interaction sub-routine 3300 may return a false value, indicating to the calling component of client media application 200 that the desired interaction is not authorized.

At termination block 3399, media work interaction sub-routine 3300 may return a true value, indication to the calling component of client media application 223 that the desired interaction is authorized.

MIC Purchase Sub-Routine

Figure 34:
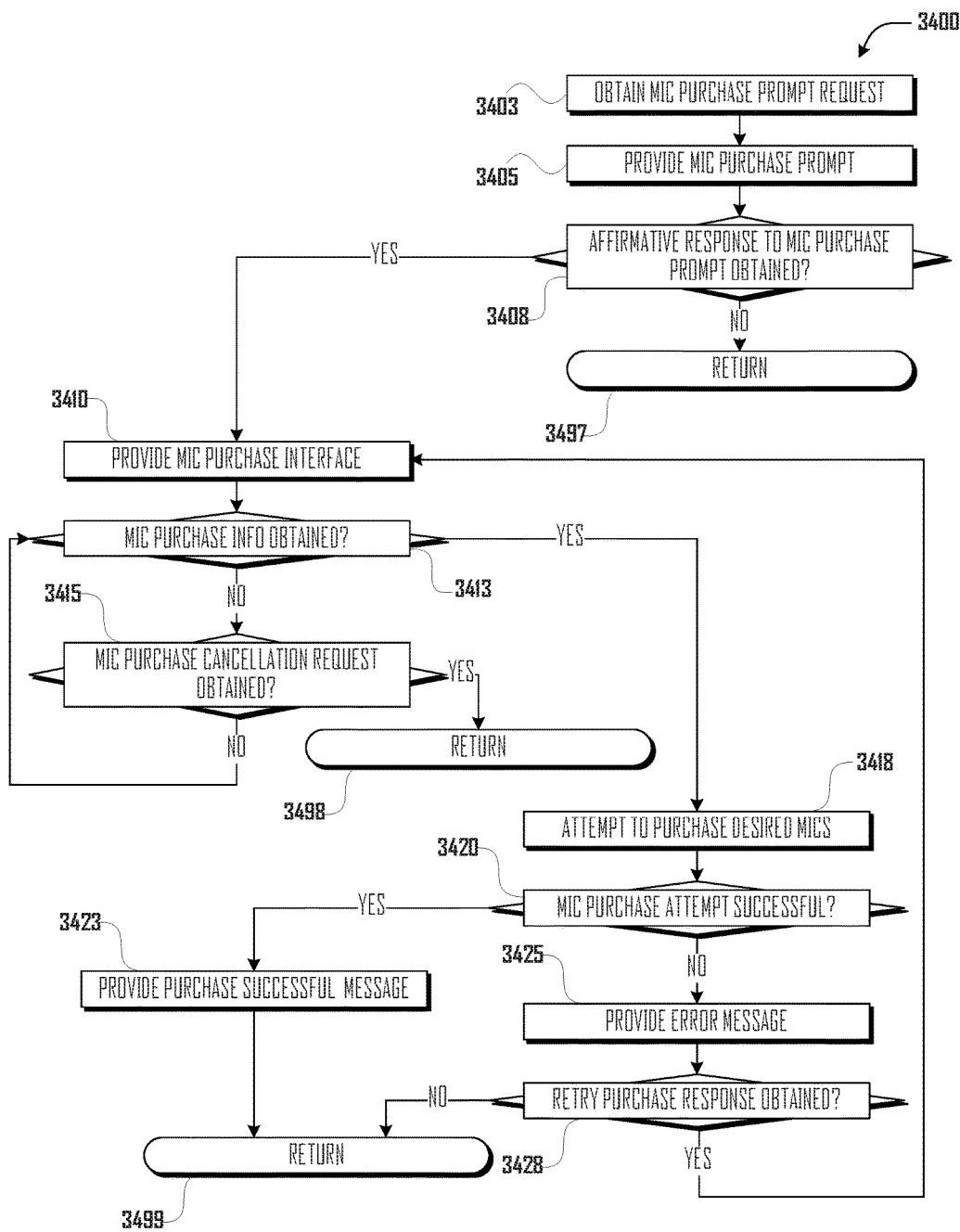
FIG. 34 illustrates a media interaction credit (MIC) purchase sub-routine in accordance with at least one embodiment

FIG. 34 illustrates an MIC purchase sub-routine 3400 which may be implemented by an instantiation of client media application 223 operating on client device 200, e.g. in response to a MIC purchase prompt request obtained from media work interaction sub-routine 3300 and/or media work interaction sub-routine 3700, described below with reference to FIG. 37.

MIC purchase sub-routine 3400 obtains an MIC purchase prompt request, e.g. from media work interaction sub-routine 3300 or media work interaction sub-routine 3700, at execution block 3403.

MIC purchase sub-routine 3400 may provide a MIC purchase prompt, e.g. via optional display 213, at execution block 3405.

At decision block 3408, if MIC purchase sub-routine 3400 obtains an affirmative response to the MIC purchase prompt indicative of a desire to purchase additional MICs, e.g. via optional user input 210, then MIC purchase sub-routine 3400 may proceed to execution block 3410; otherwise MIC purchase sub-routine 3400 may end at termination block 3497.

MIC purchase sub-routine 3400 may provide an MIC purchase interface, e.g. via optional display 213, at execution block 3410.

At decision block 3413, if MIC purchase sub-routine 3400 obtains MIC purchase information, e.g. via optional user input 213, responsive to the MIC purchase interface, such as a number of MICs to be purchased and an affirmative authorization to apply a known billing method associated with the current user account to the purchase, then MIC purchase sub-routine 3400 may proceed to execution block 3418; otherwise MIC purchase sub-routine 3400 may proceed to decision block 3415.

At decision block 3415, if an MIC purchase cancellation request is obtained, e.g. via optional user input 213, then MIC purchase sub-routine 3400 may end at termination block 3498; otherwise MIC purchase sub-routine 3400 may loop back to decision block 3413.

MIC purchase sub-routine 3400 may attempt to purchase the desired number of MICs on behalf of the user account associated with the current user session at execution block 3418. For example, MIC purchase sub-routine 3400 may provide a remote DMTIE account management sub-routine (not shown) of DMTIE service 323D with an MIC purchase request, including the user account identifier and the desired number of MICs.

At decision block 3420, if the attempted MIC purchase is successful, the MIC purchase sub-routine 3400 may proceed to execution block 3423; otherwise MIC purchase sub-routine 3400 may proceed to execution block 3425.

MIC purchase sub-routine 3400 may provide an MIC purchase successful message, e.g. via optional display 210, at execution block 3423 and then end at termination block 3499.

MIC purchase sub-routine 3400 may provide an MIC purchase error message, e.g. via optional display 210, at execution block 3425. The MIC purchase error message may provide an option to retry an MIC purchase.

At decision block 3428, if a retry purchase response is obtained, e.g. via optional user input 213, MIC purchase sub-routine 3400 may loop back to execution block 3410; otherwise MIC purchase sub-routine 3400 may end at termination block 3499.

Remote DMTIE Media Work Interaction Sub-Routine

Figure 35:
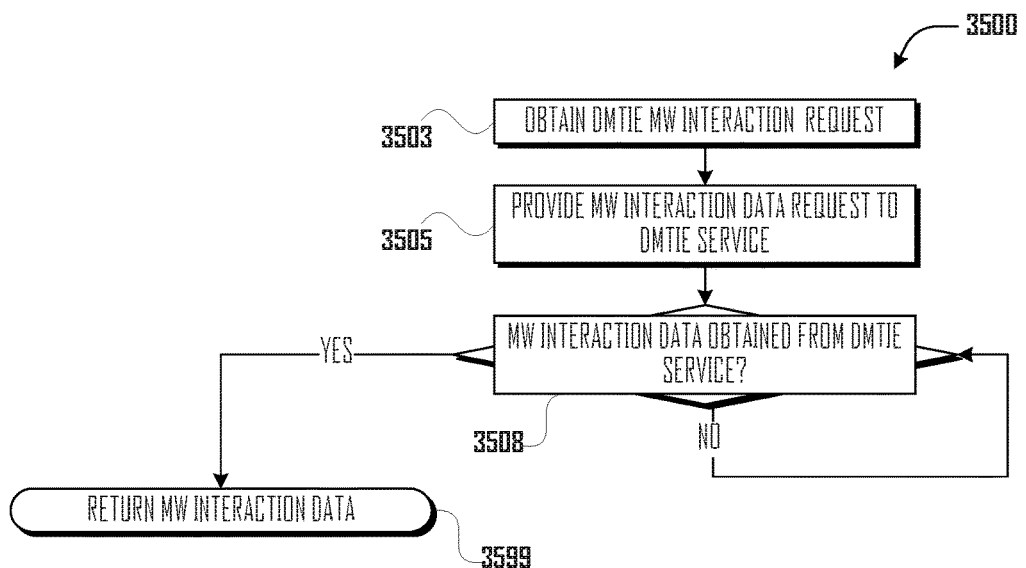
FIG. 35 illustrates a flow diagram of a remote DMTIE media work interaction sub-routine in accordance with at least one embodiment.

FIG. 35 illustrates an exemplary remote DMTIE media work interaction sub-routine 3500 which may be implemented by user session management service 323A operating on remote front-end server 300A, e.g. in response to a DMTIE media work interaction request obtained from an instantiation of client media application 223.

Sub-routine 35 obtains a DMTIE media work interaction request, e.g. including a user session identifier and a media work identifier, at execution block 3503.

Remote DMTIE media work interaction sub-routine 3500 may provide a media work interaction data request to DMTIE service 323D at execution block 3505. The media work interaction data request may include the media work identifier and the user session identifier.

At decision block 3508, remote DMTIE media work interaction sub-routine 3500 may wait for a response to the media work interaction data request. If a response to the media work interaction data request is obtained, remote DMTIE media work interaction sub-routine 3500 may proceed to return block 3599.

Remote DMTIE media work interaction sub-routine 3500 may return the media work interaction data obtained from DMTIE service 323D at return block 3599.

Remote Interaction Validation Sub-Routine

Figure 36:
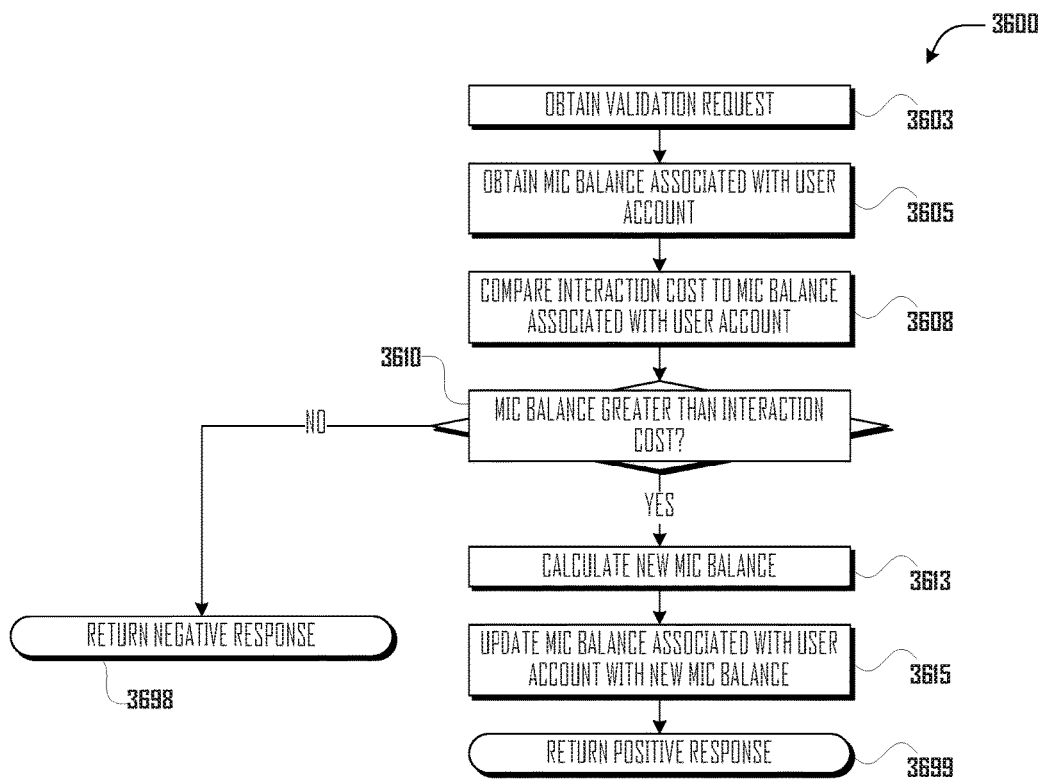
FIG. 36 illustrates a flow diagram of a remote interaction validation sub-routine in accordance with at least one embodiment.

FIG. 36 illustrates a remote interaction validation sub-routine 3600, which may be implemented by DMTIE service 323D operating on remote DMTIE server 300D, e.g. in response to an interaction validation request obtained directly from an instantiation of client media application 223 or via from remote front-end service 323A.

Remote interaction validation sub-routine 3600 may obtain an interaction validation request at execution block 3603. The interaction validation request may include data corresponding to a user account identifier and a media work interaction cost.

Remote interaction validation sub-routine 3600 may obtain an MIC balance associated with the user account identifier at execution block 3605, e.g. from DMTIE database 103.

Remote interaction validation sub-routine 3600 may compare the media work interaction cost to the MIC balance associated with the user account identifier at execution block 3608.

At decision block 3610, if the MIC balance associated with the user account is greater than or equal to the media work interaction cost, then remote interaction validation sub-routine 3600 may proceed to execution block 3613; otherwise remote interaction validation sub-routine 3600 may return negative response to the interaction validation request, e.g. including a "false" value indicating the interaction validation has failed, at return block 3698. The negative response may also include the obtained MIC balance associated with the user account, e.g. so a locally stored MIC balance value may be updated.

At execution block 3613, remote interaction validation sub-routine 3600 may calculate a new MIC balance for the identified user account, e.g. by subtracting the interaction cost from the previously obtained MIC balance.

Using the result obtained at execution block 3613, remote interaction validation sub-routine 3600 may update the MIC balance associated with the user account in DMTIE database 103 at execution block 3615.

Remote interaction validation sub-routine 3600 may return a positive response to the interaction validation request, e.g. including a "true" value indication the interaction validation has succeeded, at return block 3699. The positive response may also include the newly calculated MIC balance associated with the user account, e.g. so a locally stored MIC balance value may be updated.

Third Exemplary Media Work Interaction Sub-Routine

Figure 37A:
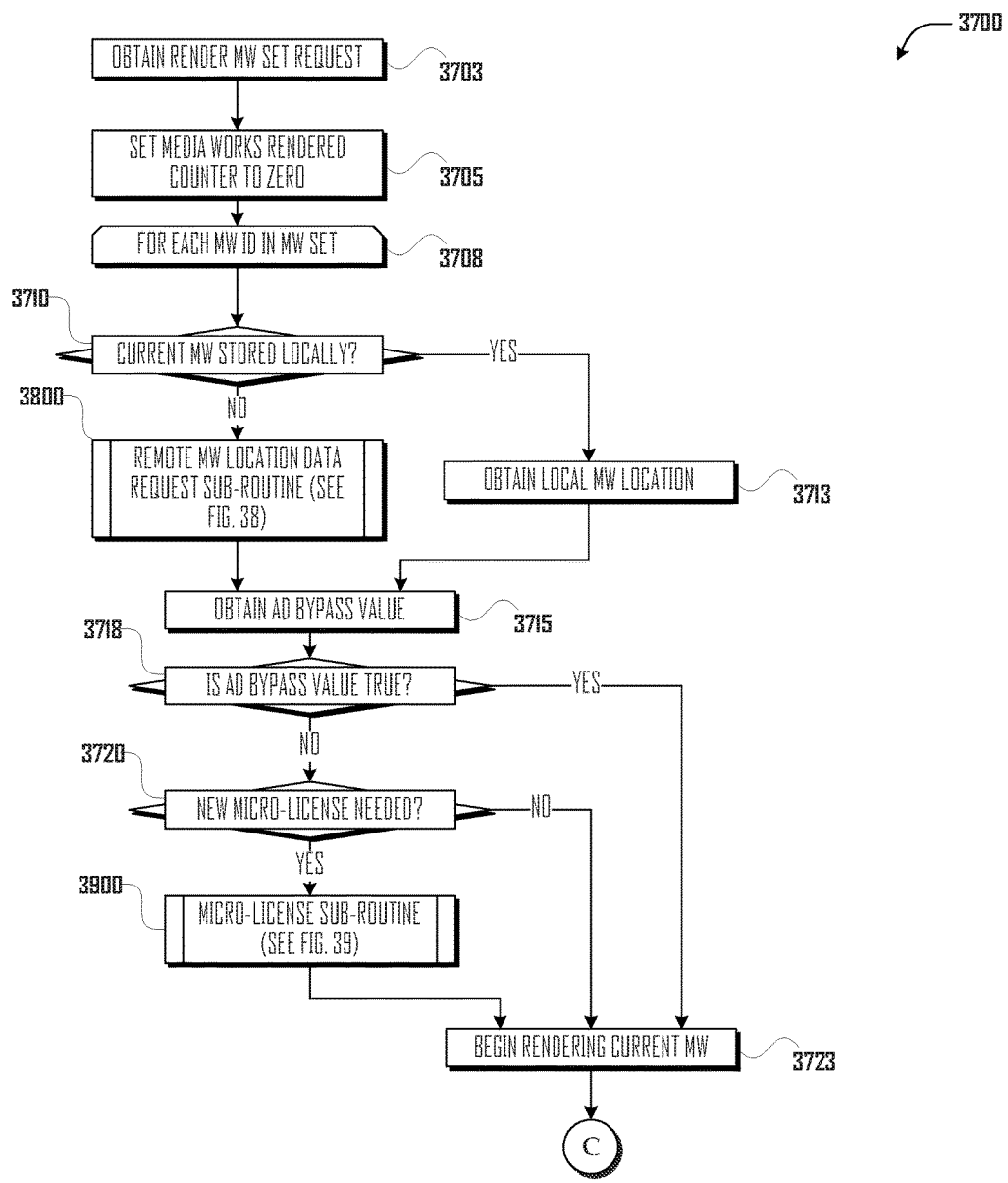
FIGS. 37A-B illustrate a flow diagram of a third media work interaction authorization sub-routine in accordance with at least one embodiment.
Figure 37B:
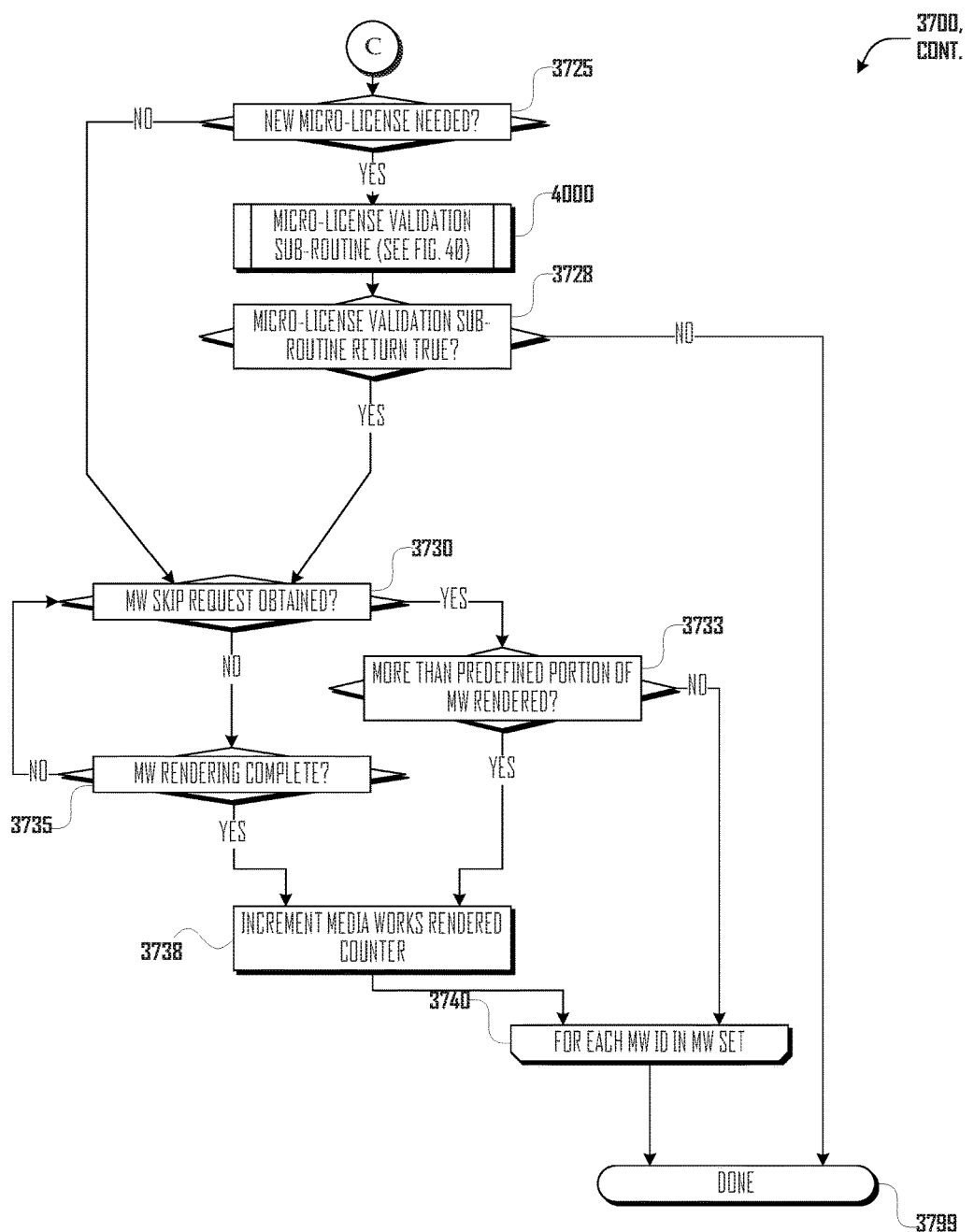

FIGS. 37A-B illustrate a third exemplary media work interaction sub-routine 3700 which may be implemented by an instantiation of client media application 223 operating on client device 200, e.g. in response to a media work playlist rendering request obtained via optional user input 208. The instantiation of client media application 223 may be associated with an existing user session maintained by remote front-end server 300A. Media work interaction sub-routine 3700 is particularly applicable where the desired media work interaction is rendering a set of media works. Media work interaction sub-routine 3700 allows a user to obtain micro-licenses for rendering sub-sets of the set of media works, either through allowing a deduction of one or more MICs from an MIC balance associated with the user session prior to rendering the sub-set of media works or through permitting an advertisement (or a portion thereof) to be rendered prior to rendering the sub-set of media works.

Referring to FIG. 37A, media work interaction sub-routine 3700 obtains a render media work set request at execution block 3703. The render media work set request may include media work set identifier, which may correspond to a list of media work identifiers. For example, the media work set identifier may correspond to a list of recommended media work identifiers generated by sub-routine 700, described above with reference to FIG. 7.

Media work interaction sub-routine 3700 may set a media works rendered counter value to zero at execution block 3705.

At starting loop block 3708, media work interaction sub-routine 3700 processes each media work identifier in the list of media work identifiers corresponding to the media work set identifier.

At decision block 3710, if a copy of the media work corresponding to the current media work identifier is stored locally, such as in memory 208, media work interaction sub-routine 3700 may proceed to execution block 3713, wherein media work interaction sub-routine 3700 may obtain a location of the local media work copy; otherwise media work interaction sub-routine 3700 may proceed to call remote media work location data request sub-routine 3800, described below in reference to FIG. 38, which may provide media work interaction sub-routine 3700 with a location (e.g. a URI) of a renderable copy of the current media work via remote media server 300B. Regardless, media work interaction sub-routine 3700 may then proceed to execution block 3715.

Media work interaction sub-routine 3700 may obtain an advertisement bypass value at execution block 3715. Advertisement bypass value may be set to "false" by default, but may be set to "true" if a user has already obtained a micro-license for the upcoming media work interactions, such as by purchasing "advertisement free" playback for a certain amount of time, e.g. one hour.

At decision block 3718, if advertisement bypass value is "true," then media work interaction sub-routine 3700 may proceed to execution block 3723; otherwise media work interaction sub-routine 3700 may proceed to decision block 3720.

At decision block 3720, if a new micro-license is needed to continue rendering the media works of the media work set, e.g. because it is the first media work of the media work set or because the number of media works permitted by the previous micro-license have been rendered, then media work interaction sub-routine 3700 may call micro-license sub-routine 3900, described below in reference to FIG. 39, before proceeding to execution block 3723; otherwise media work interaction sub-routine 3700 may proceed directly to execution block 3723.

Media work interaction sub-routine 3700 may begin rendering the media work associated with the current media work identifier, e.g. via optional display 213 and/or optional speaker 215, at execution block 3723.

Referring now to FIG. 37B, at decision block 3725, in a repeat of decision block 3720, if a new micro-license was needed prior to beginning to render the current media work, then media work interaction sub-routine 3700 may call micro-license validation sub-routine 4000, described below in reference to FIG. 40, before proceeding to decision block 3728; otherwise media work interaction sub-routine 3700 may proceed to decision block 3730.

At decision block 3728, if micro-license validation sub-routine 4000 returns "true," indicating a successful micro-license validation, then media work interaction sub-routine 3700 may proceed to decision block 3730; otherwise media work interaction sub-routine 3700 may proceed to termination block 3799.

At decision block 3730, if a media work skip request is obtained, e.g. via optional user input 210, media work interaction sub-routine 3700 may proceed to execution block 3733; otherwise media work interaction sub-routine 3700 may proceed to decision block 3735.

At decision block 3733, if more than a predetermined amount of the current media work has already been rendered, e.g. more than ten seconds, more than thirty seconds, more than half of the media work, or the like, then media work interaction sub-routine 3700 may proceed to execution block 3738; otherwise media work interaction sub-routine 3700 may proceed to ending loop block 3740.

At decision block 3735, if the rendering of the current media work is complete, media work interaction sub-routine 3700 may proceed to execution block 3738; otherwise media work interaction sub-routine 3700 may loop back to decision block 3730.

Media work interaction sub-routine 3700 may increment a media works rendered counter value at execution block 3738.

At ending loop block 3740, media work interaction sub-routine 3700 may loop back to starting loop block 3708 and process the next media work identifier in the list of media work identifiers, if any.

Media work interaction sub-routine 3700 ends at termination block 3799.

Remote Media Work Location Data Request Sub-Routine

Figure 38:
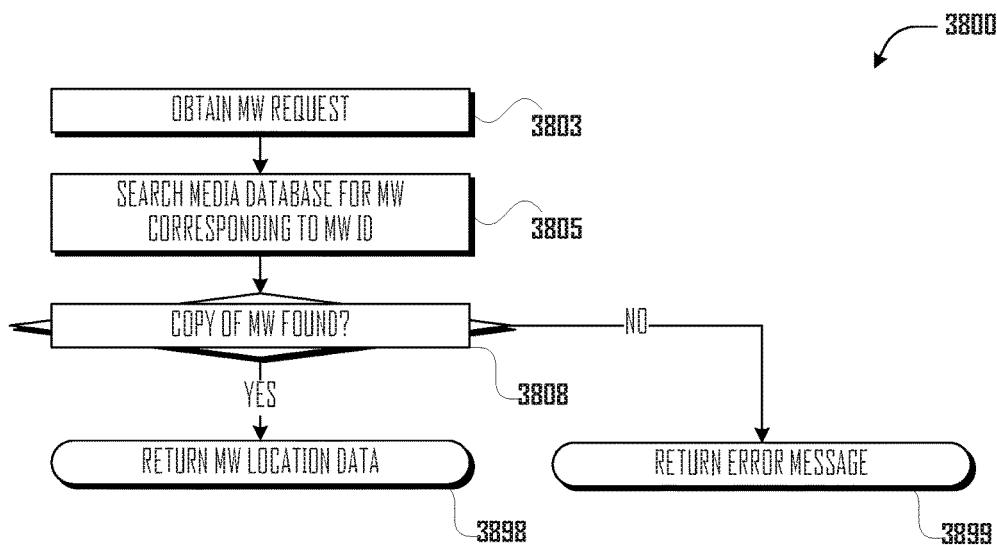
FIG. 38 illustrates a flow diagram of a remote media work location data request sub-routine in accordance with at least one embodiment.

FIG. 38 illustrates an exemplary remote media work location data request sub-routine 3800, which may be implemented by an instantiation of remote media server 300B in response to a media work request, e.g. obtained from media work interaction sub-routine 3700.

Remote media work location data request sub-routine 3800 obtains a media work request at execution block 3803. The media work request may include a media work identifier.

Remote media work location data request sub-routine 3800 may search media database 110 for a record corresponding to a renderable copy of the media work associated with the media work identifier at execution block 3805.

At decision block 3808, if a renderable copy of the media work is found in media database 110, then remote media work location data request sub-routine 3800 may return media work location data, e.g. a URI corresponding to the location of the renderable copy of the media work, at return block 3898; otherwise remote media work location data request sub-routine 3800 may return an error message at return block 3899.

Micro-License Sub-Routine

Figure 39:
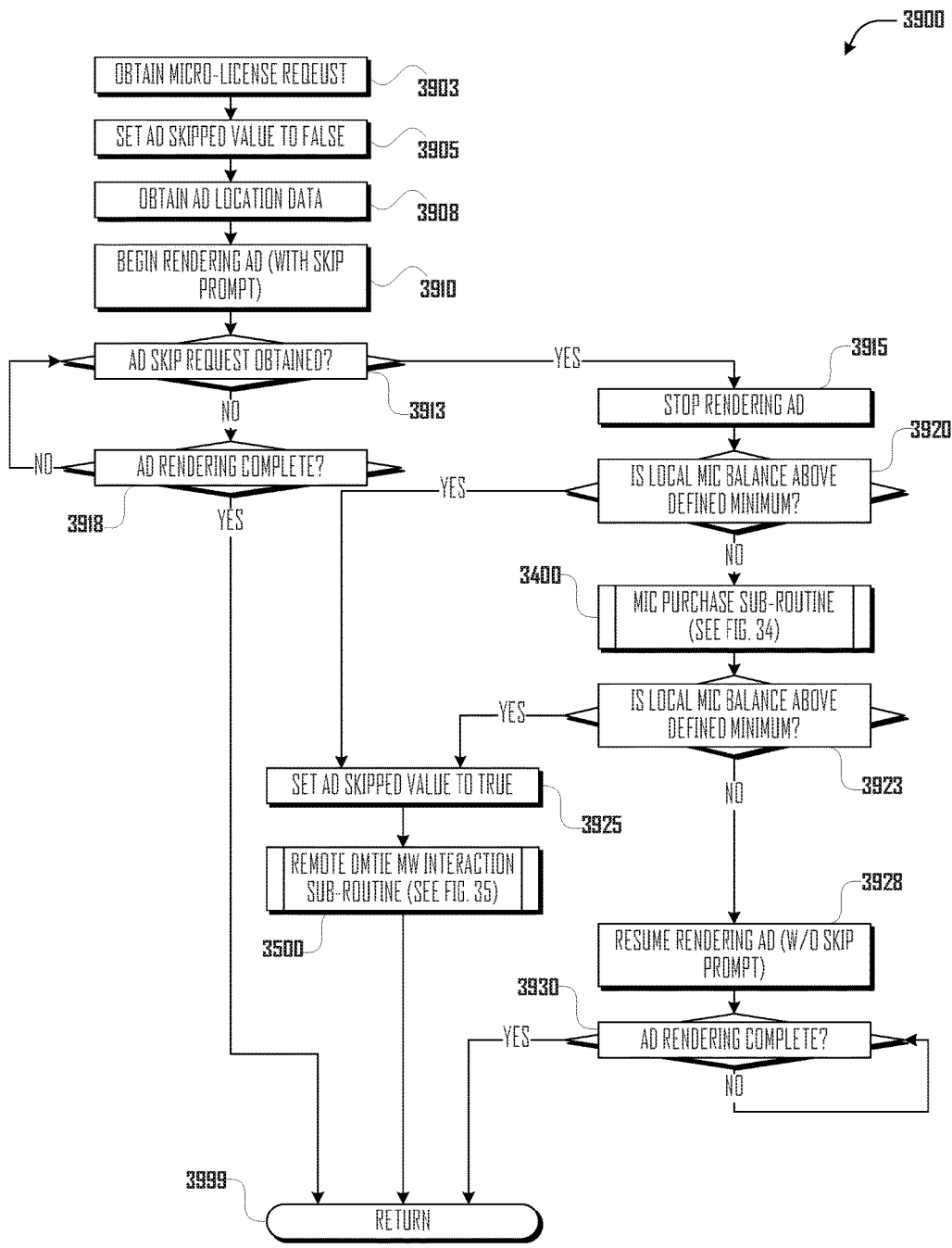
FIG. 39 illustrates a flow diagram of micro-license sub-routine in accordance with at least one embodiment.

FIG. 39 illustrates an exemplary micro-license sub-routine 3900, which may be implemented by an instantiation of client media application 223 operating on client device 200, e.g. in response to a micro-license request obtained via media work interaction sub-routine 3700.

Micro-license sub-routine 3900 may obtain a micro-license request at execution block 3903. Micro-license renewal request may include a media work identifier, a media work set identifier, and/or a media works rendered counter value.

Micro-license sub-routine 3900 may set an advertisement skipped value to "false" at execution block 3905.

Micro-license sub-routine 3900 may obtain advertisement location data at execution block 3908. Advertisement location data may, for example, be a URI corresponding to a renderable copy of an advertisement stored in advertisement database 2303.

Micro-license sub-routine 3900 may begin rendering the advertisement, e.g. via optional display 213 and/or optional speaker 215, at execution block 3910. The advertisement may include an advertisement skip prompt, e.g. displayed via optional display 213.

At decision block 3913, if an advertisement skip request is obtained, e.g. via optional user input 210, micro-license sub-routine 3900 may proceed to execution block 3915; otherwise micro-license sub-routine 3900 may proceed to decision block 3918.

At decision block 3918, if the rendering of the advertisement is complete, micro-license sub-routine 3900 may proceed to termination block 3999; otherwise micro-license sub-routine 3900 may loop back to decision block 3913.

Micro-license sub-routine 3900 may stop rendering the advertisement at execution block 3915.

At decision block 3920, if a locally stored MIC balance associated with the current user session is less than a pre-defined minimum, which may, for example, correspond to an average interaction cost, a maximum interaction cost, the last validated interaction cost, or the like, then micro-license sub-routine 3900 may call MIC purchase sub-routine 3400, described above, which may permit an increase in the locally stored MIC balance associated with the current user session; otherwise, micro-license sub-routine 3900 may proceed to execution block 3925.

Micro-license sub-routine 3900 may evaluate the result of MIC purchase sub-routine 3400 at decision block 3923. If the locally stored MIC balance associated with the current user session is now above the pre-defined minimum, then micro-license sub-routine 3900 may proceed to execution block 3925. Otherwise, media work interaction sub-routine 3300 may proceed to execution block 3928.

Micro-license sub-routine 3900 may set the advertisement skipped value to "true" at execution block 3925 and then call remote DMTIE media work interaction sub-routine 3500, described above. Micro-license sub-routine 3900 may then proceed to termination block 3999.

Micro-license sub-routine 3900 may resume rendering the advertisement at execution block 3928. The advertisement may be rendered without an advertisement skip prompt. At decision block 3930, if the advertisement has completed rendering, micro-license sub-routine 3900 may proceed to termination block 3999.

Micro-license sub-routine 3900 ends at termination block 3999.

Micro-License Validation Sub-Routine

Figure 40:
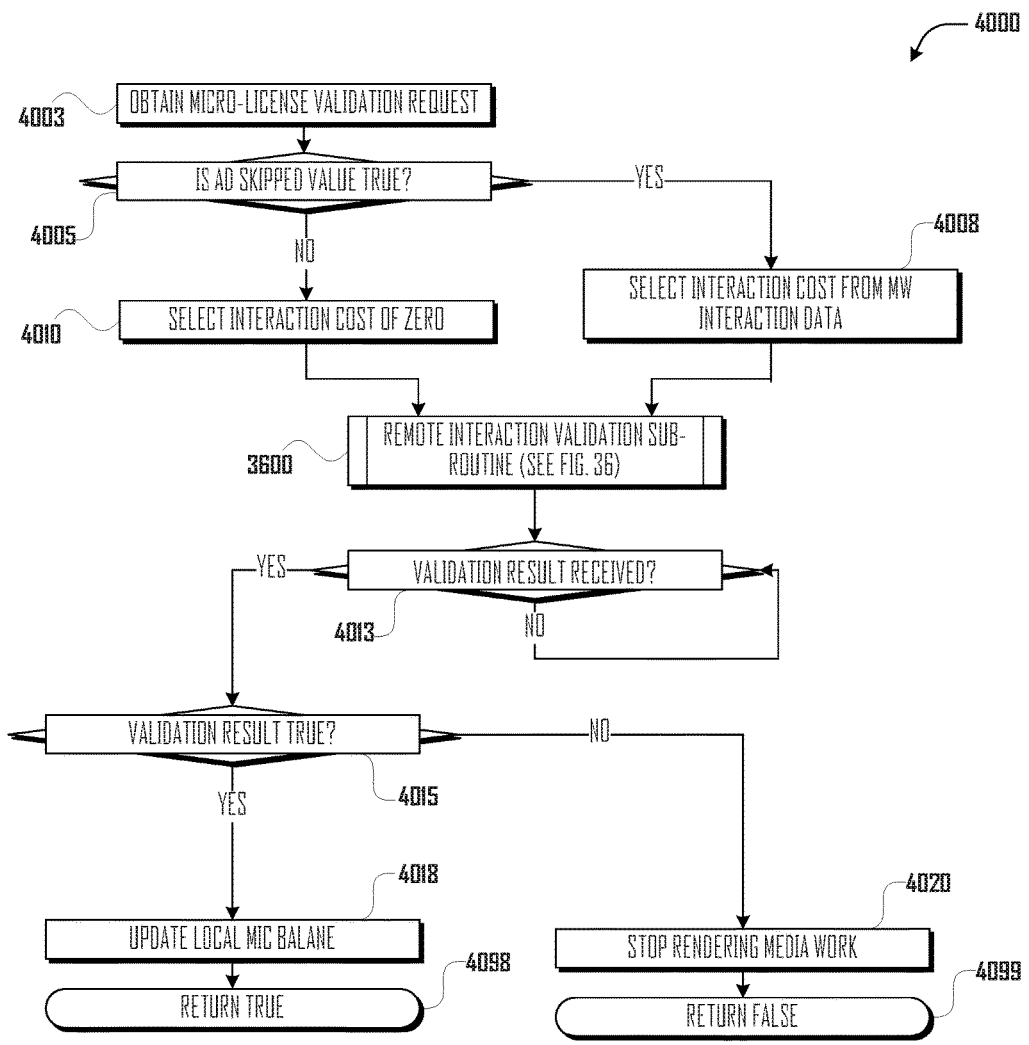
FIG. 40 illustrates a flow diagram of a micro-license validation sub-routine in accordance with at least one embodiment

FIG. 40 illustrates an exemplary micro-license validation sub-routine 4000 which may be implemented by an instantiation of client media application 223 operating on client device 200, e.g. in response to a micro-license validation request obtained via media work interaction sub-routine 3700.

Micro-license validation sub-routine 4000 may obtain a micro-license validation request at execution block 4003.

At decision block 4005, if the advertisement skipped value is true, which may occur at execution block 3925 during the execution of micro-license sub-routine 3900, micro-license validation sub-routine 4000 may proceed to execution block 4008; otherwise micro-license validation sub-routine 4000 may proceed to execution block 4010.

Micro-license validation sub-routine 4000 may select an interaction cost obtained from the media work interaction data provided by sub-routine 3500 at execution block 4008.

Micro-license validation sub-routine 4000 may select an interaction cost of zero for the current micro-license validation at execution block 4010.

After selecting an interaction cost at either execution block 4008 or execution block 4010, micro-license validation sub-routine 4000 may call remote interaction validation sub-routine 3600, described above.

At decision block 4013, micro-license validation sub-routine 4000 waits for a result from remote interaction validation sub-routine 3600. When validation results are obtained from remote interaction validation sub-routine 3600, micro-license validation sub-routine 4000 may proceed to decision block 4015.

At decision block 4015, if the validation result obtained from remote interaction validation sub-routine 3600 is "true," then micro-license validation sub-routine 4000 may proceed to execution block 4018; otherwise micro-license validation sub-routine 4000 may proceed to execution block 4020.

Micro-license validation sub-routine 4000 may update the local MIC balance, e.g. by subtracting the selected interaction cost, at execution block 4018. Micro-license validation sub-routine 4000 may then proceed to return a "true" value at return block 4098.

Sub-routine may stop rendering the current media work at execution block 4020. Micro-license validation sub-routine 4000 may then proceed to return a "false" value at return block 4099.

The Present Methods and Systems

Although specific embodiments have been illustrated and described herein, a variety of alternate and/or equivalent implementations may be substituted for the specific embodiments shown and described without departing from the scope of the present disclosure. This application is intended to cover any adaptations or variations of the embodiments discussed herein.

The present methods and systems include a system useful in facilitating providing media interaction services with respect to digital copies of media works, the system including a data store and a server computer. The data store contains at least: user account data relating to a user account, including a user account identifier corresponding to the user account, a current user entitlement level for the user account, and a current media interaction credit balance for the user account; and media work interaction data relating to a media work interaction, the media work interaction data including a media work interaction identifier corresponding to the media work interaction, a minimum user entitlement level associated with the media work interaction and a discrete-entitlement definition associated with the media work interaction. The server computer includes a computer processing unit; a network interface in data communication with the computer processing unit and the data store; and memory in data communication with the computer processing unit and containing executable instructions for causing the computer processing unit to perform a first method. The first method includes obtaining a media work interaction request, the media work interaction request including the user account identifier and the media work interaction identifier; obtaining the current user entitlement level for the user account and the minimum user entitlement level for the media work interaction; comparing the current user entitlement level for the user account to the minimum user entitlement level for the media work interaction; determining the current user entitlement level for the user account is insufficient to authorize the media work interaction request; obtaining the discrete-entitlement definition for the media work interaction; determining a media work interaction cost associated with the media work interaction request, the media work interaction cost being dependent on the discrete-entitlement definition for the media work interaction; providing a media work interaction response to the media work interaction request, the media work interaction response including at least the media work interaction cost; obtaining an affirmative response to the media work interaction response; and deducting the media work interaction cost from the current media interaction credit balance for the user account.

The present methods and systems may also include a variation on the system described above further including a client device in data communication with the server computer via a computer network. The client device includes a client-computer processing unit; a client-network interface in data communication with the client-computer processing unit; and client-memory in data communication with the client-computer processing unit and containing executable instructions for causing the client-computer processing unit to perform the media work interaction, implement a non-technical restriction selectively preventing the client-computer processing unit from performing the media work interaction, and perform a second method. The second method includes: providing the media work interaction request; obtaining the media work interaction response; providing the affirmative response to the media work interaction response; and disabling the non-technical restriction, thereby permitting the client-computer processing unit to perform the media work interaction.

The present methods and systems may include a variation to the systems described above, wherein the current user entitlement level for the user account is associated with an advertisement-supported set of media interaction services and the minimum user entitlement level for the media work interaction is associated with a subscription-supported set of media interaction services.

The present methods and systems may include a variation to the systems described above, wherein the subscription-supported set of media interaction services is associated with a periodic subscription cost and the media work interaction cost is at least one order of magnitude less than the periodic subscription cost.

The present methods and systems may include a variation to the systems described above, wherein the media work interaction response acts an offer to enter into a micro-license agreement and the affirmative response to the media work interaction response acts as a notification of acceptance of the offer.

The present methods and systems may include a variation to the systems described above, wherein the media work interaction relates to rendering a media work on a client device.

The present methods and systems may include a variation to the systems described above, wherein the discrete-entitlement definition for the media work interaction includes a temporal duration for the media work interaction, the media work interaction response includes the temporal duration, the media work interaction relates to authorizing a client device to render a media work for during a period of the temporal duration, and the affirmative response to the media work interaction response includes a starting time of the period of the temporal duration.

The present methods and systems may include a variation to the systems described above, wherein the media work interaction relates to rendering a plurality of media works on a client device.

The present methods and systems may include a variation to the systems described above, wherein the media work interaction relates to rendering the plurality of media works on the client device without advertisements.

The present methods and systems may include a variation to the systems described above, wherein the media work interaction relates to rendering the plurality of media works on the client device without advertisements for a period of time.

The present methods and systems may include a variation to the systems described above, wherein the discrete-entitlement definition for the media work interaction includes a temporal duration corresponding to the period of time, the media work interaction response includes the temporal duration, and the affirmative response to the media work interaction response includes a starting time of the temporal duration.

The present methods and systems may include a variation to the systems described above, wherein the media work interaction relates to removing a media work identifier from a set of media work identifiers.

The present methods and systems may include a variation to the systems described above, wherein the discrete-entitlement definition for the media work interaction includes a temporal duration for the media work interaction and the media work interaction response includes the temporal duration.

The present methods and systems may include a variation to the systems described above, wherein the media work interaction request includes a media work identifier associated with a media work and the media work interaction relates to providing a location of a renderable copy of the media work on a computer network.

The present methods and systems may include a variation to the systems described above, wherein the media work interaction request includes a media work identifier associated with a media work and the media work interaction relates to providing a set of media work identifiers associated with media works that co-occur with the media work.

The present methods and systems may include a variation to the systems described above, wherein the first method further includes: identifying a first media work data record in the data store, the first media work data record being associated with the media work identifier; identifying a plurality interaction instances between the first media work data record and a plurality of user session data records, including a first interaction instance between the first media work data record and a first user session data record, the first interaction instance occurring at a first time; identifying a second interaction instance, the second interaction instance being between the first user session data record and a second media work data record, the second interaction instance occurring at a second time and the second media work data record being associated with a second media work identifier; determining that a temporal difference between the first time and the second time is less than a threshold temporal value; including the second media work identifier in the set of media work identifiers; and providing the set of media work identifiers.

The present methods and systems include a method performed by at least one computer processing unit that includes: obtaining a media work interaction request, the media work interaction request including a user account identifier and a media work interaction identifier associated with a media work interaction; obtaining a current user entitlement level for a user account and a minimum user entitlement level for the media work interaction; comparing the current user entitlement level for the user account to the minimum user entitlement level for the media work interaction; determining the current user entitlement level for the user account is insufficient to authorize the media work interaction request; obtaining a discrete-entitlement definition associated with the media work interaction; determining a media work interaction cost associated with the media work interaction request, the media work interaction cost being dependent on the discrete-entitlement definition for the media work interaction; providing a media work interaction response to the media work interaction request, the media work interaction response including at least the media work interaction cost; obtaining an affirmative response to the media work interaction response; and deducting the media work interaction cost from a current media interaction credit balance associated with the user account.

The present methods and systems may include a variation to the method described above, wherein the steps described above are performed by a first computer processing unit and the method further includes the following steps performed by a second computer processing unit: providing the media work interaction request; obtaining the media work interaction response; providing the affirmative response to the media work interaction response; and disabling a non-technical restriction, thereby permitting a second computer processing unit to perform the media work interaction.

The present methods and systems may include a variation to the methods described above, wherein the current user entitlement level for the user account is associated with an advertisement-supported set of media interaction services and the minimum user entitlement level for the media work interaction is associated with a subscription-supported set of media interaction services.

The present methods and systems may include a variation to the methods described above, wherein the subscription-supported set of media interaction services is associated with a periodic subscription cost and the media work interaction cost is at least one order of magnitude less than the periodic subscription cost.

The present methods and systems may include a variation to the methods described above, wherein the media work interaction response acts an offer to enter into a micro-license agreement and the affirmative response to the media work interaction response acts as a notification of acceptance of the offer.

The present methods and systems may include a variation to the methods described above, wherein the current user entitlement level for the user account is associated with a first geographic region and the minimum user entitlement level for the media work interaction is associated with a second geographic region.

The present methods and systems may include a variation to the methods described above, wherein the media work interaction relates to rendering a media work on a client device.

The present methods and systems may include a variation to the methods described above, wherein the discrete-entitlement definition for the media work interaction includes a temporal duration for the media work interaction, the media work interaction response includes the temporal duration, the media work interaction relates to authorizing a client device to render a media work for during a period of the temporal duration, and the affirmative response to the media work interaction response includes a starting time of the period of the temporal duration.

The present methods and systems may include a variation to the methods described above, wherein the media work interaction relates to rendering a plurality of media works on a client device.

The present methods and systems may include a variation to the methods described above, wherein the media work interaction relates to rendering the plurality of media works on the client device without advertisements.

The present methods and systems may include a variation to the methods described above, wherein the media work interaction relates to rendering the plurality of media works on the client device without advertisements for a period of time.

The present methods and systems may include a variation to the methods described above, wherein the discrete-entitlement definition for the media work interaction includes a temporal duration corresponding to the period of time, the media work interaction response includes the temporal duration, and the affirmative response to the media work interaction response includes a starting time of the temporal duration.

The present methods and systems may include a variation to the methods described above, wherein the media work interaction relates to removing a media work identifier from a set of media work identifiers.

The present methods and systems may include a variation to the methods described above, wherein the discrete-entitlement definition for the media work interaction includes a temporal duration for the media work interaction and the media work interaction response includes the temporal duration.

The present methods and systems may include a variation to the methods described above, wherein the media work interaction request includes a media work identifier associated with a media work and the media work interaction relates to providing a location of a renderable copy of the media work on a computer network.

The present methods and systems may include a variation to the methods described above, wherein the media work interaction request includes a media work identifier associated with a media work and the media work interaction relates to providing a set of media work identifiers associated with media works that co-occur with the media work.

The present methods and systems may include a variation to the methods described above that further includes: identifying a first media work data record in a data store, the first media work data record being associated with the media work identifier; identifying a plurality interaction instances between the first media work data record and a plurality of user session data records, including a first interaction instance between the first media work data record and a first user session data record, the first interaction instance occurring at a first time; identifying a second interaction instance, the second interaction instance being between the first user session data record and a second media work data record, the second interaction instance occurring at a second time and the second media work data record being associated with a second media work identifier; determining that a temporal difference between the first time and the second time is less than a threshold temporal value; including the second media work identifier in the set of media work identifiers; and providing the set of media work identifiers.

The present methods and systems may include a system useful in facilitating providing media interaction services with respect to digital copies of media works. The system may include a client device in data communication with a server computer via a computer network. The client device may include a client-computer processing unit; a client-network interface in data communication with the client-computer processing unit; and client-memory in data communication with the client-computer processing unit and containing executable instructions for causing the client-computer processing unit to perform a method of: obtaining a request to render a media work; identifying an advertisement to be rendered prior to rendering the media work; obtaining a request to skip the rendering of the advertisement; and, responsive to the request to skip the rendering of the advertisement, determining a local media interaction credit balance is greater than a minimum media interaction credit balance value, the local media interaction credit balance being periodically updated from a remotely stored global media interaction credit balance, skipping rendering of the advertisement, and rendering the media work.

The present methods and systems may include a variation to the system described above, wherein the method further includes, while the media work is rendering: providing a media work interaction validation request to a remote server; obtaining a response to the media work interaction validation request, the response indicating whether the remotely stored global media interaction credit balance is less than a media work interaction cost associated with skipping the rendering of the advertisement; and halting rendering of the media work if the remotely stored global media interaction credit balance is less than the media work interaction cost associated with the skipping of the rendering of the advertisement.

The invention claimed is:

1. A system useful in facilitating providing media interaction services with respect to digital copies of media works, the system comprising:
   a data store containing at least:
   user account data relating to a user account, including a user account identifier corresponding to said user account, a current user entitlement level for said user account, and a current media interaction credit balance for said user account; and
   media work interaction data relating to a media work interaction, said media work interaction data including a media work interaction identifier corresponding to said media work interaction, a minimum user entitlement level associated with said media work interaction and a discrete-entitlement definition associated with said media work interaction; and
   a server computer including:
   a computer processing unit;
   a network interface in data communication with said computer processing unit and said data store; and
   memory in data communication with said computer processing unit and containing executable instructions for causing said computer processing unit to perform a first method comprising:
      obtaining a media work interaction request, said media work interaction request including said user account identifier and said media work interaction identifier, wherein said media work interaction request includes a media work identifier associated with a media work and said media work interaction relates to providing a set of media work identifiers associated with media works that co-occur with said media work;
      obtaining said current user entitlement level for said user account and said minimum user entitlement level for said media work interaction;
      comparing said current user entitlement level for said user account to said minimum user entitlement level for said media work interaction;
      determining said current user entitlement level for said user account is insufficient to authorize said media work interaction request;
      obtaining said discrete-entitlement definition for said media work interaction;
      determining a media work interaction cost associated with said media work interaction request, said media work interaction cost being dependent on said discrete-entitlement definition for said media work interaction;
      providing a media work interaction response to said media work interaction request, said media work interaction response including at least said media work interaction cost;
      obtaining an affirmative response to said media work interaction response;
      deducting said media work interaction cost from said current media interaction credit balance for said user account;
      identifying a first media work data record in said data store, said first media work data record being associated with said media work identifier;
      identifying a plurality interaction instances between said first media work data record and a plurality of user session data records, including a first interaction instance between said first media work data record and a first user session data record, said first interaction instance occurring at a first time;
      identifying a second interaction instance, said second interaction instance being between said first user session data record and a second media work data record, said second interaction instance occurring at a second time and said second media work data record being associated with a second media work identifier;
      obtaining a determination that a temporal difference between said first time and said second time is less than a threshold temporal value;
      including said second media work identifier in said set of media work identifiers; and
      providing said set of media work identifiers.

2. The system of claim 1, further comprising a client device in data communication with said server computer via a computer network and including:
   a client-computer processing unit;
   a client-network interface in data communication with said client-computer processing unit; and
   client-memory in data communication with said client-computer processing unit and containing executable instructions for causing said client-computer processing unit to:
   perform said media work interaction;
   implement a non-technical restriction selectively preventing said client-computer processing unit from performing said media work interaction; and
   perform a second method comprising:
   providing said media work interaction request;
   obtaining said media work interaction response;
   providing said affirmative response to said media work interaction response; and disabling said non-technical restriction, thereby permitting said client-computer processing unit to perform said media work interaction.

3. The system of claim 1, wherein said current user entitlement level for said user account is associated with an advertisement-supported set of media interaction services and said minimum user entitlement level for said media work interaction is associated with a subscription-supported set of media interaction services.

4. The system of claim 3, wherein said subscription-supported set of media interaction services is associated with a periodic subscription cost and said media work interaction cost is at least a factor of ten less than said periodic subscription cost.

5. The system of claim 1, wherein said media work interaction response acts an offer to enter into a micro-license agreement and said affirmative response to said media work interaction response acts as a notification of acceptance of said offer.

6. The system of claim 1, wherein said media work interaction relates to rendering a media work on a client device.

7. The system of claim 1, wherein said discrete-entitlement definition for said media work interaction includes a temporal duration for said media work interaction, said media work interaction response includes said temporal duration, said media work interaction relates to authorizing a client device to render a media work during a period of said temporal duration, and said affirmative response to said media work interaction response includes a starting time of said period of said temporal duration.

8. The system of claim 1, wherein said media work interaction relates to rendering a plurality of media works on a client device.

9. The system of claim 8, wherein said media work interaction relates to rendering said plurality of media works on said client device without advertisements.

10. The system of claim 9, wherein said media work interaction relates to rendering said plurality of media works on said client device without advertisements for a period of time.

11. The system of claim 10, wherein said discrete-entitlement definition for said media work interaction includes a temporal duration corresponding to said period of time, said media work interaction response includes said temporal duration, and said affirmative response to said media work interaction response includes a starting time of said temporal duration.

12. The system of claim 1, wherein said media work interaction relates to removing a media work identifier from a set of media work identifiers.

13. The system of claim 1, wherein said discrete-entitlement definition for said media work interaction includes a temporal duration for said media work interaction and said media work interaction response includes said temporal duration.

14. The system of claim 1, wherein said media work interaction request includes a media work identifier associated with a media work and said media work interaction relates to providing a location of a renderable copy of said media work on a computer network.

15. A method performed by at least one computer processing unit, the method comprising:
obtaining a media work interaction request, said media work interaction request including a user account identifier and a media work interaction identifier associated with a media work interaction;
obtaining a current user entitlement level for a user account and a minimum user entitlement level for said media work interaction;
comparing said current user entitlement level for said user account to said minimum user entitlement level for said media work interaction;
determining said current user entitlement level for said user account is insufficient to authorize said media work interaction request, wherein said media work interaction request includes a media work identifier associated with a media work and said media work interaction relates to providing a set of media work identifiers associated with media works that co-occur with said media work;
obtaining a discrete-entitlement definition associated with said media work interaction;
determining a media work interaction cost associated with said media work interaction request, said media work interaction cost being dependent on said discrete-entitlement definition for said media work interaction;
providing a media work interaction response to said media work interaction request, said media work interaction response including at least said media work interaction cost;
obtaining an affirmative response to said media work interaction response;
deducting said media work interaction cost from a current media interaction credit balance associated with said user account;
identifying a first media work data record in a data store, said first media work data record being associated with said media work identifier;
identifying a plurality interaction instances between said first media work data record and a plurality of user session data records, including a first interaction instance between said first media work data record and a first user session data record, said first interaction instance occurring at a first time;
identifying a second interaction instance, said second interaction instance being between said first user session data record and a second media work data record, said second interaction instance occurring at a second time and said second media work data record being associated with a second media work identifier;
obtaining a determination that a temporal difference between said first time and said second time is less than a threshold temporal value;
including said second media work identifier in said set of media work identifiers; and
providing said set of media work identifiers.

16. The method of claim 15, wherein the steps of claim 15 are performed by a first computer processing unit and the method further comprises:
providing said media work interaction request;
obtaining said media work interaction response;
providing said affirmative response to said media work interaction response; and
disabling a non-technical restriction, thereby permitting a second computer processing unit to perform said media work interaction; and
wherein the steps of the present claim are performed by said second computer processing unit.

17. The method of claim 15, wherein said current user entitlement level for said user account is associated with an advertisement-supported set of media interaction services and said minimum user entitlement level for said media work interaction is associated with a subscription-supported set of media interaction services.

18. The method of claim 17, wherein said subscription-supported set of media interaction services is associated with a periodic subscription cost and said media work interaction cost is at least a factor of ten less than said periodic subscription cost.

19. The method of claim 15, wherein said media work interaction response acts an offer to enter into a micro-license agreement and said affirmative response to said media work interaction response acts as a notification of acceptance of said offer.

20. The method of claim 15, wherein said current user entitlement level for said user account is associated with a first geographic region and said minimum user entitlement level for said media work interaction is associated with a second geographic region.

21. The method of claim 15, wherein said media work interaction relates to rendering a media work on a client device.

22. The method of claim 15, wherein said discrete-entitlement definition for said media work interaction includes a temporal duration for said media work interaction, said media work interaction response includes said temporal duration, said media work interaction relates to authorizing a client device to render a media work for during a period of said temporal duration, and said affirmative response to said media work interaction response includes a starting time of said period of said temporal duration.

23. The method of claim 15, wherein said media work interaction relates to rendering a plurality of media works on a client device.

24. The method of claim 23, wherein said media work interaction relates to rendering said plurality of media works on said client device without advertisements.

25. The method of claim 24, wherein said media work interaction relates to rendering said plurality of media works on said client device without advertisements for a period of time.

26. The method of claim 25, wherein said discrete-entitlement definition for said media work interaction includes a temporal duration corresponding to said period of time, said media work interaction response includes said temporal duration, and said affirmative response to said media work interaction response includes a starting time of said temporal duration.

27. The method of claim 15, wherein said media work interaction relates to removing a media work identifier from a set of media work identifiers.

28. The method of claim 15, wherein said discrete-entitlement definition for said media work interaction includes a temporal duration for said media work interaction and said media work interaction response includes said temporal duration.

29. The method of claim 15, wherein said media work interaction request includes a media work identifier associated with a media work and said media work interaction relates to providing a location of a renderable copy of said media work on a computer network.

* * * * *